(12) United States Patent
Speegle et al.

(10) Patent No.: US 8,570,160 B2
(45) Date of Patent: Oct. 29, 2013

(54) METHODS AND SYSTEMS FOR CONTROLLING DEVICES VIA POWER LINES

(76) Inventors: William Howard Speegle, Huntsville, AL (US); Remigius Shatas, Huntsville, AL (US)

( * ) Notice: Subject to any disclaimer, the term of this patent is extended or adjusted under 35 U.S.C. 154(b) by 0 days.

(21) Appl. No.: 13/082,572

(22) Filed: Apr. 8, 2011

(65) Prior Publication Data

US 2011/0248835 A1    Oct. 13, 2011

Related U.S. Application Data

(60) Provisional application No. 61/322,717, filed on Apr. 9, 2010, provisional application No. 61/395,445, filed on May 13, 2010.

(51) Int. Cl.

| | | |
|---|---|---|
| G05B 11/01 | (2006.01) |
| G08C 19/12 | (2006.01) |
| G08B 25/00 | (2006.01) |
| G08B 1/08 | (2006.01) |
| G08B 5/22 | (2006.01) |
| H05B 37/00 | (2006.01) |
| G05F 1/00 | (2006.01) |
| H01J 7/44 | (2006.01) |
| G06F 1/00 | (2006.01) |

(52) U.S. Cl.
USPC .................. 340/12.32; 340/13.23; 340/288; 340/538; 340/7.37; 315/192; 315/294; 315/51; 315/307; 713/300

(58) Field of Classification Search
USPC ........... 340/538, 12.32, 12.52, 13.22, 310.11, 340/310.17, 815.45, 855.8, 855.9, 10.1, 340/662, 661, 310.01, 956, 651, 3.3, 3.51, 340/572.7, 539.16, 539.17; 315/307, 308, 315/287, 291, 339, 362, 312, 318, 360, 297, 315/169.1; 307/1, 4, 15, 22, 23, 149, 82; 700/110, 3, 9, 11, 12, 17, 21, 22, 79, 700/83, 291, 293, 292, 286, 297, 300

See application file for complete search history.

(56) References Cited

U.S. PATENT DOCUMENTS

| | | | |
|---|---|---|---|
| 6,792,337 B2 * | 9/2004 | Blackett et al. | 700/295 |
| 7,058,823 B2 * | 6/2006 | Lapidus | 713/300 |
| 7,151,986 B2 * | 12/2006 | Rose et al. | 701/19 |
| 2007/0081130 A1 * | 4/2007 | May et al. | 353/85 |
| 2009/0160627 A1 * | 6/2009 | Godbole | 340/310.11 |
| 2009/0184662 A1 * | 7/2009 | Given et al. | 315/294 |
| 2009/0195168 A1 * | 8/2009 | Greenfeld | 315/192 |
| 2011/0068712 A1 * | 3/2011 | Young | 315/307 |
| 2011/0095687 A1 * | 4/2011 | Jonsson | 315/51 |

* cited by examiner

*Primary Examiner* — Jennifer Mehmood
*Assistant Examiner* — Mirza Alam
(74) *Attorney, Agent, or Firm* — Mark Clodfelter

(57) ABSTRACT

Methods and systems are provided that control devices using signals transmitted over power lines in many different applications and configurations. They provide a lower cost approach for controlling devices via signals transmitted over power lines. The methods and systems may control intensity, spectral, and other characteristics of lighting devices, such as light-emitting diodes (LEDs) or assemblies thereof, via power lines. They may also control other types of loads, such as motors, relays, valves or the like. Additionally, techniques for independently controlling intensity and spectral content of selected high efficiency lighting devices are also described. For example, the brightness and color of an LED may be controlled via the power lines that supply power to the LED.

32 Claims, 37 Drawing Sheets

METHOD 3 XMIT

METHODS AND SYSTEMS FOR CONTROLLING DEVICES VIA POWER LINES

RELATED APPLICATIONS

This application is related to and claims the benefit of U.S. Provisional Applications 61/322,717 filed Apr. 9, 2010 and 61/395,445 filed May 13, 2010 both entitled "Methods and Systems for Controlling Devices via Power Lines" and which are both incorporated by reference herein.

FIELD OF THE INVENTION

The present invention relates generally to controlling devices via signals sent over power lines.

BACKGROUND

There are a number of conventional methods and devices in commercial practice for transmitting signals over power lines, particularly within households or commercial buildings, for use in controlling lights, appliances, and other devices, generally within the same building. Many of these methods involve modulating higher frequency signals (e.g., radio frequency (RF) signals) onto power lines that then travel the power lines where the higher frequency signals are received by a receiver and control device. Such techniques involve several additional circuits and devices and costs associated therewith. In some cases, the control and distance capabilities, and costs, are greater that what is required for many applications, such as controlling intensity of lighting.

With a general push toward more energy efficient lighting devices, and emergence of high brightness LEDs, VCSEL arrays, and other lighting technologies that are generally more energy efficient than incandescent lighting, there is an increasing need for low cost methods and apparatus for controlling intensity, spectral, and other characteristics of such devices to help realize benefits such illumination technologies can provide. For example, many potential users of these advanced illumination technologies have grown accustomed to spectral characteristics (e.g., color temperature) of incandescent lighting as well as an ability to control intensity of such lighting. Spectral characteristics of light from fluorescent tubes, both conventional straight fluorescent tubes such as have been used in commercial buildings for many years as well as more recently commercialized compact fluorescent light tubes, are generally controlled primarily by selection of phosphors used to coat an interior surface of such tubes. However, the spectral outputs of these lamps are fixed. Various studies have shown how changes in spectral characteristics from light sources affect human moods and performance in various home, office, retail, and other work environments, outdoor environments, and in entertainment settings, trade show, and other environments. Thus, an ability to change spectral characteristics of lighting as well as intensity is generally desirable for many lighting applications and human activities.

As a result, it is desirable to have a method and system to avoid these and other related problems.

SUMMARY

In accordance with methods and system consistent with the present invention, a method for controlling a device is provided, comprising varying a power voltage level on a power line coupled to the device, and controlling the device coupled to the power line based on the varying power voltage level.

In one implementation, a method for sending information over a power line is provided, comprising modulating a power voltage on the power line based on the information, and recovering the information from the modulation of the power voltage.

In another implementation, a system for sending information over a power line is provided, comprising means for modulating a power voltage on the power line based on the information.

In yet another implementation, a system for controlling a device via a power line is provided, comprising a first microcontroller configured to receive a control signal and encode the control signal to a varying power voltage level. The system further comprises the power line configured to transmit the varying power voltage level from the first microcontroller to a second microcontroller. The system also comprises the second microcontroller configured to decode the varying power voltage level to interpret the control signal, and control the device based on the decoded varying power voltage level.

DETAILED DESCRIPTION

Figure 1:
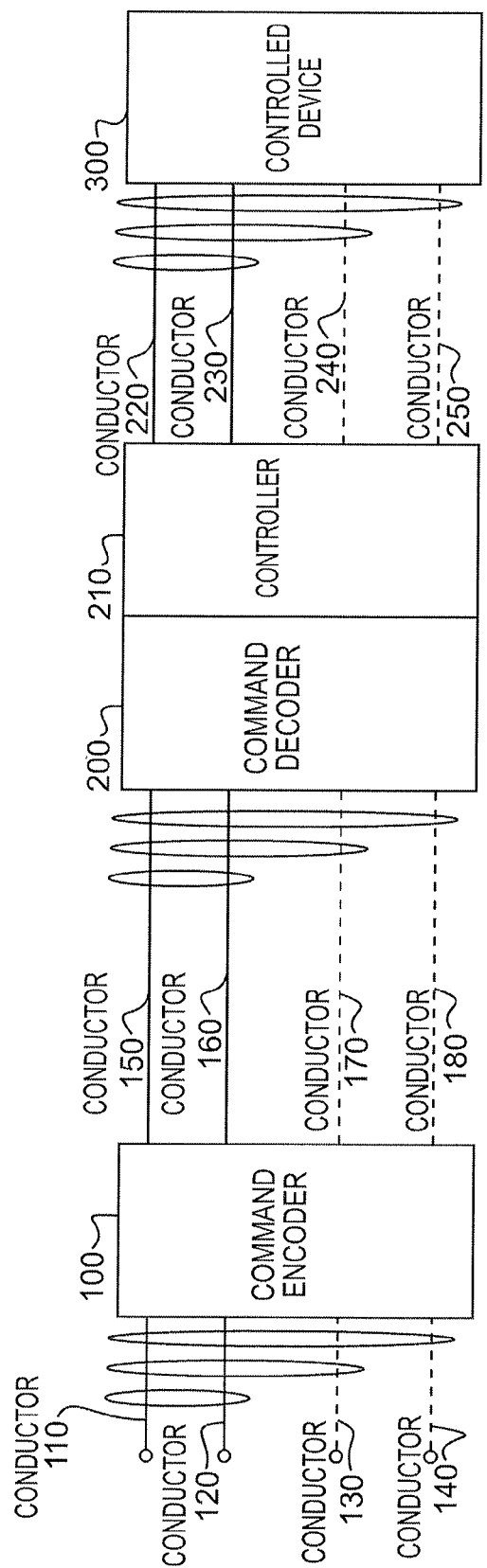
FIG. 1 provides an overview illustration of one exemplary embodiment of an encoder and decoder consistent with the present invention.

Methods and systems in accordance with the present invention control devices using signals transmitted over power lines in many different applications and electrical configurations. They provide a lower cost approach for controlling devices via signals transmitted over power lines that is suitable for many situations. The methods and systems may control intensity, spectral, and other characteristics of lighting devices, such as light-emitting diodes (LEDs) or assemblies thereof, via power lines. In other embodiments, the methods and systems described herein may also control other types of loads, such as motors, relays, valves or the like. Methods and systems described herein are also well-suited for controlling lighting fixtures that use vertical cavity surface emitting lasers (VCSELs), and other solid state devices for providing lighting, and may also have application in controlling fluorescent lights, including compact fluorescent light (CFL) devices, as well as incandescent lights. Additionally, techniques for independently controlling intensity and spectral content of selected high efficiency lighting devices are also described. For example, the brightness and color of an LED may be controlled via the power lines that supply power to the LED.

Some embodiments may be used in direct current (DC) circuits, and other embodiments may be used in alternating current (AC) circuits. Some embodiments may be used with existing user controls, such as a conventional AC light fixture dimmer control, to provide control over additional functions such as both intensity and color temperature of LED light fixtures. Other embodiments may use the addition of a control signal encoder, such as disclosed herein, which may include a user or data interface, to generate and transmit control or other communication signals over power lines. Transmitted signals may employ an ASCII code or some other conventional, customized, or suitable code to convey commands and other information to one or more destination decoders, which may be coupled to a controller that may be used to implement decoded commands.

Other needs and applications that may also be addressed include control of devices such as water heaters and other household appliances, as well as industrial equipment and other load management applications, to permit more efficient energy usage or to control energy usage within constraints, such as may be imposed by various power generation limitations or by emerging alternative energy sources, such as solar power, wind power, and the like. Providing control of spectral characteristics as well as intensity may also prove beneficial in numerous other applications, such as in greenhouses and other plant growth environments and in animal habitation and animal product production environments.

Several methods of communications signaling over power lines which can be implemented with low cost components and techniques are disclosed herein. However, methods and apparatus disclosed herein may also be used with other signaling methods over power lines. Although communication techniques disclosed herein have application in transmitting data for use in controlling electrical devices, methods and apparatus disclosed herein may also be used to support communication over power lines for other purposes. In some implementations, low cost hardware embodiments for implementing these methods for communication and control use microcontrollers that include integrated analog-to-digital converters that may be used for sampling voltage on power lines, and, using software implemented in such microcontrollers, for decoding command signals transmitted via power lines, and for controlling a load in response to commands represented by transmitted signals. In many applications where a microcontroller may already be useful for other purposes, low cost hardware changes to a circuit for providing a data reception and command decoding capability may include simply selection of a microcontroller, such as those of the ATMEL AVR family, having a capability to perform analog-to-digital sampling on one or more input circuits, and addition of a voltage divider, generally comprising two resistors, that reduce power voltage levels to levels that are generally within a dynamic range of such analog-to-digital converters in a selected microcontroller.

Some embodiments for applications in circuits using alternating current may include use of a second voltage divider comprising another pair of resistors. Decoding of digitized samples of transmitted data may then be performed in software in such a microcontroller to determine which command was transmitted, and additional software implemented in the same microcontroller, or one or more different microcontrollers, may be used to implement an appropriate control response in a controlled load to a decoded command. Some embodiments may include addition of a command encoder for generating and applying control signals to power lines, and other embodiments may make use of existing control devices, such as conventional light dimmer switches, to provide existing or additional control capabilities. Although use of a microcontroller having one or more integral analog-to-digital converters may be preferred in most embodiments, some embodiments may make use of one or more analog-to-digital converters external to a microcontroller and coupled thereto to implement some of the methods of communicating over power lines disclosed herein.

FIG. 1 provides an overview illustration of an embodiment comprising an encoder and decoder consistent with the present invention. Additional embodiments involving more complex electrical topologies and configurations are presented later herein. Referring to FIG. 1, in some applications and embodiments, methods and apparatus may be used to implement a signal encoder 100 (also referred to herein as a command encoder) and a signal decoder 200 (also referred to herein as a command decoder). Command encoder 100 may be powered via conductors 110, 120. In different embodiments, as described further herein, power supplied via conductors 110, 120 may be direct current (DC) power or alternating current (AC) power. Command encoder 100 and command decoder 200 may be coupled via conductive paths 150, 160, which may comprise a source and a return for direct current or alternating current. In some applications and embodiments, one or more additional power-related conductors, e.g., 170, 180, may exist between command encoder 100 and command decoder 200. Such additional conductors may comprise, for example, additional power circuit phases, as in 3-phase power and/or safety grounds, as in conventional 220-240 Volt circuits used in the United States. Additional conductive paths, e.g., 130, 140, may also be used in some embodiments to provide multiphase power and/or safety grounds to control signal encoder 100.

Command decoder 200 may be coupled to a controller 210 which uses information from decoded control signals to effect control of one or more controlled devices 300. In some embodiments, as described in more detail later herein, signal decoder 200 and controller 210 may be implemented in a single microcontroller, such as a microcontroller in ATMEL's AVR family or a similar microcontroller from another vendor, the microcontroller having an integrated analog-to-digital converter capability on one or more inputs. In other embodiments, particularly where a controlled device 300 may require voltage, current, or power levels greater than can be provided directly from a microcontroller device, additional circuit components, such as additional microcontrollers, power control transistors, relays, silicon-controlled rectifiers (SCRs), or Triodes for Alternating Current (TRIACs), may be used to respond to signals from a microcontroller so as to effect control of controlled devices. An example of such an embodiment is shown later herein. In some embodiments, microcontroller functions and power control devices used to implement an appropriate response to command signals decoded by a microcontroller, so as to effect control of one or more controlled devices 300, may be collectively referred to herein as a controller 210. Thus, in some embodiments, controller 210 may be considered to include power control devices such as noted above used to support control of higher power controlled devices 300, responsive to signals output from a microcontroller used to decode and/or implement responses to command signal sequences transmitted over power lines. In other embodiments and applications, controller 210 may comprise control signal generation capabilities provided by one or more microcontrollers, and power control devices such as power transistors, SCRs, and TRIACs may be considered part of a controlled load.

As noted, in some embodiments, signal decoding functions and at least some controller functions may be implemented in a single microcontroller device. By use of circuit designs and components that reduce power line voltage, at a sampling point, to a dynamic range acceptable for analog-to-digital converter circuits integrated within a microcontroller, such as a member of the ATMEL AVR microcontroller product line, signal decoding functionality may be implemented by use of such analog-to-digital circuits and appropriate software, such as described later herein, implemented in such microcontroller.

Software implemented within a microcontroller may also be used, in some embodiments, to generate control signal outputs appropriate to commands decoded in a microcontroller, as described herein. In some applications and embodiments, microcontroller outputs responsive to transmitted and decoded commands may be used to fully energize (e.g., directly or via power control devices described earlier) selected features of a controlled load (e.g., via one or more output conductors 220, 230, 240, 250). In other applications and embodiments, microcontroller control of controlled devices (e.g., 300) may employ conventional pulse width modulation (PWM) techniques to control selected features of a controlled load. For example, when controlling light fixtures using incandescent lights or LEDs, a microcontroller may be programmed to generate pulse width modulated output signals, on selected output terminals, that may be used directly or indirectly (e.g., via power control transistors, SCRs, or TRIACs) to control a duty cycle and, thus, average or perceived intensity of light output. Although a return path from a controlled device 300 through controller 210 is implied in the example illustrated in FIG. 1, it is to be understood that alternate return paths (e.g., via chassis ground common in automotive wiring) may also be used, and that in some embodiments, switching and other control functions may be implemented via power return paths from a load rather than via a conductive path for supplying power to a load.

In some applications and embodiments, methods and apparatus may be used to provide a control signal decoder 200 and controller 210 that respond to signals over power lines from an existing conventional device, such as a conventional light dimmer control and switch, which may provide voltage waveform modifications or other signals that may be interpreted as control signals. Thus, an example, described later herein, of such embodiments is use of methods and apparatus to provide replacement lighting assemblies that screw into conventional 120V incandescent light bulb sockets but which use an existing conventional phase-control dimmer switch to provide separate and independent control of intensity and color temperature of light from an assembly of light emitting diodes (LEDs) which may be included within each replacement lighting assembly.

There are several fundamental methods of communication over power lines encompassed herein. Low cost of embodiments implementing methods and apparatus disclosed herein is made possible through use of analog-to-digital converter capabilities included in selected microcontrollers used for decoding data signals transmitted over power lines and controlling a load in response to digital commands represented by such data. In many applications where one or more microcontrollers may already be present to implement commands transmitted and decoded via other conventional means, low cost is further realized since only a passive voltage divider circuit, frequently comprising only two resistors, need be added to reduce power line voltage to levels within a dynamic range of an analog-to-digital converter implemented within a suitable microcontroller, such as those of the ATMEL AVR family or similar microcontrollers from other vendors (e.g., Philips (NXP), On Semiconductor, Microchip, Renasas). Decoding of data transmitted over a power line may then be performed in software within such a microcontroller using results from analog-to-digital sampling of signals on power lines. In many embodiments, such a microcontroller is used to affect control of a load in response to decoded commands. In some embodiments, similar or other types of microcontrollers may also be used to encode command signals and control transmission of such signals on power lines, as described in detail herein.

Methods 1, 3, 4, 5, and 6 described below include use of dedicated transmitter circuits for sending data streams at preselected rates to receivers generally located near a controlled device to be controlled. Method 2 uses information in AC waveform modifications that may be generated by an unmodified conventional silicon controlled rectifier (SCR) or TRIAC phase angle controlled dimmer control, such as may be used to control intensity of selected incandescent lights in a room, as signals which may be interpreted by a suitable receiver and software in one embodiment to yield control information for controlling additional features or characteristics besides intensity (e.g., color temperature) in a light fixture or other device (e.g., also controlling a fan in a light fixture). Methods 1 through 6 described below may recover information transmitted over power lines by analog-to-digital sampling and integration of power line voltage over fixed time intervals or over intervals determined by zero crossings or by voltages exceeding or falling below selected thresholds. Changes in integrated value over such time intervals may be used to convey information in digital format.

Method 1 is referred to herein as DC voltage micro-modulation, wherein data is transmitted by momentarily changing magnitude of DC voltage supplied to a load (controlled device 300) so as to encode information according to some pre-selected code. In this method, a control command encoder 100 causes temporary increases (or decreases) in voltage supplied via power conductors 150-160 according to selected command codes. A control command decoder 200, generally located near a controlled device 300 to be controlled (e.g., within a light fixture that may include multiple light emitting diodes—LEDs) that is drawing power from the power conductors detects and decodes such increases (or decreases) in voltage and determines what command code was transmitted. In some embodiments, a controller 210 coupled to a control command decoder 200 may generate control signals responsive to decoded commands to effect a desired control of a controlled device 300. In some embodiments, such controller may be integrated with a control command decoder within a single microcontroller. In an example shown herein, data is transferred through use of ASCII-compatible code sequences for selected characters, but other conventional or customized code sequences may also be used instead of or in addition to ASCII-compatible code sequences. Use of ASCII code sequences for commands provides a degree of noise immunity and reduces likelihood of false positive commands compared to use of shorter code sequences. However, shorter or longer codes may be used depending upon a noise environment for an application, criticality of correct command receipt, latency, and other requirements for a particular application. When using ASCII code sequences, an occurrence of a voltage above a static level, by more than a programmable threshold quantity, may be interpreted by a receiving microcontroller to represent an ASCII start bit. Thereafter, data signals may follow ASCII standard with transmission of 8 data bits, Least Significant Bit (LSB) first, and one stop bit, with no parity bits. In this example, data transmission may be signaled by varying voltage from a nominal supply value, such as 15V, to a signaling value, such as 19V. In general, a range of variance may be from about 10% to about 30% of the DC voltage, although this range depends on several factors. Where the voltage is closely controlled and relatively free of noise, a smaller range may be used, such as 5% or so, or even less. In an extremely noisy environment or where there are large voltage swings, a larger range may be used, such as 30%-50% or more. Modulation voltage swings due to data transmission should be selected so as to not interfere with operation of the device or devices powered by the modulated power voltage.

When line voltage drop at a receiving microcontroller is sufficiently small and relatively noise free, data may be recovered using a simple threshold test to determine if voltage has exceeded a threshold value at one or more sampling times. In a noisy environment, multiple samples may be integrated or averaged over a selected sampling interval to determine if a threshold has been exceeded. In an environment where there is increased line voltage drop and/or switching noise, an adaptive algorithm that uses multiple samples to look for changes in integrated level, or other known techniques for signal recovery, may be used in place of a simple threshold test using single or multiple samples.

Commanded functions may include any desired response and any length character string in any format. An example would be use of ASCII code for characters "U", "D", "W" and "C" to execute functions, respectively, of "Up", to increase brightness of an LED or speed of a motor, "Down" to decrease brightness or speed, "Warmer" to change color temperature of an LED light fixture to a lower (i.e., redder) color temperature, and "Cooler" to increase color temperature (i.e., to include more of blue portion of spectrum). As noted, other conventional or customized codes may be used to provide commands to be transmitted and decoded by a receiving microcontroller.

Figure 2:
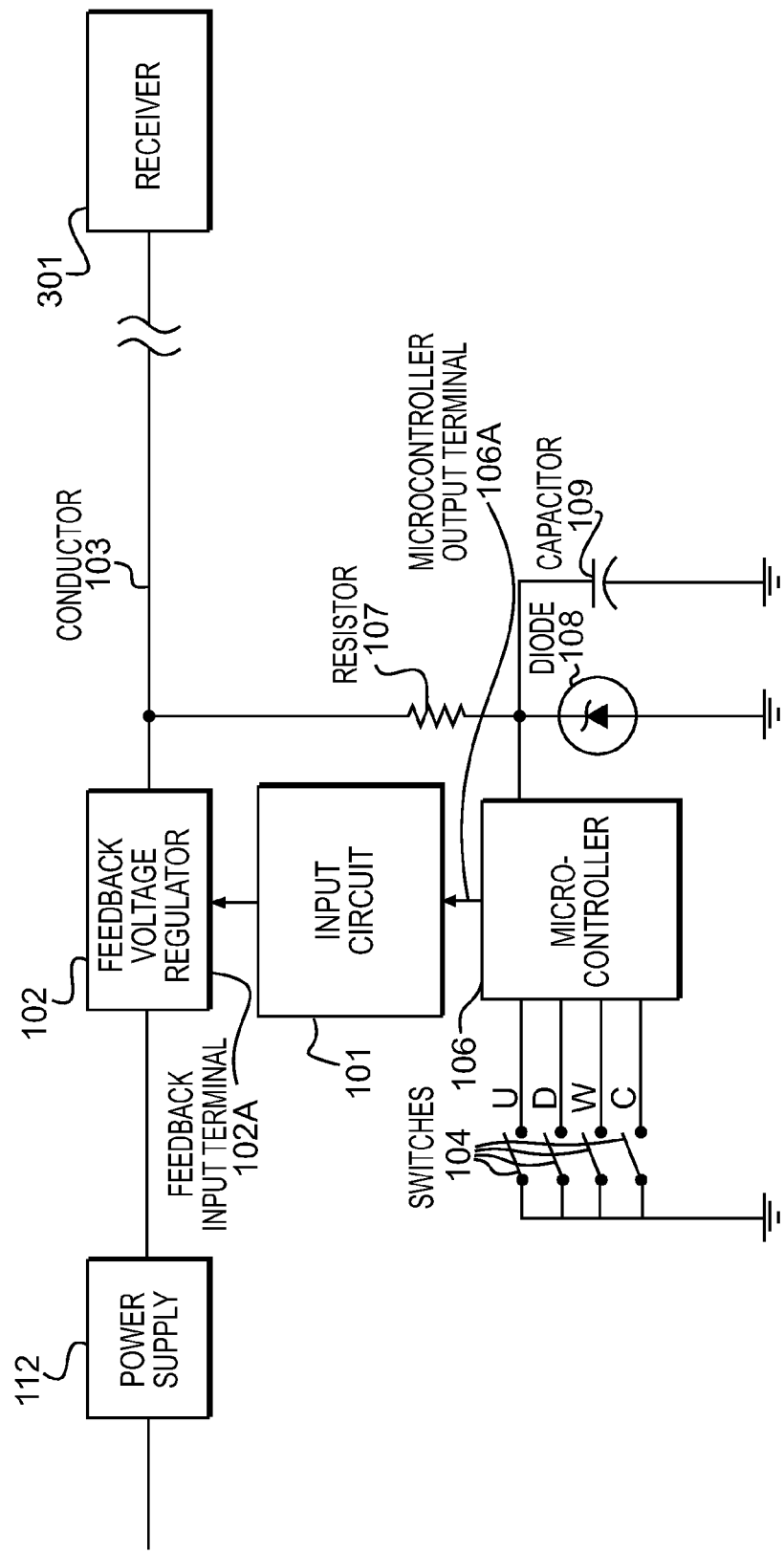
FIG. 2 is a schematic overview of a circuit that may be used to generate and transmit encoded signal sequences representing desired commands by modulating voltage on a DC power conductor used to provide DC power to a load to be controlled via commands from a controller.
Figure 3:
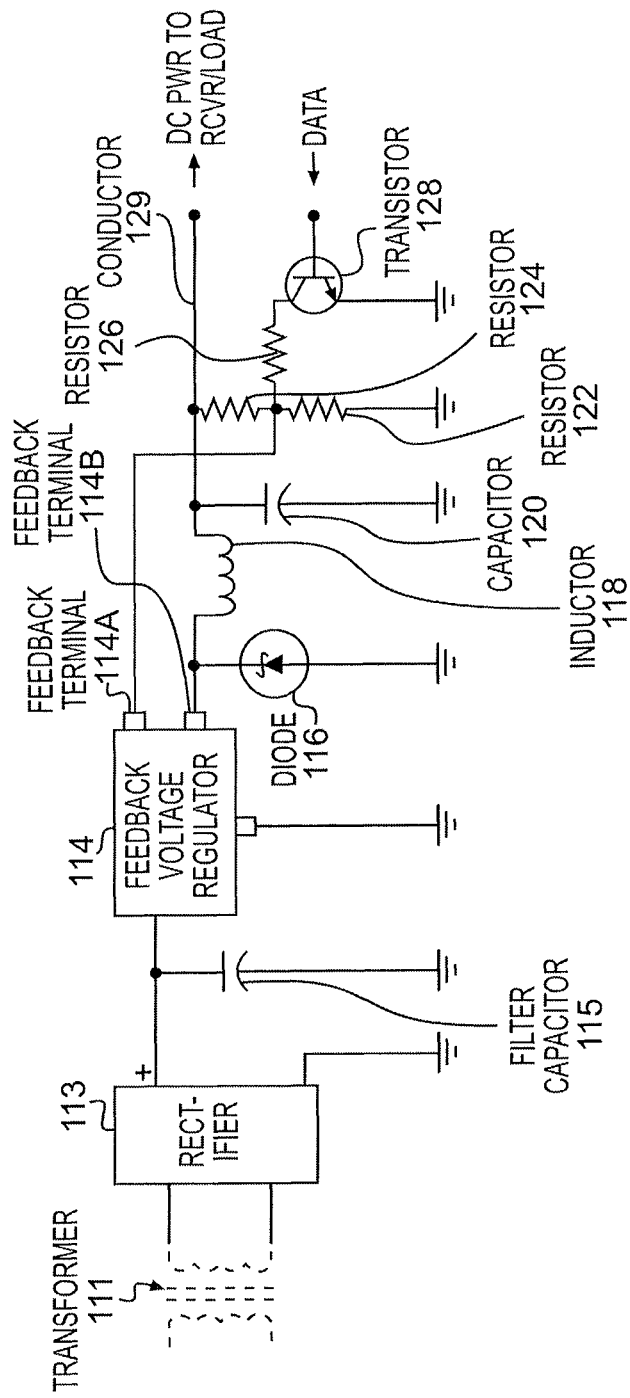
FIG. 3 is a schematic of another embodiment of a circuit that may be used to accept data, which may comprise control commands, and encode such data for transmission on DC power lines.

Examples of circuits used to implement an embodiment of a signal encoder using Method 1 for data transmission over power DC lines are shown in FIGS. 2 and 3. FIG. 2 is a schematic overview of a circuit that may be used to generate and transmit encoded signal sequences representing desired commands by modulating voltage on a DC power conductor used to provide DC power to a controlled device 300 to be controlled via commands from a controller 210. In FIG. 2, a conventional DC power supply 112 provides DC voltage to a feedback voltage regulator 102, such as a LM2592HV from National Semiconductor, which provides a regulated voltage output to a controlled device 300 including a receiver and command decoder 301 that receives, decodes, and implements responses to received commands. In this example, microcontroller 106 receives power via a circuit comprising resistor 107, Zener diode 108, and capacitor 109 selected to provide power to microcontroller 106 at an appropriate input power voltage for a selected microcontroller 106. Microcontroller 106 receives command inputs from a user via switches 104, which may be momentary contact switches, with each contact switch 104 coupled to a different input terminal to microcontroller 106 so that a momentary closure of one of contact switches 104 may be interpreted by software executing within microcontroller 106 to represent a desired input command from a user. In this example, each contact switch 104 input to microcontroller 106 may represent, for example, one of an Up ("U"), Down ("D"), Warmer ("W"), and Cooler ("C") command, depending upon which switch is pressed, where such commands are to be used to control intensity and color temperature of an LED light fixture. Such a circuit may employ pull-up resistors now available in many microcontrollers for each switch input circuit. In this example, momentary contact switches 104 may be individual independent switches or may be paired on simple rocker switches or on a multi-directional rocker switch so that "U" and "D" are paired on a simple rocker switch or on a direction (e.g., up and down or left and right) in a multi-directional switch, and "W" and "C" are paired on another rocker switch or direction.

Software within microcontroller 106 may employ an analog-to-digital sampling capability on selected microcontroller input circuits to detect closure of a particular switch, or software may use a simple state change on a microcontroller input to detect what switch has been closed, indicating which command (i.e., ASCII character code in this example) is to be encoded and transmitted. Software executing within microcontroller 106 may then use stored values for ASCII character code sequences corresponding to possible input commands (e.g., "U", "D", "W", or "C"), selectable via user closure of an input command switch 104, to retrieve and then use a selected ASCII character code sequence to turn on and off a microcontroller 106 output terminal 106A so as to generate pulses corresponding to a selected ASCII character code sequence and ASCII conventions for transmission of ASCII characters (i.e., start bit, followed by an 8 bit sequence for an ASCII character with least significant bit transmitted first, followed by a stop bit). Output terminal 106A is coupled to a feedback input terminal 102A on feedback voltage regulator 102 via an input circuit 101 selected so as to cause regulator 102 to momentarily increase and then decrease output voltage being supplied to receiver 301 in response to perceived voltage changes on input terminal 102A. Input circuit 101 may be similar, for example, to a data input circuit such as shown in FIG. 3 that includes transistor 128 (FIG. 3). Since the response time of a selected feedback voltage regulator 102 such as a LM2592HV from National Semiconductor is on the order of a few microseconds then the timing of variations in the output voltage closely resembles the ASCII code sequence used to derive microcontroller commands to drive microcontroller output terminal 106A coupled to input terminal 102A to feedback voltage regulator 102.

Figure 4A:
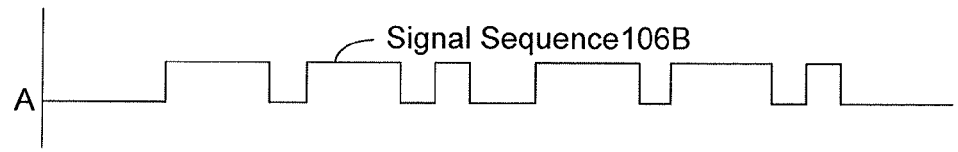
FIGS. 4A-4G generally represent exemplary signal sequences which may be transmitted in accordance with methods and systems consistent with the present invention.
Figure 4B:
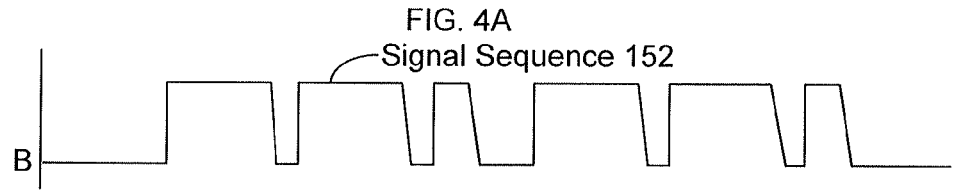
Figure 4C:
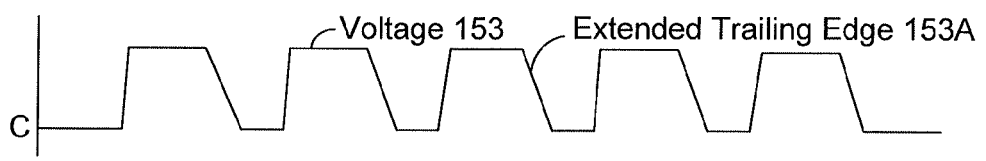
Figure 4D:
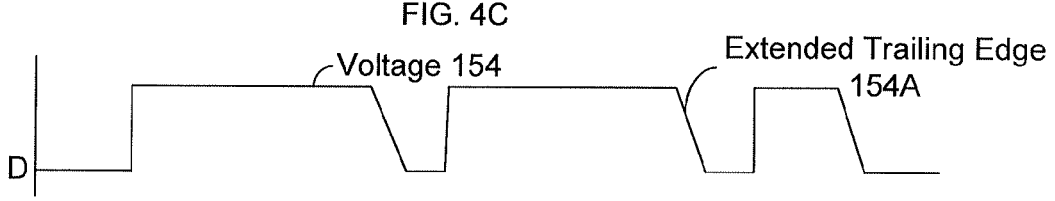
Figure 4E:
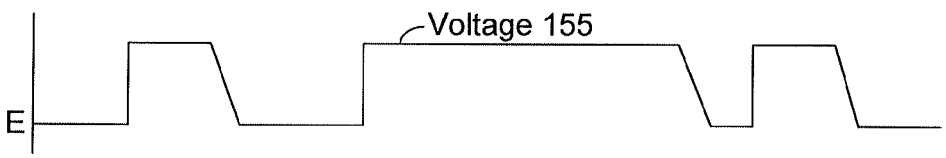
Figure 4F:
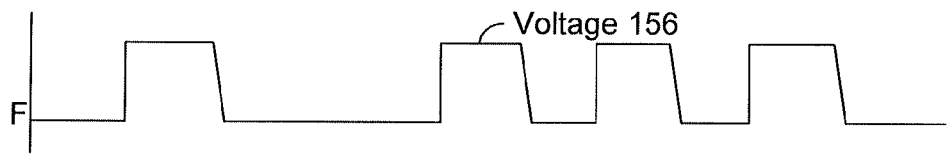
Figure 4G:
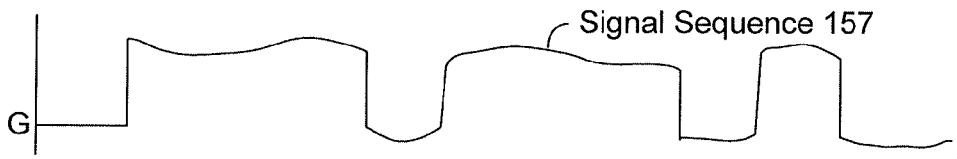

FIG. 4A illustrates a representative signal sequence 106B transmitting, twice, a typical ASCII code sequence (for the letter "D" in this example) such as may be generated at microcontroller 106 output terminal 106A by software executing in microcontroller 106 in response to a user pressing and briefly holding a momentary contact switch 104 coupled to a "D" input terminal on microcontroller 106. In this example, where little or no delay is imposed (e.g., at step 141, FIG. 5) between sampling of input contacts, two transmissions of an ASCII signal sequence for a "D" occur. FIG. 4B illustrates a representative signal sequence 152 representing two transmissions of an ASCII code sequence for a "D" that may be impressed on conductor 103 (FIG. 2) by feedback voltage regulator 102 as a result of injection of signal sequence 106B to input terminal 102A via input circuit 101. FIGS. 4C, 4D, 4E, and 4F illustrate representative voltage modulation signal sequences 153, 154, 155, 156 impressed on conductor 103 in response to injection of corresponding ASCII signal sequences for characters "U", "D", "C", and "W", respectively, from microcontroller 106 to feedback input terminal 102A on voltage regulator 102 via input circuit 101. The time scale used in FIGS. 4C, 4D, 4E, and 4F is different from a time scale used in FIGS. 4A and 4B. Signal sequences 153, 154, 155, 156 are representative of oscilloscope traces recorded from conductor 103 when receiver 301 and its associated load are operating at a relatively low percentage of maximum power level. Signal sequence 157 (for an ASCII "D") in FIG. 4G is representative of a scope trace recorded from conductor 103 when receiver 301 and its associated load are operating at close to maximum power levels, thus drawing significantly more current and causing some distortion due to ripple now visible in voltage levels output from voltage regulator 102. Power supply 112, regulator 102, and associated components may be selected to reduce such ripple and distortion of signal sequences, but signal detection and decoding algorithms may also be selected or designed and implemented in receiver 301 to deal with such distortion of signal sequences, as discussed later herein. Higher frequency noise, not captured in illustrations of scope traces in FIGS. 4B through 4G, may also be present.

As noted earlier herein, various conventional or customized code sequences may be used to transfer information using communications methods and apparatus consistent with the present invention. In example embodiments shown in FIGS. 2 and 3 which may use ASCII character signal sequences to transfer information, symbol sequences used to drive voltage regulator 102 (FIG. 2) or voltage regulator 114 (FIG. 3) in order to modulate voltage on power lines and transmit data to a receiver may be generated using a standard UART (Universal Asynchronous Receiver/Transmitter) or USART (Universal Synchronous/Asynchronous Receiver/Transmitter) function that may be implemented in either hardware or software. An ATtiny13A microcontroller (from ATMEL's AVR family) that is used in one embodiment (e.g., microcontroller 106, FIG. 2) of a control signal encoder circuit has no internal hardware UART or USART circuit, so this function may be implemented in software using well-known conventional algorithms and coding techniques. Other members of ATMEL's AVR microcontroller family that may be used, such as an ATmega16, do have internal hardware implementations of a USART circuit which may be used to generate ASCII character signal sequences, although a software version or a UART or USART could also be used even in such a microcontroller, whether or not a hardware circuit is available. Thus, a microcontroller or hardware UART or USART are examples of devices that may also be used to supply ASCII character signal sequences to transistor 128 in an example embodiment in FIG. 3, described in further detail below.

FIG. 3 is a schematic of another embodiment of a circuit that may be used to accept data, which may comprise control commands, and encode such data for transmission on DC power lines. In an example embodiment illustrated in FIG. 3, power may be supplied to feedback voltage regulator 114 via transformer 111, rectifier 113, and filter capacitor 115. Some embodiments may provide power without use of a transformer 111. Via a conventional inductor 118 and capacitor 120 filter circuit, and Schottky diode 116, voltage regulator 114 provides DC power voltage via conductor 129 to a data receiver, decoder and controller unit or assembly of the instant invention and thence to a load to be controlled. Data to be transmitted may be input via transistor 128 and resistor 126 via a voltage divider comprising resistors 124, 122 selected to provide a voltage range suitable for input into feedback terminal 114A of feedback voltage regulator 114. Input data may be ASCII character codes, as described and illustrated earlier herein, or other digital data to be transmitted via DC power voltage conductor 129. As noted earlier, response of feedback voltage regulator 114 to voltage changes at feedback terminal 114A caused by data introduced at transistor 128 will result in modulation of power supply voltage in a manner that can be detected and decoded by a receiver, decoder, and controller unit. Representative signal sequences for data input at transistor 128 and resulting data modulated onto power voltage supplied via conductor 129 are similar to signal sequences illustrated in FIGS. 4A and 4B, respectively.

Figure 5:
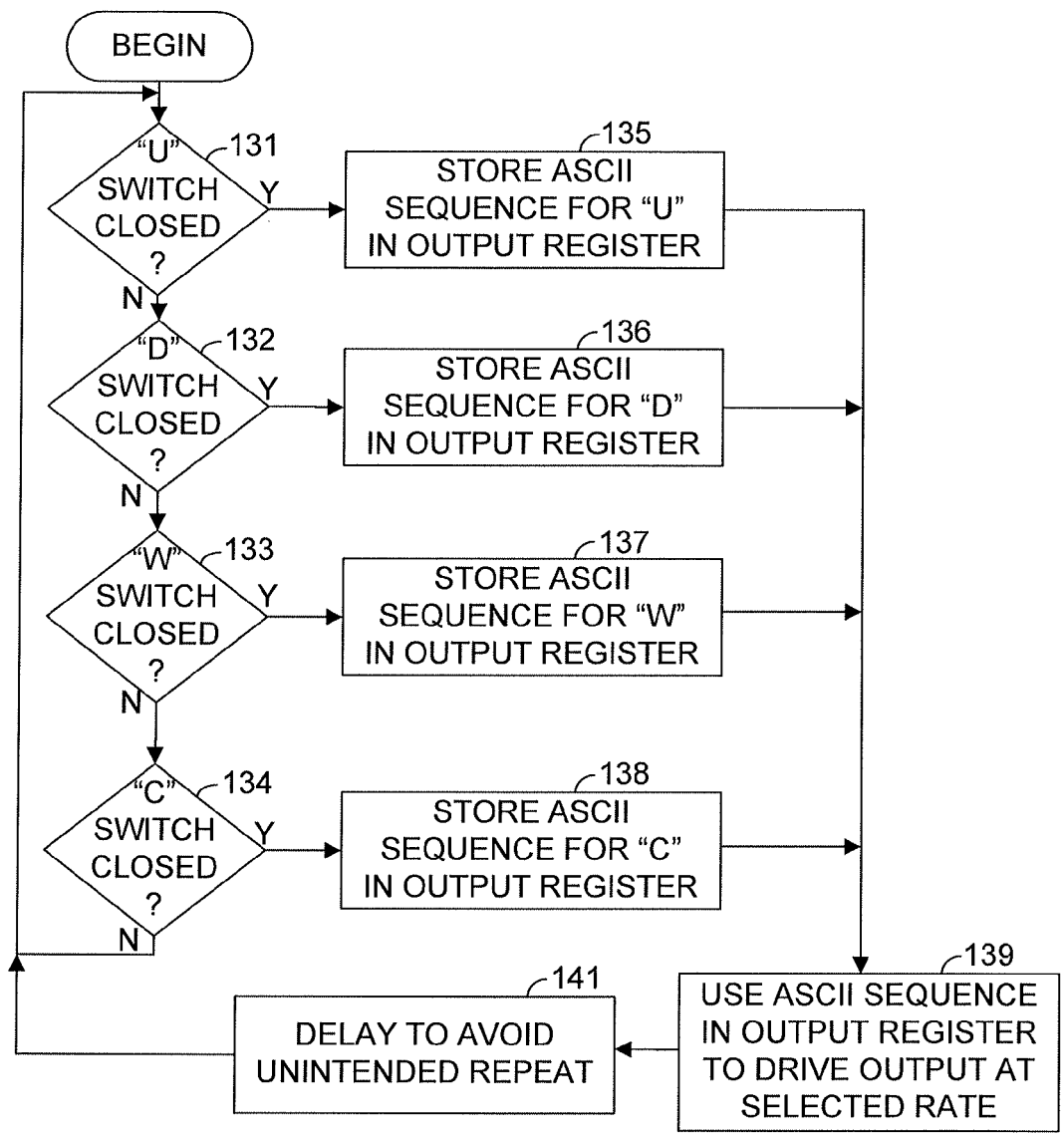
FIG. 5 illustrates an exemplary embodiment of software which may be installed and executed on a microcontroller to respond to closure of a selected momentary contact switch by a user and generate appropriate ASCII character signal sequences in response to such closure.

FIG. 5 illustrates a flowchart representing steps performed by portions of software that may be installed and executed on microcontroller 106, in an example embodiment in FIG. 2, to respond to closure of a selected momentary contact switch 104 by a user and generate appropriate ASCII character signal sequences in response to such closure of one of switches 104. In FIG. 5, when energized, microcontroller 106 (FIG. 2) begins executing a software loop that consistently checks input terminals at steps 131, 132, 133, 134 ("U" Switch Closed, "D" Switch Closed, "W" Switch Closed, or "C" Switch Closed; respectively) to determine if one of switches 104 has been closed by a user. Switches 104 correspond to an Up ("U") or Down ("D") command to increase or decrease light intensity, respectively, or a Warm ("W") or Cool ("C") command, to change color intensity. In this example code, when a closed switch is detected, a bit sequence for a corresponding ASCII character is generated or retrieved from memory at one of steps 135, 136, 137, 138 (store ASCII sequence for "U," "D," "W," or "C" respectively in output register) corresponding to a closed switch and used to control a microcontroller output sequence. A conventional routine may then be called, at step 139, that uses such stored bit sequence for a selected ASCII character to drive a microcontroller output terminal so as to create a corresponding ASCII character signal sequence at a selected baud rate at microcontroller output terminal 106A (FIG. 2). For many applications, a conventional baud rate of 110 symbols per second is adequate, but a faster or slower baud rate may also be used, depending upon application requirements and overall circuit design. In examples illustrated in FIGS. 4C through 4G, a Non-Return-to-Zero, Inverted (NRZI) modulation technique is used, but other conventional or customized modulation techniques could also be used. After a signal sequence (including start and stop bits) corresponding to a selected command (i.e., "U", "D", "W", "C") has been transmitted, an additional delay may be added at step 141 before returning control to a loop that checks for closed switches. A delay interval imposed at step 141 may be selected to give a user an opportunity to release a switch to prevent unintended repeats of a selected command.

Figure 6:
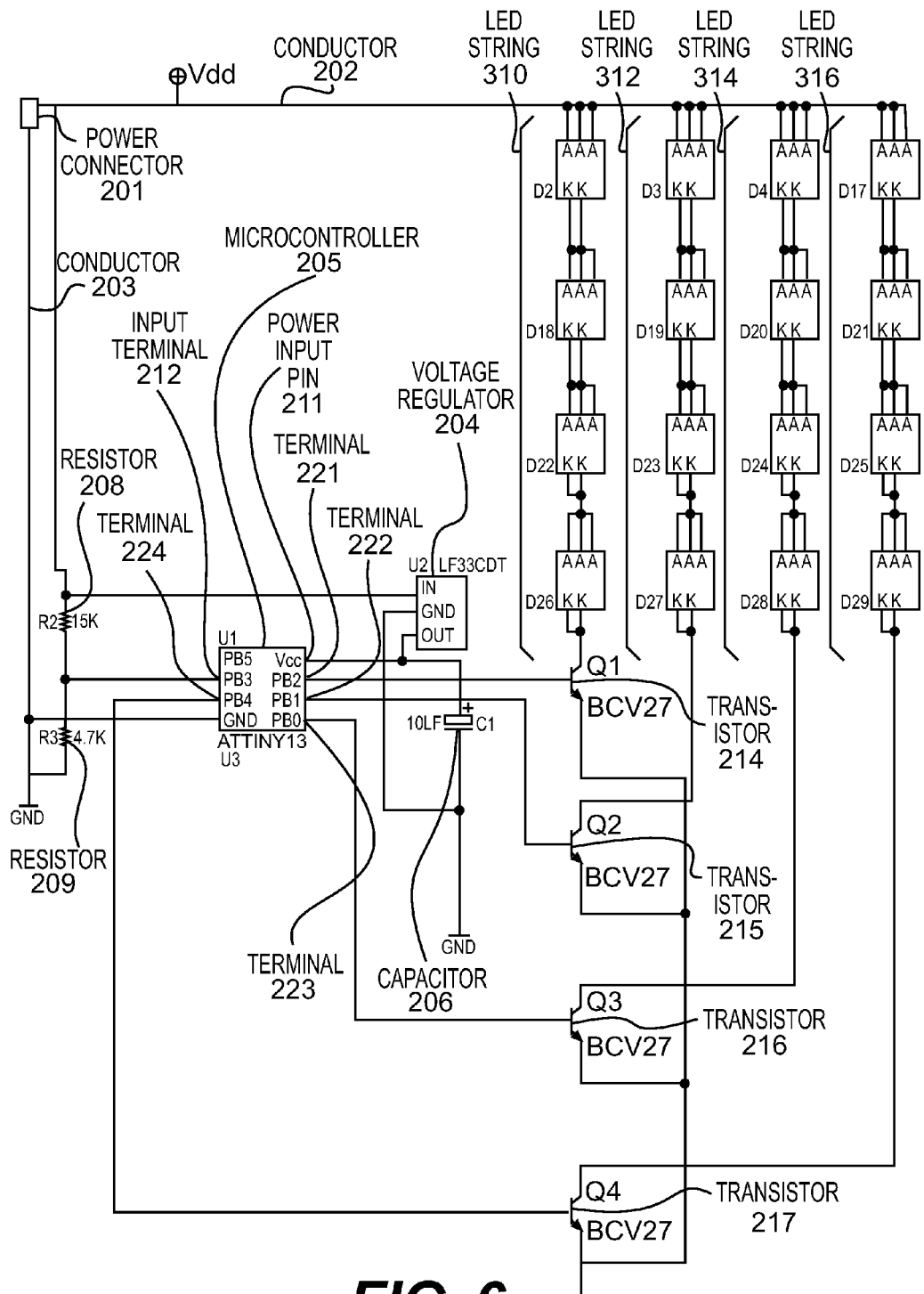
FIG. 6 is a schematic of an example of a circuit to detect and decode data modulations created by circuits such as those illustrated in FIGS. 2 and 3 when received over a DC power line, and also issue control signals in response to decoded commands.

FIG. 6 is a schematic of an example of a circuit that may be used to detect and decode data modulations created by circuits such as those illustrated in FIGS. 2 and 3 when received over a DC power line, and also issue control signals in response to decoded commands. Generally, such a circuit may be implemented using a microcontroller located in a vicinity of a controlled device 300 to be controlled in response to commands transmitted over power lines. In FIG. 6, a DC power supply voltage, modulated with data as described earlier herein and in descriptions of FIGS. 2 and 3, enters via power connector 201, with a positive supply voltage supplied to conductor 202, and ground return being via conductor 203. Voltage regulator 204 and capacitor 206 provide regulated supply voltage to power input pin 211 of microcontroller 205, which may be an ATtiny13A microcontroller from ATMEL AVR product line, or a similar microcontroller, from another vendor, having integral analog-to-digital sampling capability on at least one input terminal. Some embodiments may employ a separate microcontroller or other electronic device to provide an analog-to-digital converter capability, and such separate device may then be coupled to microcontroller 205 (e.g., via a microcontroller 205 port configured to receive serial data) to provide results of A/D samples to software executing on microcontroller 205. Resistors 208 and 209 comprise a voltage divider, with resistance values selected to reduce voltage supplied via conductor 202 to a voltage range compatible with an input terminal 212, which has analog-to-digital sampling capability, on microcontroller 205.

Figure 7A:
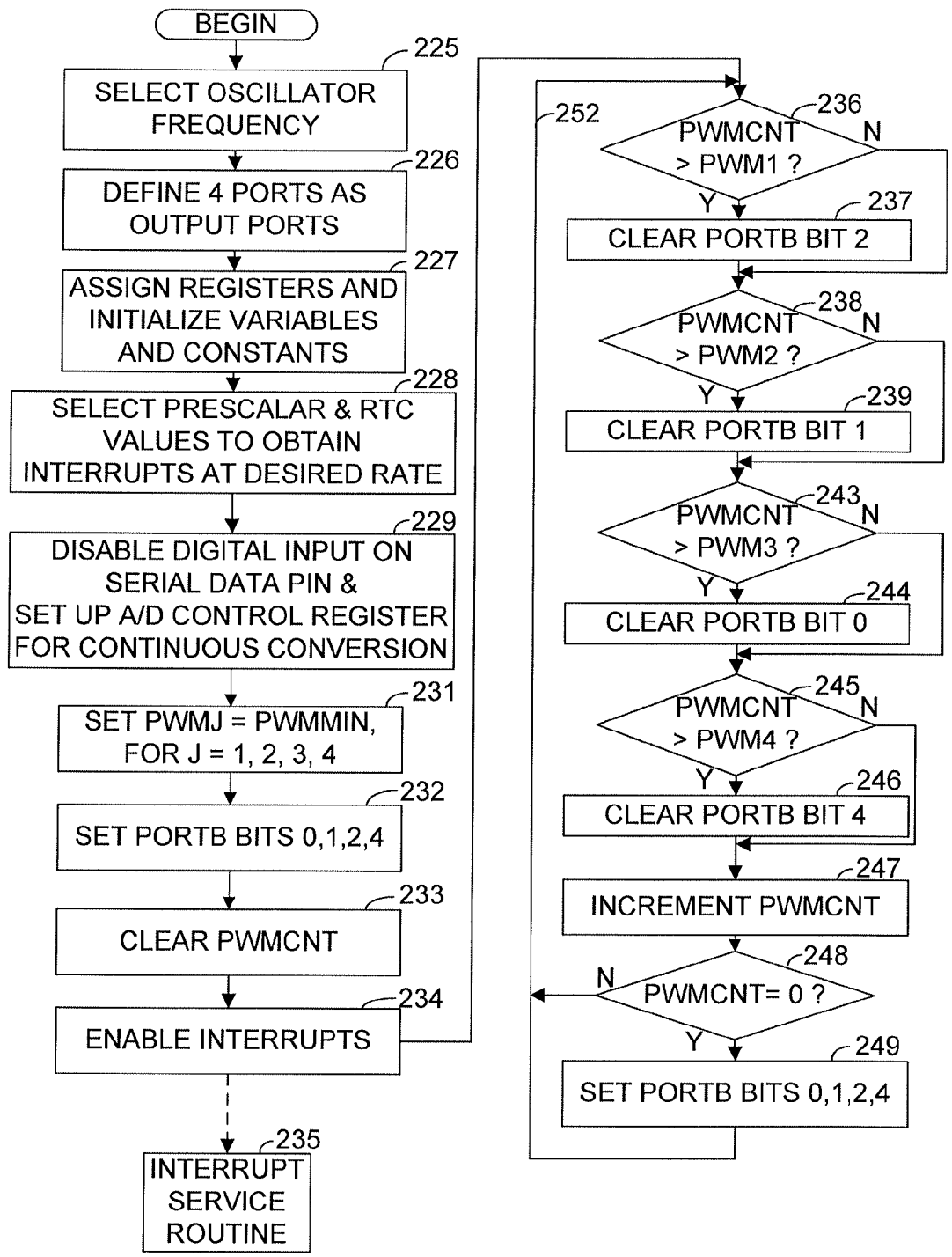
FIGS. 7A and 7B illustrate exemplary embodiments of software step which may be implemented in a microcontroller in order to detect and decode modulations on a DC power conductor, which modulations represent data transmitted from an encoding circuit.
Figure 7B:
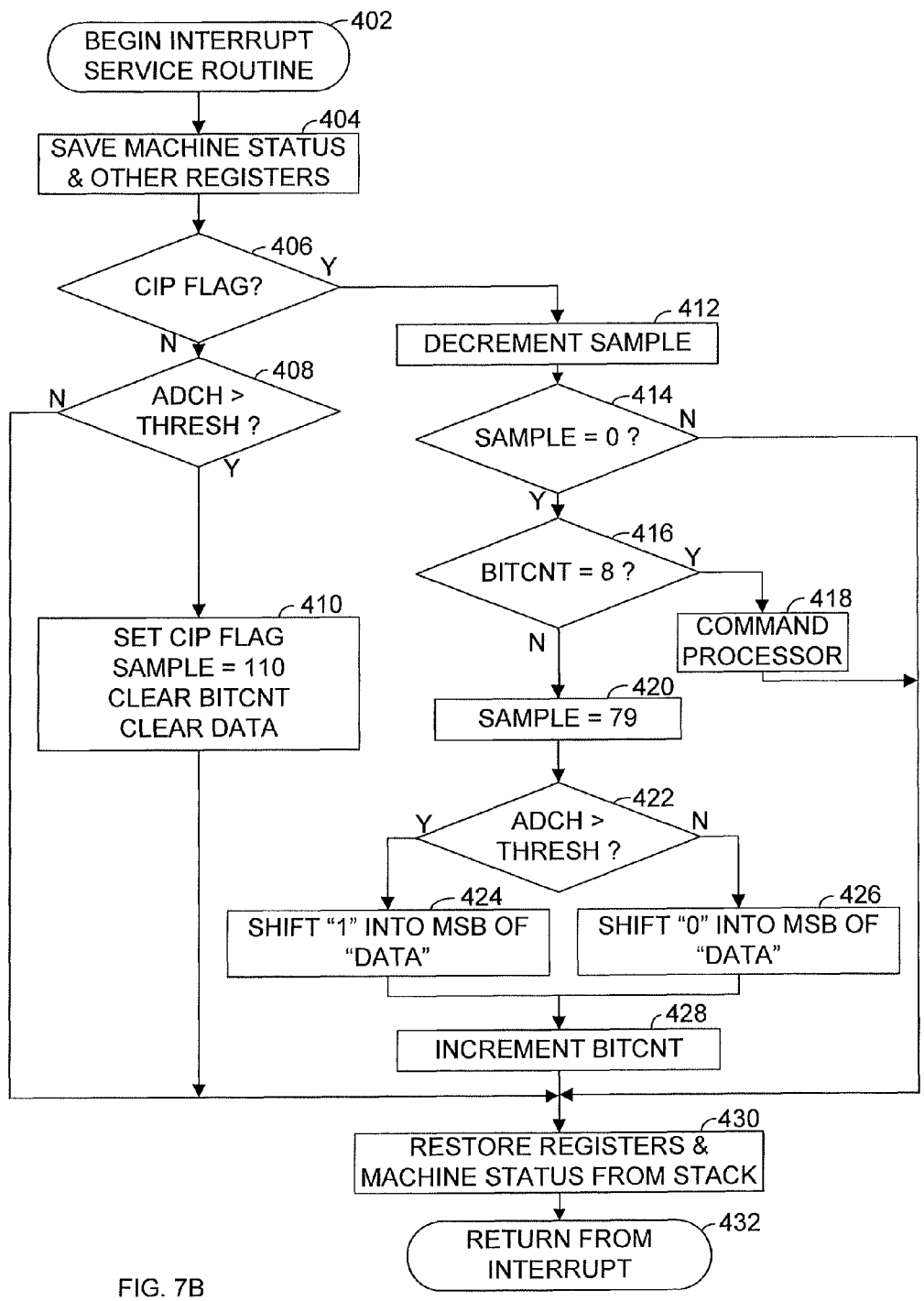

FIGS. 7A and 7B depict flowcharts of steps in methods in which, in normal operation, microcontroller 205 may be programmed to sample voltage levels at input terminal 212 at a rate sufficient to detect voltage levels and changes representing individual data bits received via power conductor 202. In this example, after data representing a code sequence for an ASCII character have been sampled and decoded, other software routines executing within microcontroller 205 use a value of a decoded ASCII character to identify and implement appropriate control responses. In an example circuit illustrated in FIG. 6, there are four strings 310, 312, 314, 316 of high output LEDs, with each string comprising four LEDs. LEDs within one string may all have one color temperature, but LEDs in each string may have a different color temperature from LEDs in another string. LEDs having different color temperatures available from various manufacturers including, for example, LEDs of a GM5SAExxP0A series, manufactured by Sharp. For example, string 310 may comprise four Sharp GM5SAE27P0A LEDs wired in series, with each LED having a color temperature of approximately 2700 degrees Kelvin. String 312 may comprise four Sharp GM5SAE35P0A LEDs wired in series, with each LED having a color temperature of approximately 3500 degrees Kelvin. String 314 may comprise four Sharp GM5SAE45P0A LEDs wired in series, with each LED having a color temperature of approximately 4500 degrees Kelvin. String 316 may comprise four Sharp GM5SAE65P0A LEDs wired in series, with each LED having a color temperature of approximately 6500 degrees Kelvin. While four strings of LEDs each having four white LEDs of different spectral output are disclosed, it should be apparent that more or fewer LEDs in the strings may be used, as where more or less light intensity is desired, and more or fewer strings of LEDs of different temperatures may be used, such as where finer or less fine spectral control of white light is desired. Further, as noted elsewhere herein, red LEDs may be used in one string, green LEDs used in a second string, and blue LEDs used in a third string, so that spectral output may be varied across the spectrum using the techniques disclosed herein. In this instance, the discrete LEDs may be arranged in groups of red, green and blue within a light fixture in order to more uniformly mix the light output of each. Likewise, a light fixture having the aforementioned strings of white LEDs of differing temperature may have the discrete LEDs of differing temperature grouped so as to produce a more uniform mixture of white light. In any of these light fixtures, an optical element may be oriented in front of the groups of LEDs in order to further combine the light output from the LEDS prior to directing the light to a desired location. It should also be noted that circuitry as shown in FIG. 6 may be incorporated in a replacement light fixture for replacement of a DC lamp in a DC lighting circuit, with control switches and microcontroller, such as shown in FIG. 2, installed in the DC line at a remote location from which the replacement light fixture is controlled by a user.

Current flow through each string 310, 312, 314, 316 of LEDs is controlled by its associated transistor 214, 215, 216, 217, respectively. Each transistor 214, 215, 216, 217 is independently controlled by separate signals output from each of four separate terminals 221, 222, 223, 224 on microcontroller 205. In the example embodiment presented in FIG. 6 and in associated software flowcharts presented in FIGS. 7A, 7B, and in FIGS. 8A, 8B, 8C, 8D, and 8E, this circuit arrangement and software permits independent control of light intensity and color temperature from a light fixture that may include all of the LEDs illustrated in FIG. 6. This independent control of overall intensity and color temperature is achieved by using appropriate control software executing in microcontroller 205 to independently control, via pulse width modulation, an effective duty cycle of current flowing through each separate string 310, 312, 314, 316 of LEDs, which thus controls apparent relative intensity of light emitted by each string of LEDs. Independent control of intensity of light from each string of LEDs thus includes a capability to vary the apparent relative intensity of light having different spectral content from each string, which then controls perceived color temperature of light emitted from a light fixture that includes LEDs of different color temperature as illustrated in FIG. 6.

FIGS. 7A and 7B represent flowcharts that illustrate steps performed by exemplary software that may be implemented in microcontroller 205 (FIG. 6) in order to detect and decode modulations on DC power conductor 202 (FIG. 6) representing data transmitted from an encoding circuit, such as illustrated in FIG. 2 or FIG. 3. Flowcharts in FIGS. 7A and 7B also include portions of software that may be implemented in microcontroller 205, together with additional software represented in flowcharts illustrated in FIGS. 8A through 8E, to provide control signals responsive to such commands. In an example illustrated in FIGS. 7A and 7B, and in FIGS. 8A through 8E, microcontroller 205 provides separate control of intensity and color temperature in response to commands (e.g., "U", "D", "W", and "C") transmitted over DC power conductor 202.

Referring to FIGS. 7A and 7B, in some implementations, software executing within microcontroller 205 (FIG. 6) performs at least two functions. One function is receiving and decoding signals modulated onto power conductor 202 and using information in decoded signals to modify contents of registers associated with variable names PWM1, PWM2, PWM3, and PWM4 and used to control pulse widths of signals generated by microcontroller 205 and provided to transistors 214, 215, 216, 217 (FIG. 6), respectively, that control flow of current through, and hence duty cycle of, each of four different strings of LEDs. This function is described primarily in flowcharts in FIG. 7B and FIGS. 8A through 8E. Another function of software executing within microcontroller 205 establishes a software loop to generate pulse width modulated control signals from terminals 221, 222, 223, 224 (FIG. 6) that control flow of current through LED strings 310, 312, 314, 316 in a cyclic manner. In this example embodiment, all four LED strings are energized at a beginning of each cycle, and a percentage of each cycle duration that each separate LED string remains energized is controlled by a value in a PWM variable (e.g., PWM1, PWM2, PWM3, PWM4) assigned to each string. A cycle repetition rate is typically selected to be high enough that there is no perceptible flicker for humans. This control function is described primarily in a flowchart in FIG. 7A, as described in more detail below.

Referring to FIG. 7A, an oscillator frequency for microcontroller 205 is selected at step 225. Candidate microcontrollers from vendors noted herein and other sources typically allow selection of oscillator frequency either manually or via software. Oscillator frequencies of 10 MHz to 20 MHz are common in currently produced microcontrollers. Microcontrollers such as ATMEL's AVR ATtiny13A also permit microcontroller ports to be user defined via software as input ports or output ports. Thus, in an example embodiment, four ports of microcontroller 205 (FIG. 6) are defined to be output ports at step 226. At step 227, register assignments are made and variables and constants are defined and initialized. At step 228, a prescalar value or configuration is selected, along with a value of a variable called RTC, which together are used to generate clock-driven interrupts at a desired rate. In some embodiments, a tap on a prescalar register is used to provide a clocking signal divided down from an oscillator frequency, which may be used to increment another register to overflow (e.g., an 8-bit TCNT0 register in an ATtiny13A embodiment), whereupon a clock-driven interrupt may be generated. A value of RTC may be selected typically to provide multiple interrupts (e.g., 10 or more, up to a few hundred) during a symbol period for a selected baud rate (e.g., 110 baud). Baud rates may be selected based upon latency and other considerations for a particular control or data transmission application.

Interrupts at a rate established as above are used to periodically sample a value in a high register (i.e., register holding higher order bits from a 10 bit conversion used in this example) of an analog-to-digital converter configured at step 229 to determine if input voltage at an input terminal of microcontroller 205, configured at step 229 as an analog input terminal, has exceeded a threshold value, possibly indicating a beginning of a start bit for an ASCII character signal sequence modulated onto power conductor 202. In an example embodiment, values of PWM1, PWM2, PWM3, and PWM4, which are variables used for software control of pulse width modulation, are optionally set at step 231 to a desired minimum value, PWMMIN, which may be selected to cause LEDs, as in this example, to illuminate to a human perceptible level when a lighting circuit is energized. At step 232, selected bits in a register used to control microcontroller 205 output ports are optionally set high so as to turn on those ports defined earlier (step 226) as output ports (e.g., bits 0,1,2,4 in PORTB register in an example embodiment using an ATMEL AVR ATtiny13A microcontroller). At step 233, a value of a loop counter PWMCNT is set to zero. PWMCNT is used as a loop counter for a software loop 252 used to cyclically turn LED strings on or off responsive to a value of a PWM variable (e.g., PWM1, PWM2, PWM3, and PWM4) associated with each string. Interrupts are enabled at step 234, and microcontroller 205 enters an operational mode wherein software loop 252 beginning at decision step 236 may be periodically interrupted by an interrupt service routine responding to interrupts generated as described as above. As noted, software loop 252 is used to cyclically turn strings of LEDs on or off according to independent pulse width modulated durations for each string, as explained in more detail below. An interrupt service routine, depicted in flowcharts in FIG. 7B and FIGS. 8A through 8E, detects and decodes commands (e.g., "U", "D", "C", "W") transmitted over power conductor 202 (FIG. 6) and responds to received commands by modifying contents of variables (e.g., PWM1, PWM2, PWM3, PWM4) used within software loop 252 (FIG. 7A) to control duty cycles of LED strings via pulse width modulation. As noted earlier, microcontroller output ports (ports 0, 1, 2, 4 in this example) are optionally energized at step 232 prior to entering software loop 252.

In software loop 252 (FIG. 7A), a comparison is made, at a decision step for each LED string (e.g., step 236 "PWMCNT>PWM1?," step 238 "PWMCNT>PWM2?," step 243 "PWMCNT>PWM3?," or step 245 "PWMCNT>PWM4?"), to determine if a current value of loop counter PWMCNT exceeds a value of a pulse width control variable (e.g., PWM1, PWM2, PWM3, PWM4) used to control pulse width duration for a particular LED string. When PWMCNT has been incremented sufficiently during multiple passes through software loop 252 so as to exceed a value of a pulse width control variable for a particular LED string at a decision step (e.g., step 236 "PWMCNT>PWM1?," step 238 "PWMCNT>PWM2?," step 243 "PWMCNT>PWM3?," or step 245 "PWMCNT>PWM4?"), a corresponding statement (e.g., at step 237 "CLEAR PORTB BIT 2," step 239 "CLEAR PORTB BIT 1," step 244 "CLEAR PORTB BIT 0," or step 246 "CLEAR PORTB BIT 4," respectively) is executed that clears a corresponding bit for that string in a port control register, thereby de-energizing a corresponding output port (e.g., terminal 221, 222, 223, 224, FIG. 6, respectively) on microcontroller 205, and thus interrupting flow of current through a corresponding LED string, via a corresponding transistor (e.g., in FIG. 6, one of transistors 214, 215, 216, 217, respectively) for a duration of a power control cycle. Duration of a power control cycle is controlled, in an example embodiment, by overflow of a register (e.g., an 8-bit register) used for variable PWMCNT. PWMCNT is incremented during each pass through software loop 252 at step 247. If a test at step 248 determines that counter overflow has occurred (i.e., PWMCNT=0), then control passes to step 249 where bits 0, 1, 2, and 4 are set in port control register PORTB, thereby raising each of four output ports (e.g., assigned via step 226) to high value, and thus restoring power, for the next power control cycle, to each LED string via a corresponding transistor. Program control then returns, via loop 252, back to decision step 236.

While most of the operational time of microcontroller 205 will generally be spent in software loop 252, FIG. 7A, clock driven interrupts, generated by dividing oscillator frequency down via prescalar tap selection and periodic overflow of another register (e.g., TCNT0 in an ATtiny13A microcontroller), are used to trigger an interrupt service routine (step 235) which, in an example embodiment, samples a register, ADCH, holding higher order bits of a 10-bit output of an analog-to-digital converter configured to continuously sample voltages appearing at an input terminal 212 of microcontroller 205.

Referring to FIG. 7B, when a clock driven interrupt is generated as described above, an interrupt service routine beginning at an entry point, step 402, saves on a memory stack, at step 404, machine status and registers that may be changed during interrupt processing. At step 406, a command in progress (CIP) flag is checked to determine if a possible start bit has already been detected and is currently being processed. If not, contents of an ATtiny13A register, ADCH, associated with an analog-to-digital converter integrated with input terminal 212 of microcontroller 205, are compared with a threshold value to determine if voltage has increased sufficiently to be a possible start bit of an ASCII character sequence. (Register ADCH, in some embodiments, may be configured to hold higher order bits from a 10-bit analog-to-digital conversion.) In an example embodiment, such analog-to-digital converter may be configured for continuous sampling, which, for an ATtiny13A microcontroller, may provide a sample rate in excess of 10,000 samples per second. If a value of ADCH does not exceed a threshold value (THRESH), then registers and machine status saved at step 404 are restored at step 430 in preparation for a return to processing that was interrupted.

If a value of ADCH exceeds THRESH, then a set of steps are performed in step 410 to prepare for possible reception of an ASCII character signal sequence (or, in some embodiments, a signal sequence for another command code used in addition to or instead of ASCII character signal sequences). Preparation steps in step 410 include setting a command in progress (CIP) flag to indicate that possible reception of a start bit for an ASCII character sequence (another command code). A value of 110 is assigned to variable SAMPLE. SAMPLE is a variable that may be used to determine when a subsequent value in ADCH will be compared to threshold value THRESH. SAMPLE is decremented upon each pass through clock driven interrupt service routine and provides, in effect, a countdown timer used to determine when a value in ADCH is sampled and compared to THRESH again. A value assigned to SAMPLE in step 410 may be selected based upon clock driven interrupt rate and data transmission rate (i.e., baud rate) so that a value in ADCH is checked at a time that may typically be approximately 70 to 90 percent of a bit period for a first data bit following a start bit in a typical ASCII character signal sequence. Setting a delay so that line voltage (i.e., value in ADCH) is sampled during a latter portion of each bit period is desirable to permit time for line voltage to return to a lower level after a transmitted value is changed from a higher to lower level (e.g., see typical modulated power line waveforms 153, 154 in FIGS. 4B, 4C, respectively received at terminal 212 of microcontroller 205 in FIG. 6, wherein an extended trailing edge 153A, 154A is present after a transition from a transmitted "1" to a "0"). Benefits of a delay in sampling voltage to a latter portion of a bit period are also illustrated by waveform 157 in FIG. 4G which shows distortion when load currents begin to affect voltage delivered by a marginal power supply. Thus, a value assigned to SAMPLE in step 410 may be selected to be approximately equal to 1.75 times a number of interrupts during a bit period for a selected baud rate and a selected interrupt rate. A value of 1.75 would offset a subsequent check of ADCH by a time interval approximately equal to a remaining period of a start bit (after ADCH first exceeds THRESH) plus approximately three-quarters of a period of a following first data bit in an ASCII character signal sequence. (Value of SAMPLE is reassigned in step 420 to approximately match a selected bit rate so that checks of ADCH after a first bit are made at approximately a same portion of a bit duration.) Additional steps performed in step 410 include clearing a variable (BITCNT) used to count bits received in processing subsequent interrupts, and clearing another variable (DATA) used to accumulate store values of bits received during processing of subsequent interrupts. After processing steps in step 410 is completed, registers and machine status is restored from the stack at step 430 before returning from the interrupt at step 432.

In servicing a subsequent interrupt, after machine status and registers are saved in step 404, if CIP FLAG is determined to be set when tested at step 406, then control passes to step 412, where SAMPLE is decremented. Control then passes to decision step 414 to determine if a value of SAMPLE has reached zero (indicating completion of a countdown period governed by SAMPLE and an interrupt rate, as explained above). If SAMPLE has not reached zero, then no further actions are needed in processing this particular interrupt, so registers and machine status are restored at step 430 and processing control is returned from interrupt at step 432. On a subsequent interrupt, when CIP FLAG has been set, and value of SAMPLE has reached zero when checked at step 414, then another test is performed at step 416 to determine if BITCNT has reached a value of 8. If not, processing proceeds to step 420, where, in this example, a value of 79 is assigned to SAMPLE. A value assigned to SAMPLE at step 420 may typically be selected, based on interrupt rate and baud rate as explained earlier, so that elapsed time before a subsequent check of ADCH will be approximately equal to a bit period, and a subsequent check of ADCH will be performed at approximately 70% to 90% of a duration of a bit period. After a value of 79 is assigned to SAMPLE, then processing continues to step 422, where a current value of ADCH is compared with a value of THRESH. If a value of ADCH exceeds a value of THRESH, it is determined that a "1" was received during that bit period, and at step 424 a "1" is shifted into a most significant bit (MSB) position of a register used to store a value for a DATA variable. If a value of ADCH does not exceed THRESH at decision step 422, then it is assumed a "0" was received during that bit period, and, at step 426, a "0" is shifted into an MSB position of an 8-bit register used to store a value for DATA. After DATA is updated with a "1" or "0" processing continues to step 428 where BITCNT is incremented. Registers and machine status are restored at step 430 in preparation for a return from interrupt at step 432. This logic path is repeated on subsequent interrupts until, in some implementations, all 8 bits in an ASCII character sequence have been received and the value of each bit (i.e., a "1" or a "0") have been shifted into an most significant bit (MSB) position of a DATA register. Note that since the least significant bit is transmitted first in an ASCII character sequence, shifting each bit into MSB of DATA, with other bits shifted toward an LSB position, bits in DATA are arranged in proper order for an ASCII character after all eight bits have been received. In servicing a subsequent interrupt, where CIP FLAG is still set, SAMPLE is again decremented in step 412 and compared to zero in step 414. If SAMPLE is not equal to zero in step 414, processing continues to decision step 416, where a check is made to determine if BITCNT has reached a value of "8", indicating that all bits in an ASCII character sequence have been received. If BITCNT is equal to "8", then processing proceeds to step 418, where a call is made to a COMMAND PROCESSOR routine, as described in association with FIGS. 8A through 8E, which uses the bit sequence stored in DATA to determine which command was received, and which also implements changes in values of PWM variables (i.e., PWM1, PWM2, PWM3, PWM4) responsive to a received command.

Figure 8A:
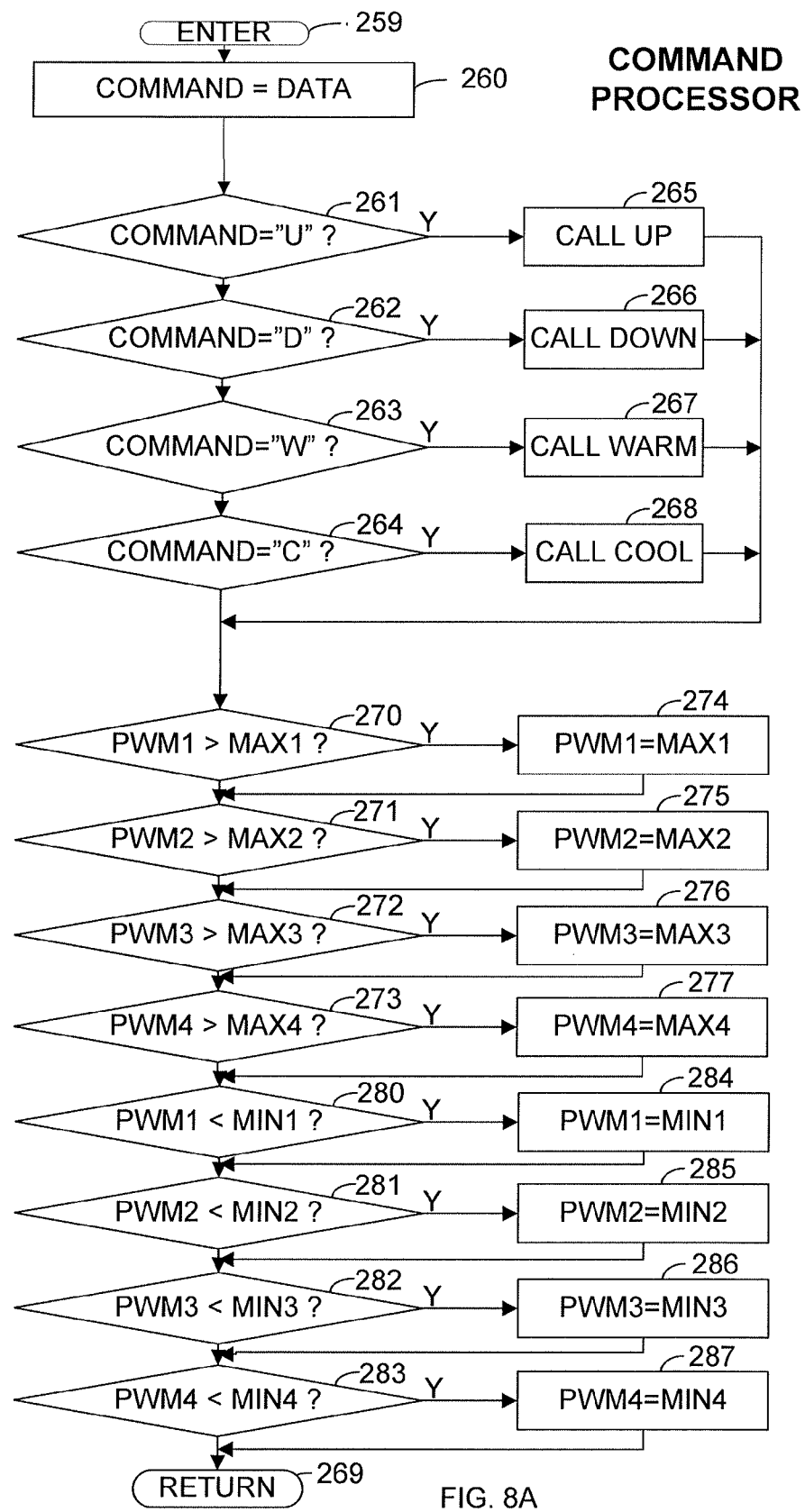
FIGS. 8A-8E generally illustrate steps in an exemplary sequence which occurs after a call is made to a COMMAND PROCESSOR routine to determine which command was received.
Figure 8B:
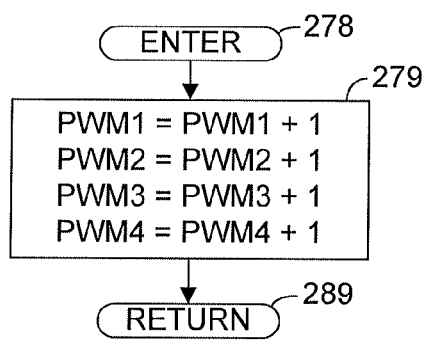
Figure 8C:
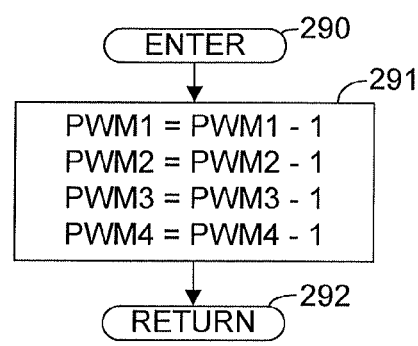
Figure 8D:
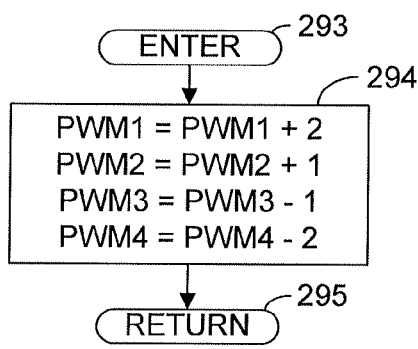
Figure 8E:
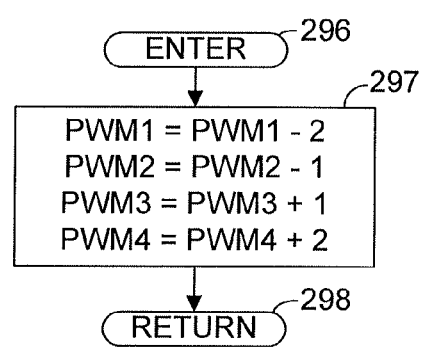

Referring to FIG. 8A, after signal sequences transmitted over power lines have been detected and decoded, using software such as described in reference to FIGS. 7A and 7B, to determine what bit sequence was transmitted, the received bit sequence stored in DATA, an 8-bit word, is assigned to a variable named COMMAND in step 260 of FIG. 8A. The 8-bit sequence now stored in COMMAND may represent an ASCII character that is one of four, in this example, allowable commands. By comparing COMMAND with known bit sequences for possible commands (in a particular embodiment and application) a determination may be made, by comparisons in steps 261, 262, 263, 264 of FIG. 8A ("COMMAND='U'," "COMMAND='D'," "COMMAND='W'," or "COMMAND='C'," respectively), of what command was transmitted (e.g., "U", "D", "W", or "C" in this example). When a match is found in any of steps 261, 262, 263, or 264 ("COMMAND='U'," "COMMAND='D'," "COMMAND='W'," or "COMMAND='C'," respectively), control passes to a subroutine at steps 265, 266, 267, or 268 ("CALL DOWN," "CALL UP," "CALL WARM," or "CALL COOL," respectively), that implements steps needed to provide an appropriate planned response to a transmitted and decoded command. For example, if a decoded command is determined to be a "U" at step 261, then control passes to an "UP" subroutine at step 265 such as illustrated in FIG. 8B that implements changes in microcontroller 205 (FIG. 6) register values which are used to control pulse width modulation (PWM) generators implemented in software in microcontroller 205 so as to cause an increase in duty cycle and thus an apparent increase in brightness of each series set of LEDs (such as illustrated in FIG. 6).

Changes in brightness of controlled LED strings are implemented, independently for each string, by changing a register value associated, in this example, with a PWM variable (e.g., PWM1, PWM2, PWM3, and PWM4) associated with each string. These register values are used to control pulse width (and hence duty cycle) of a signal generated at each output port of microcontroller 205 connected to one of transistors 214, 215, 216, and 217 (FIG. 6), which in turn controls flow of current through each respective string of LEDs. It should be noted that in this example, that in order to permit independent control of intensity and color temperature of light coming from an LED light fixture, pulse width may be modified independently for each microcontroller output terminal and corresponding transistor controlling each string of LEDs, where each string of LEDs generally comprises LEDs having a particular color temperature, but where LEDs in one string of LEDs may have a different color temperature from LEDs in another string of LEDs. Where overall brightness of light from all LED strings is being increased in response to an "Up" (i.e., "U") command, subroutine "UP" simply increments value of each PWM variable (e.g., PWM1, PWM2, PWM3, PWM4) by "1" (or optionally, by a greater increment for a faster response) at step 279, FIG. 8B, and returns control at RETURN statement 289 to a higher level processing sequence as indicated in FIG. 8A (i.e., exiting step 265, FIG. 8A). Processing control then passes to steps 270, 271, 272, or 273 ("PWM1>MAX1?," "PWM2>MAX2?," "PWM3>MAX3?," and "PWM4>MAX4?," respectively) where values stored in PWM variables PWM1, PWM2, PWM3, PWM4 are compared to respective pre-stored values of maximum pulse width (i.e., MAX1, MAX2, MAX3, MAX4, generally related to maximum allowable duty cycle) for each string of LEDs. If a value of a PWM variable is found to exceed its corresponding maximum value in one of steps 270, 271, 272, or 273 ("PWM1>MAX1?," "PWM2>MAX2?," "PWM3>MAX3?," and "PWM4>MAX4?," respectively), then that PWM variable is set equal to its allowable maximum value in its corresponding step 274, 275, 276 or 277 ("PWM1=MAX 1," "PWM2=MAX2," "PWM3=MAX3," or "PWM4=MAX4" respectively), and control is returned to a higher level processing sequence as illustrated in FIG. 8A. This is significant where different color or type LEDs have different maximum duty cycles.

Remaining steps 280, 281, 282 and 283 ("PWM1<MIN1?," "PWM2<MIN2?," "PWM3<MIN3?," and "PWM4<MIN4?," respectively) compare value of each PWM variable to its corresponding pre-stored minimum value MIN1, MIN2, MIN3, MIN4 before returning control to a calling routine at RETURN step 269. Comparisons made in steps 280, 281, 282, 283 ("PWM1<MIN1?," "PWM2<MIN2?," "PWM3<MIN3?," and "PWM4<MIN4?," respectively) will normally not result in branching when processing a "U" command, but may cause branching to reassign values of PWM1, PWM2, PWM3, PWM4 in steps 284, 285, 286 or 287 ("PWM1=MIN1," "PWM2=MIN2," "PWM3=MIN3," or "PWM4=MIN4," respectively) when processing a Down ("D") command.

When a processing sequence illustrated in FIG. 8A is entered at step 259 with a bit sequence in DATA that corresponds to ASCII character "D", then processing will branch at step 262 and subroutine DOWN will be called. Subroutine DOWN decrements each PWM variable (PWM1, PWM2, PWM3, PWM4) by one (or optionally by a larger amount for faster response) in step 291, FIG. 8C, and returns control via RETURN 292 to a main processing sequence in FIG. 8A. Processing control then passes to steps 270, 271, 272, and 273 ("PWM1>MAX1?," "PWM2>MAX2?," "PWM3>MAX3?," and "PWM4>MAX4?," respectively). In steps 280, 281, 282, or 283 ("PWM1<MIN1?," "PWM2<MIN2?," "PWM3<MIN3?," and "PWM4<MIN4?," respectively), current value of each PWM variable may be compared with corresponding pre-stored minimum values for pulse width for each LED string 310, 312, 314, 316. Where a value of a PWM variable is found to be less than a corresponding minimum value, that PWM variable (e.g., PWM1, PWM2, PWM3, PWM4) is assigned its associated minimum value in its corresponding step of steps 284, 285, 286 or 287 ("PWM1=MIN1," "PWM2=MIN2," "PWM3=MIN3," or "PWM4=MIN4," respectively), and control is returned to a main processing sequence as illustrated in FIG. 8A.

When a processing sequence of FIG. 8A is entered at step 259 with a bit sequence in DATA that corresponds to ASCII character "W" then control branches at step 263 and a call is made to subroutine WARM at step 267. In subroutine WARM, in step 294 (FIG. 8D), value of variable PWM1, corresponding in this example embodiment to string 310 (FIG. 6) of LEDs, each having a light output spectra with a "very warm" color temperature of approximately 2700 K, is incremented by 2. Value of variable PWM2, corresponding to string 312 of LEDs, each having a light output spectra with a "warm" color temperature of approximately 3500 K, is incremented by 1. Value of variable PWM3, corresponding to string 314 of LEDs, each having a light output spectra with a "cool" color temperature of approximately 4500 K, is decremented by one (1). The value of variable PWM4, corresponding to string 316 of LEDs, each having a light output spectra with a "very cool" color temperature of approximately 6500 K, is decremented by two (2). One effect of such relative changes in values of different PWM variables, which values independently control duty cycle, and thus perceived intensity, for each of the separate strings of LEDs, is to shift an overall, and perceived, color temperature of a composite mixture of light emitted from a light fixture including such LED strings toward a "warmer" spectral content. Subroutine WARM then returns control via RETURN step 295 (FIG. 8D) to a processing sequence as illustrated in FIG. 8A, where processing control passes to a set of checks in Steps 271, 272, 273, and 274 ("PWM1>MAX1?," "PWM2>MAX2?," "PWM3>MAX3?," and "PWM4>MAX4?," respectively), to determine if value of any PWM variable exceed its corresponding maximum value, and other checks in Steps 280, 281, 282, and 283 ("PWM1<MIN1?," "PWM2<MIN2?," "PWM3<MIN3?," and "PWM4<MIN4?," respectively) to determine if value of any PWM variable is below its corresponding minimum value. Values of PWM variables exceeding their corresponding maximum values are reset to their corresponding maximum values in Steps 274, 275, 276, and 277 ("PWM1=MAX 1," "PWM2=MAX2," "PWM3=MAX3," or "PWM4=MAX4" respectively), and values of PWM variables below their corresponding minimum values are reset to their corresponding minimum values in Steps 284, 285, 286, and 287 ("PWM1=MIN1," "PWM2=MIN2," "PWM3=MIN3," or "PWM4=MIN4," respectively), as explained earlier. Processing control is then returned from a command processing sequence illustrated in FIG. 8A to a calling routine at RETURN step 269.

When a processing sequence of FIG. 8A is entered at step 259 with a bit sequence in DATA that corresponds to ASCII character "C" then control branches at step 264 and a call is made to subroutine COOL at step 268. In subroutine COOL, in step 297 (FIG. 8E), the value of variable PWM1, corresponding in this example embodiment to string 310 (FIG. 6) of LEDs, each having a light output spectra with a "very warm" color temperature of approximately 2700 K, is decremented by 2. The value of variable PWM2, corresponding to string 312 of LEDs, each having a light output spectra with a somewhat less warm color temperature of approximately 3500 K, is decreased by 1. The value of variable PWM3, corresponding to string 314 of LEDs, each having a light output spectra with a "cool" color temperature of approximately 4500 K, is increased by one (1). The value of variable PWM4, corresponding to string 316 of LEDs, each having a light output spectra with a "very cool" color temperature of approximately 6500 K, is incremented by two (2). One effect of such relative changes in values of different PWM variables, which values independently control duty cycle, and thus perceived intensity, for each of the separate strings of LEDs, is to shift an overall, and perceived, color temperature of a composite mixture of light emitted from a light fixture having such LED strings toward a "cooler" spectral content. Subroutine COOL then returns control via RETURN step 298 (FIG. 8E) to a processing sequence as illustrated in FIG. 8A, where processing continues to a set of checks in Steps 271, 272, 273, and 274 ("PWM1>MAX1?," "PWM2>MAX2?," "PWM3>MAX3?," and "PWM4>MAX4?," respectively) to determine if value of any PWM variable exceed its corresponding maximum value, and other checks in Steps 280, 281, 282, and 283 ("PWM1<MIN1?," "PWM2<MIN2?," "PWM3<MIN3?," and "PWM4<MIN4?," respectively) to determine if value of any PWM variable is below its corresponding minimum value. The values of PWM variables exceeding their corresponding maximum values are reset to their corresponding maximum values in Steps 274, 275, 276, and 277 ("PWM1=MAX 1," "PWM2=MAX2," "PWM3=MAX3," or "PWM4=MAX4" respectively), and the values of PWM variables below their corresponding minimum values are reset to their corresponding minimum values in Steps 284, 285, 286 and 287 ("PWM1=MIN1," "PWM2=MIN2," "PWM3=MIN3," or "PWM4=MIN4," respectively), as explained earlier. Processing control is then returned from a command processing sequence illustrated in FIG. 8A to a calling routine at RETURN step 269.

Figure 9A:
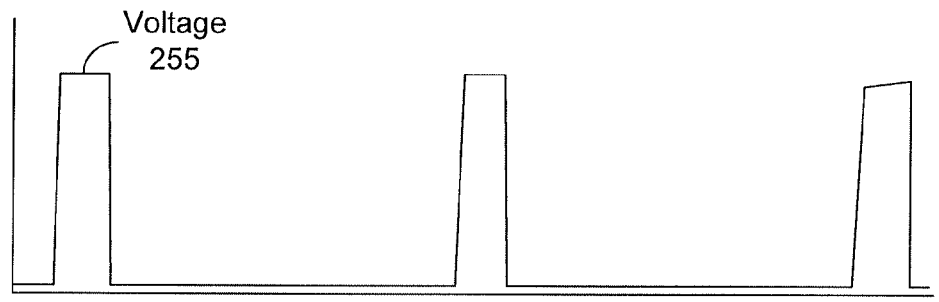
FIGS. 9A-9C illustrate one method by which voltage from an output terminal of a microcontroller is affected by pulse width modulation in accordance with methods and systems consistent with the present invention.
Figure 9B:
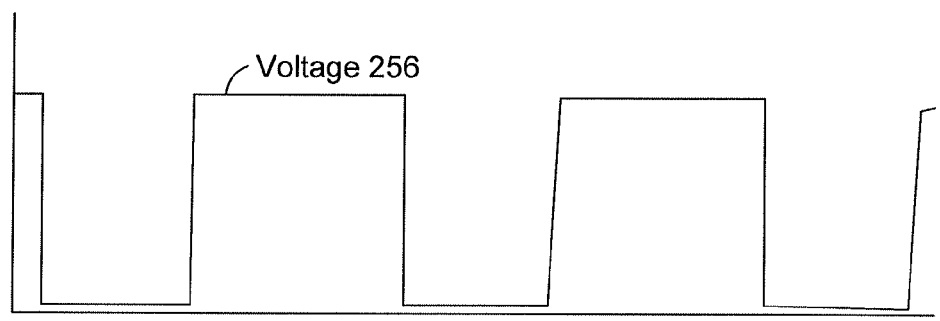
Figure 9C:
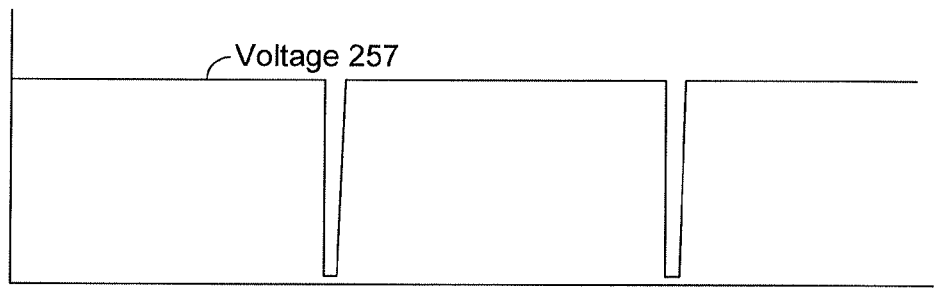

FIGS. 9A, 9B, and 9C illustrate how a voltage from an output terminal of microcontroller 205 is affected by pulse width modulation. In an example embodiment described in association with FIGS. 6, 7A, 7B, and 8A through 8E, pulse width for each cycle is controlled by a value of a PWM variable associated with a particular microcontroller output terminal. Referring to FIG. 9A, an output terminal is energized, in an example embodiment such as described in association with FIGS. 6, 7A, 7B, and 8A through 8E, when a loop counter register overflows, resulting in an increase in output voltage, as shown in a representation 255 of an oscilloscope trace of output voltage for a microcontroller 205 output terminal. When a loop counter exceeds a PWM value associated with a particular load (e.g., an LED string in an example embodiment shown in FIG. 6), then a microcontroller output terminal coupled to that load is turned off until, in this example embodiment, a loop counter overflows again, whereupon, in this example, output terminals associated with each LED string are again energized. Thus, in this example, when a microcontroller output terminal is operated in a pulse width modulation mode, output voltage is switched on at a beginning of each loop counter overflow cycle (also referred to herein as a power cycle), and switched off when a loop counter exceeds a value of a PWM variable associated with that output terminal, so that duty cycle for a controlled load is controlled by a value of a PWM variable associated with that load (e.g., an string of LEDs). FIGS. 9A, 9B, and 9C illustrate how the portion of each power cycle when voltage is supplied to a load may be controlled by increasing values of a PWM variable associated with that load. Voltage trace 255 in FIG. 9A shows a duty cycle of approximately 10 percent. Voltage trace 256 in FIG. 9B shows a duty cycle of approximately 60 percent. Voltage trace 257 in FIG. 9C shows a duty cycle of approximately 90 percent. While in the example discussed above, particular values are used for incrementing and decrementing PWM variables, in production embodiments a lookup table may be used to control PWM variables to achieve desired effects. In other embodiments, the technique as generally described above may be used to control PWM variables of RGB values of respectively colored LEDs of a color display or light to achieve desired effects.

Methods for communication over power lines as disclosed herein may be extended with benefit to many different applications and embodiments. For example, in some embodiments, each of multiple microcontrollers may be used to independently control, either directly or via associated power transistors, intensity (e.g., via pulse width modulation) of three separate LEDs, or other light emitting devices, wherein each of the three light emitting devices emits light of a different color (e.g., red, green, blue). Such light emitting devices may then be grouped so as to provide, in effect, a single pixel in a large display or sign such as a billboard or other signage, or to create a mural on a wall. In one example embodiment, microcontrollers may be configured in a grid arrangement, with each of multiple rows of microcontrollers, and associated switching transistors and LEDs, in such grid being provided with power via a common wire pair or power buss. Each microcontroller in such grid arrangement may be assigned an address code, which, in an example embodiment, may be based upon its x, y position in such grid. Such an address may then be stored in retained memory (e.g., flash memory or eeprom) in each microcontroller in such grid so that each microcontroller may be programmed to recognize its address code and may thereby be separately addressed and independently controlled by including address bits or words or characters (i.e., an address code) in commands transmitted via such power lines or power buss so as to change color and intensity of a pixel being controlled via an independently addressed microcontroller in such grid. In some embodiments, all power lines may be interconnected so that each microcontroller in such grid independently responds to its own x,y address bit sequence or word or ASCII character combination transmitted over common power lines coupled to each microcontroller in such arrangement.

For such embodiments, a control command may comprise, for example, an x,y address code followed by additional characters or bits used to define intensity (or pulse width durations) for each of the different (e.g., red, green, blue) lighting devices controlled by that pixel's microcontroller. In other embodiments, an additional row control microcontroller may be used to control modulation of power supplied to each row, such that each row control microcontroller responds to a master x, y address code transmitted via a central power bus and selects and relays commands via a reduced address code to microcontrollers receiving power from their respective row. Thus, commands may be transmitted via power lines to independently control color and intensity of each of multiple pixels in such display, sign, mural, or other application, allowing a display or information conveyed therein to be changed over time. To avoid viewer confusion that might be associated with slowly changing individual pixels on a display, information for a next display may be transferred to, and stored within, each microcontroller in such grid, and then a separate command using a common address code recognized by all grid microcontrollers may be transmitted so that all grid microcontrollers implement commanded color intensity changes nearly simultaneously, so that a viewed display switches quickly from one display content to the next display content.

Method 1, described above, uses micro-modulation of a DC voltage supplied via power line conductors to a control signal receiver and decoder, and in some embodiments, a controller, as well as a load to be controlled. Methods 2 through 7 involve extracting information encoded, via various techniques explained later herein, in waveforms of AC power supplied to a receiver and decoder, and, in many embodiments, to a controller and to a load to be controlled. One exemplary aspect of the implementation is the ability to digitize and sum the input voltage levels within a few microseconds. In some implementations, the ability to measure the input magnitude more than 50,000 times per second makes it possible to precisely locate the zero crossing of the AC line and then to precisely select any desired phase angle for encoding the data and for timing the integration period of the decoder circuits. This may provide a more precise method of integrating the energy in each half cycle than using analog circuits and methods.

The availability of microcontrollers with high speed digitizers at little or no extra cost helps implement a communications transmitter by the simple addition of two resistors to form a voltage divider. This allows a microcontroller with an integral analog-to-digital converter or a zero crossing detector to detect zero crossings of an AC waveform in order to drive one or more TRIACs synchronously so as to modulate an AC power waveform in accordance with methods and systems consistent with the present invention. Likewise, a communications receiver can be implemented with the same technique, with a microcontroller receiving and decoding transmitted commands while performing its primary task of controlling a load without timing conflict.

Figure 10A:
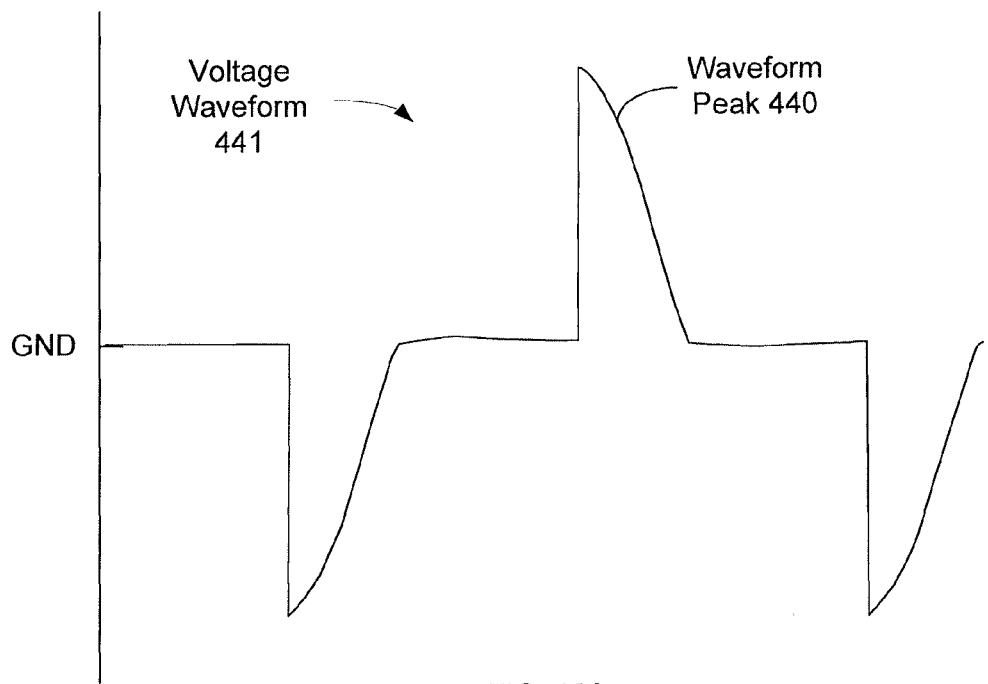
FIGS. 10A and 10B illustrate the effects of a conventional dimmer control switch on a typical AC waveform in accordance with methods and systems consistent with the present invention.
Figure 10B:
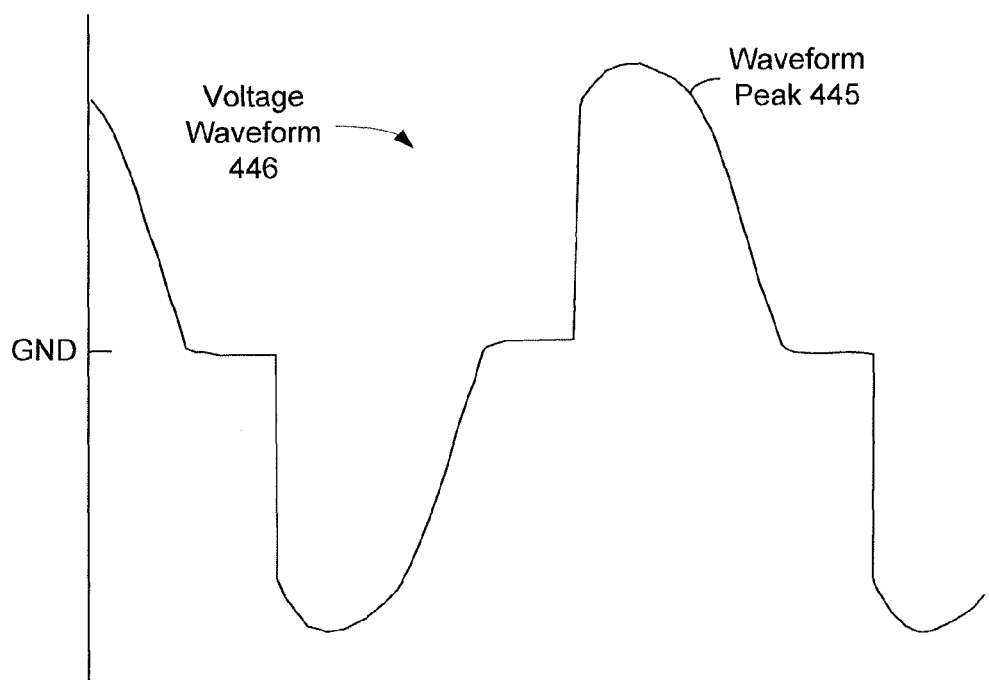

Method 2 involves extracting, and using, as control signals, information encoded into an AC power voltage waveform by an unmodified conventional phase-control dimmer switch, which in normal use controls power available to a light fixture by preventing current from flowing for a user variable portion of each positive half-cycle, and also preventing current from flowing for the same portion of each negative half-cycle (e.g., as illustrated in example waveforms in FIGS. 10A and 10B). Method 2 may also involve having a user momentarily remove power from a circuit by using a switch in a conventional phase-control dimmer switch to cycle power off momentarily and then back on in order to change modes from using a dimmer control to control light intensity to using a dimmer control to control color temperature in an independent manner that does not depend upon light intensity. An approach wherein color temperature is automatically adjusted dependent upon light intensity is described elsewhere herein as a dependent approach for controlling color temperature.

Methods 3 through 6 involve using a transmitter circuit to create changes in an AC power waveform so as to encode information according to one of the following Methods. Methods 3 through 6 are capable of transmitting ASCII encoded data and generally use the integrated value of the positive and negative half-cycles to identify data transmissions. A difference between Methods 3 through 6 is the encoding of logical "1's" and "0's." Method 3 involves encoding information by separately varying time delays 450 and/or 451 in positive 452 and negative 453 half-cycles, respectively, of AC power waveform 455, as illustrated in an example in FIG. 11A, or time delays 458 and/or 459 in positive 461 and negative 462 half-cycles, respectively, of AC power waveform 460, as illustrated in another example in FIG. 11B. Such delays cause changes in integrals of voltage versus time for each half-cycle, which can be used, as described later, to decode data transmitted over AC power lines. In this example for Method 3, a positive half-cycle 452 having a longer firing time delay 450 but a smaller voltage versus time area under its positive voltage curve, and thus a smaller integral, as discussed later, followed by a negative half-cycle 453 having a smaller time delay 451, but a larger voltage versus time area under its negative voltage curve, and thus a larger integral, as in FIG. 11A, may represent a "0," and a positive half-cycle 461 having a shorter time delay 458, and thus a larger integral, followed by a negative half-cycle 462 having a larger delay 459, and thus a smaller integral, may represent a "1."

Figure 12A:
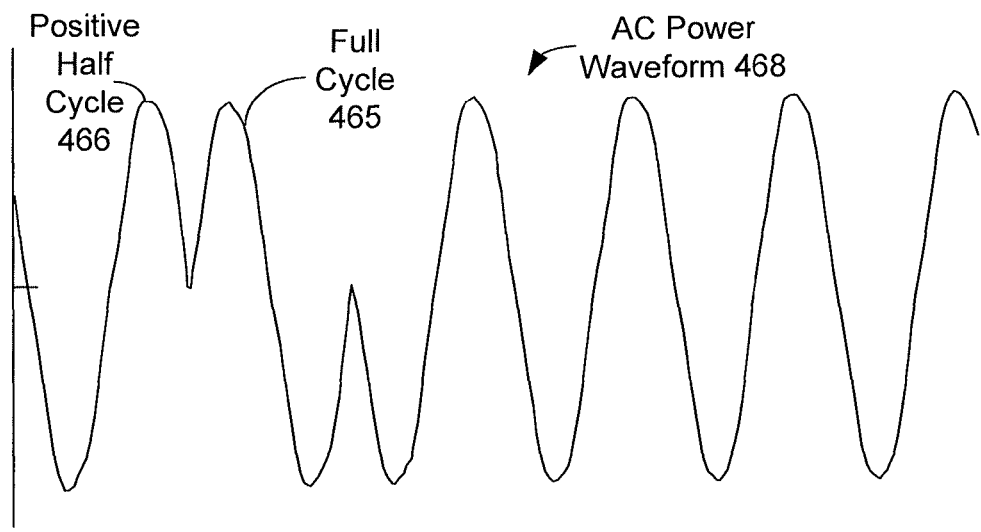
FIGS. 12A and 12B illustrate an exemplary method by which the AC power voltage waveforms of FIGS. 10A and 10B are modified by the example circuit of FIG. 15A.
Figure 12B:
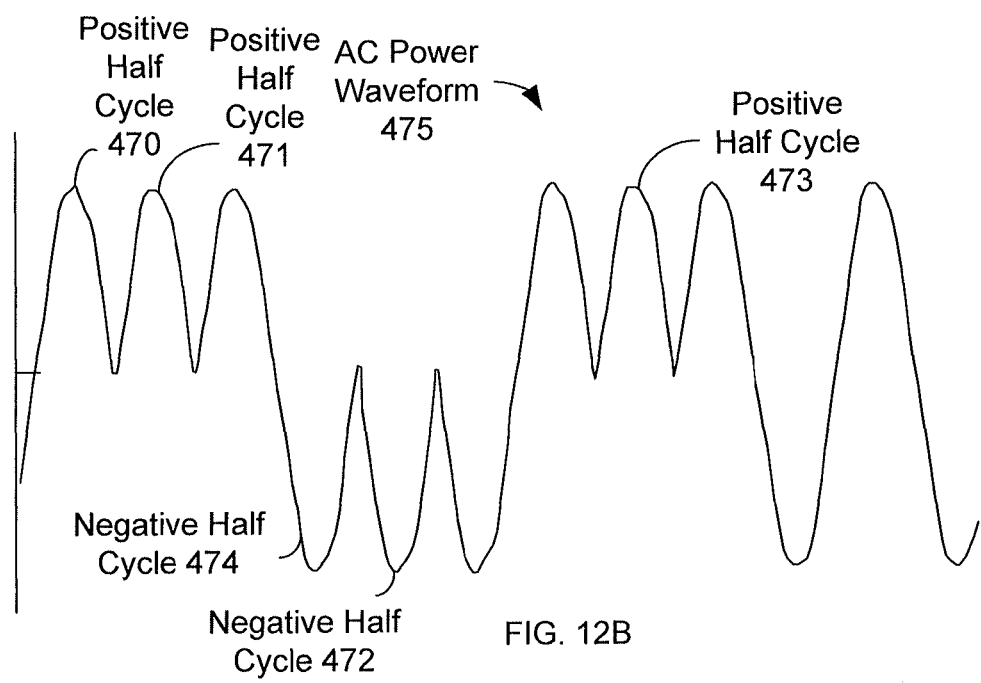

Methods 4F and 4H involve encoding information by changing polarity of selected full cycles 465 (Method 4F) or half-cycles 471, 472 or 473 (Method 4H) of AC power waveforms 468 and/or 475, respectively, as illustrated in FIGS. 12A and 12B, wherein a positive half-cycle (466, FIG. 12A), (470, FIG. 12B) followed by another positive-going full cycle (465, FIG. 12A), or positive half-cycle (471, FIG. 12B), respectively, may represent a "1", and a negative half-cycle 474, followed by another negative-going full cycle (not illustrated) or a negative half-cycle 472 may represent a "0".

Figure 13:
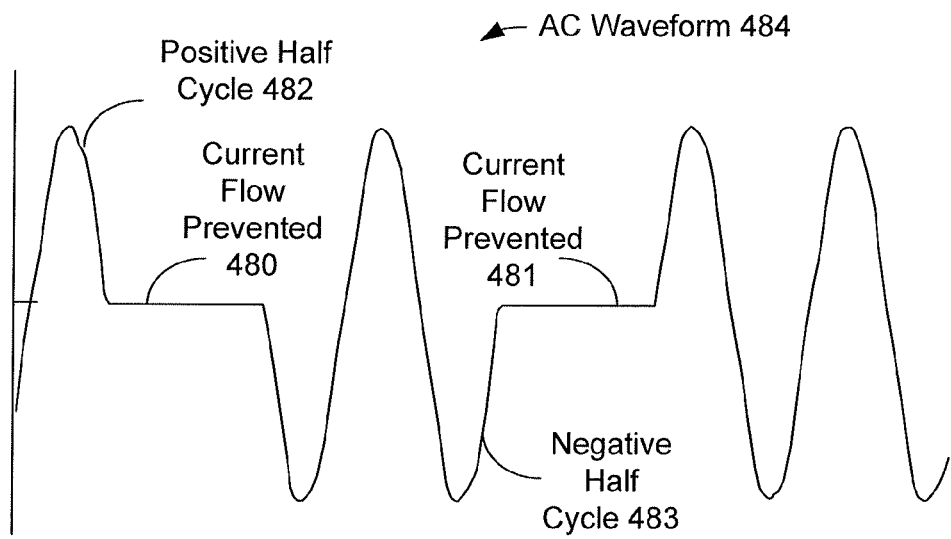
FIG. 13 illustrates a representative waveform for data transmitted using Method 5 in accordance with methods and systems consistent with the present invention.

Method 5 involves encoding information in AC waveform 484 by preventing current flow for one full cycle, 480 or 481, as illustrated in an example in FIG. 13, following either a positive half-cycle 482 ("1") or a negative half-cycle 483 ("0").

Figure 14:
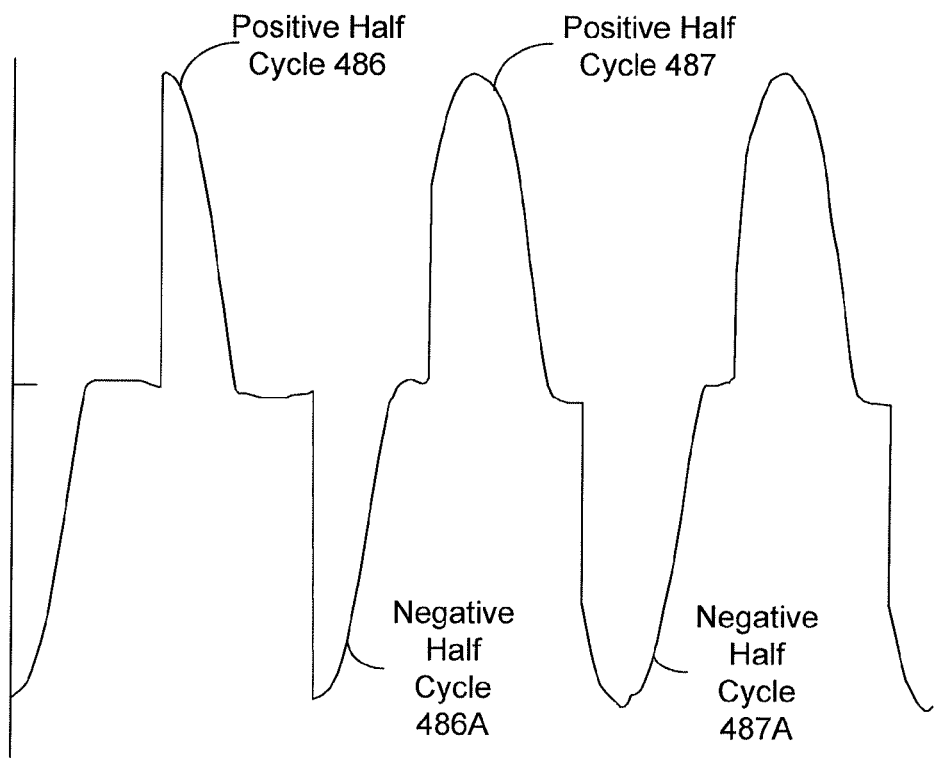
FIG. 14 illustrates a representative waveform for data transmitted using Method 6 in accordance with methods and systems consistent with the present invention.

Method 6 involves encoding information by using predefined energy levels in each half-cycle pair; 486 and 486A, and 487 and 487A, of a AC power waveform 485 to represent "0"'s or "1"'s, respectively, as illustrated in an example in FIG. 14.

Method 7 involves use of a conventional light switch to provide information in an AC power waveform by a pattern of switching power on, off, and back on again that may be used by a receiver and controller to control a mode of operation of a receiver or to control one or more features of a controlled load. No separate example waveform illustration is provided for this method since a waveform resulting from a momentary removal of power from an AC power circuit, as by switching a conventional light switch off momentarily and then back on, may be similar to portions 480 or 481 in waveform 484 in FIG. 13, where input AC power is removed for one full cycle, except that in Method 7, input AC power may be removed for multiple cycles before being restored, and, in Method 7, switching may not occur at zero crossings as in FIG. 13. Example receiver circuits and software presented later herein are able to detect and respond in a controlled manner to such momentary power outages as are used in some embodiments of Method 2 as well as in Method 7.

Generally, in Methods 2 through 7, a key step includes integrating areas under positive or negative half-cycles, or for some Methods, separately integrating both positive and negative half-cycles, of an AC power voltage waveform. Results of such half-cycle integrals are used to support decisions needed to decode transmitted information, and, in some embodiments, to also implement control actions responsive to transmitted information.

In the following material, examples of receiver circuits and microcontroller software that may be used to receive, detect, decode, and respond to information inherently present in some AC power waveforms, or data modulated onto AC power waveforms according to Methods summarized above, are disclosed, followed by examples of transmitter circuits and microcontroller software that may be used to modulate information onto AC waveforms according to Methods of the instant invention.

Figure 15A:
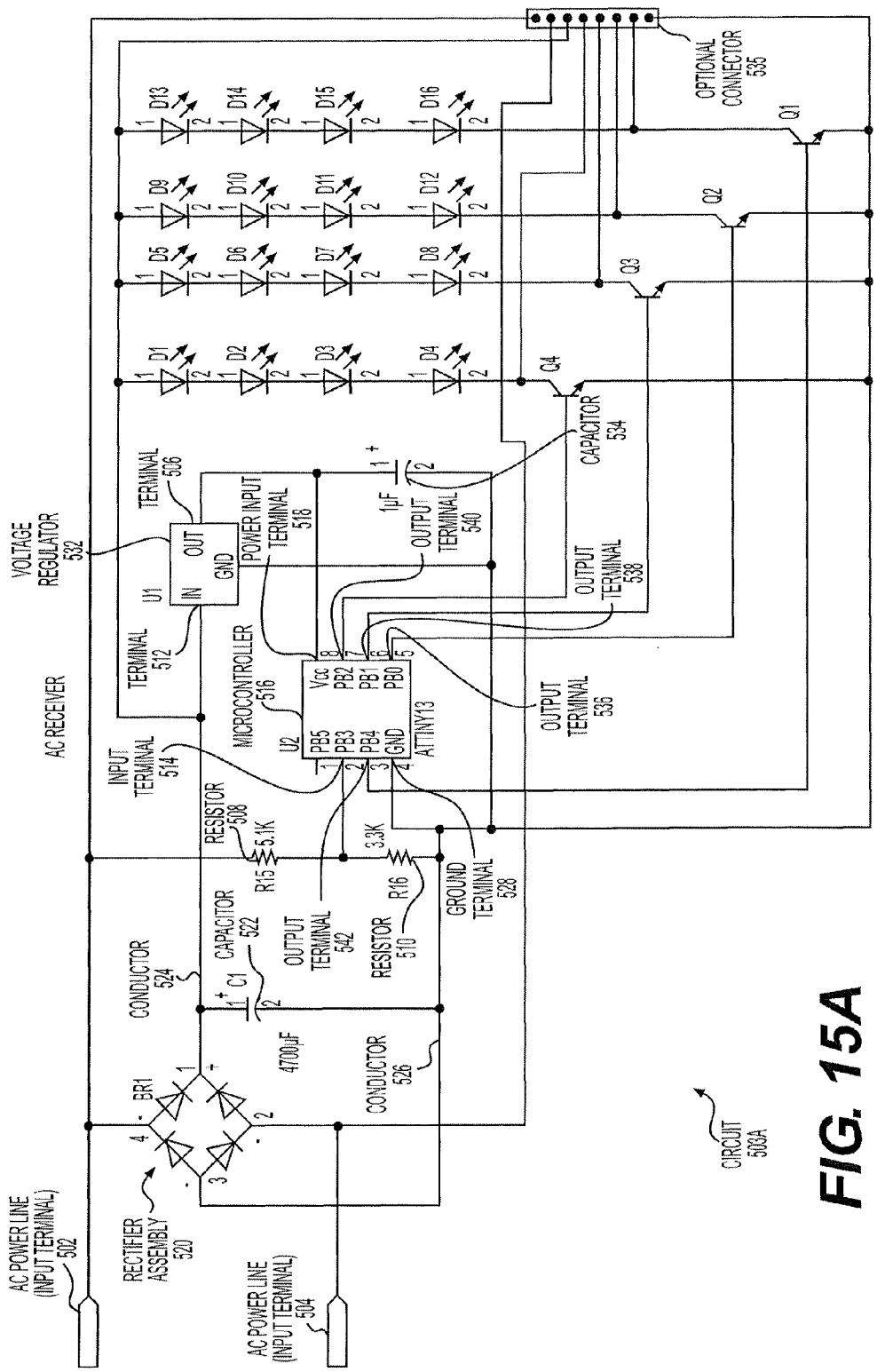
FIGS. 15A-15B illustrate exemplary embodiments of receiver circuits in accordance with methods and systems consistent with the present invention.

FIG. 15A shows an example circuit for an AC receiver. Some embodiments of a receiver, for information sent via AC power lines according to Methods 2, 6, and 7, may use one terminal of a microcontroller configured as an analog-to-digital converter, or an external analog-to-digital converter coupled to a microcontroller. They may also use, as part of an input circuit for such analog-to-digital converter, voltage dividing resistors that reduce positive fluctuations of an input AC power voltage waveform, relative to ground terminal potential of a microcontroller or other device incorporating such analog-to-digital converter, to stay within a dynamic range of such analog-to-digital converter, thereby allowing analog-to-digital samples of an AC voltage to be in a positive domain with respect to a DC ground potential for power supplied to a microcontroller or external device including such analog-to-digital converter. Such an input circuit also prevents an input voltage at such analog-to-digital converter that is negative with respect to a ground terminal of such microcontroller or external device having an analog-to-digital converter, even during a negative half-cycle of an input AC power voltage. During a negative half-cycle of an input AC power voltage, a forward conducting diode in a rectifier prevents any significant current flow through, or voltage drop across, a pair of voltage dividing resistors to which an input to such analog-to-digital converter is connected. For Methods 2, 6, and 7, adequate information to support decoding of information on AC power lines may be obtained by integrating, in some implementations, only positive half-cycles, or integrating during an expected half-cycle period (e.g., when input AC power has been momentarily de-energized), of an input AC power voltage waveform.

Other embodiments of a receiver, for information sent via AC power lines, using Methods 2 through 7, may use two terminals of a microcontroller, configured as inputs, with each of the two input terminals further configured to provide an analog-to-digital converter capability. Instructions for selecting such a configuration may typically be found in a manufacturer's data sheet for a particular microcontroller (see, for example, ATMEL's data sheet for an ATtiny13A microcontroller). In an example embodiment, one such input terminal is coupled to a voltage divider in a circuit path through a full wave rectifier that conducts during a positive phase of an input AC voltage, and the other such input terminal is coupled to a voltage divider in a circuit path through a full wave rectifier that conducts during a negative phase of an input AC voltage. This arrangement, which will be further described in association with FIG. 15B, allows one analog-to-digital converter to sample, in a positive sense with respect to microcontroller ground potential, a positive (with respect to AC power neutral) portion of an input AC power waveform, and allows the other analog-to-digital converter to sample, in a positive sense with respect to microcontroller ground potential, the negative (with respect to AC power neutral) portion of an input AC power waveform.

Thus, where needed to support decoding of information in an AC power waveform, as explained later herein for each of Methods 2 through 7 for transmitting information over AC power lines, example circuits are illustrated and described wherein one or two analog-to-digital converters may be used to integrate, separately, voltage versus time areas under positive portions, and in some embodiments, areas under negative portions, of an AC power waveform. As noted above and further described later herein, one of example circuits shown in FIGS. 15A and 15B may be used with some embodiments of Method 2 or Method 7 to determine AC power on or off status in order to detect momentary removal and restoration of power so as to control modes in an AC receiver and controller of the instant invention. Other circuit configurations that permit analog-to-digital sampling and separate integration of voltage versus time areas under positive, and where necessary negative, half-cycles of an AC power waveform could also be used in other embodiments of the instant invention.

Method 2 provides multi-mode load control using an unmodified conventional dimmer switch. Method 2 may not explicitly transmit data as such, but uses information derived from integrated values of modified half-cycles in AC power waveforms generated by an unmodified conventional dimmer switch to control operation or features of a controlled load. Method 2 may employ different modes of operation to support control of different features of a controlled load. Switching between modes may be controlled by an on/off switch function of a standard dimmer switch. In example embodiments, either intensity or color temperature from a light fixture may be controlled independently using information in an AC power waveform generated from a conventional dimmer switch, depending on the mode of operation.

A conventional standard phase angle control light dimmer switch, such as frequently used to control intensity of incandescent lights in a residential dining room, operates by using an SCR or TRIAC to impose a variable delay in allowing current to flow in each half-cycle of an AC waveform, such as a conventional 60 cycle AC power waveform used in the United States, or a 50 cycle AC power waveform used in some other countries, thereby reducing average power made available to a load. In a conventional dimmer switch, an amount of delay is typically controlled by a rotating or sliding variable resistor which, with other components, controls an amount of delay before current is allowed to flow in each half-cycle. FIGS. 10A and 10B illustrate effects of a conventional dimmer control switch on a typical AC waveform. Waveform peak 440 in FIG. 10A illustrates an effect of a conventional dimmer switch wherein current in each half-cycle is not allowed to flow until approximately half the duration of each half cycle has elapsed. Waveform peak 445 of voltage waveform 446 in FIG. 10B illustrates an effect of a dimmer switch wherein current flow is delayed for approximately 25 percent of duration of each half cycle, thereby making more average power available to a connected load than waveform with peak 440 in FIG. 10A would provide.

When Method 2 is used to control intensity and color temperature of a light fixture having multiple LEDs, or strings of LEDs, of different color temperatures, different modes of operation may be used. On initial application of power, intensity mode (Mode 1 in this example) is in effect. The setting of the dimmer controls the intensity or brightness of the LEDs, with whatever value of color temperature is stored. The PWM to the LEDs will be proportional to the relative value of the digitally integrated waveform. In Mode 1, brightness is controlled in direct proportion to the total energy transmitted during each cycle in the same manner that it would be controlled if this circuit were not used. There are two significant differences, however. One difference is that the relative power applied to LEDs of different colors or color temperatures is determined by settings that are selected in Mode 2. The other difference is that the carrier frequency of the PWM drive to the LEDs is translated to a much higher frequency than the input 50 or 60 Hz, which will significantly reduce human perceptible flicker.

Color temperature control mode (Mode 2 in this example) is entered by a rapid cycling of the AC power using the on/off function of the dimmer switch. When in this mode, half-cycle integrals below a certain minimum level, such as a level representing 70% power, will be ignored and color temperature selection will be made within the range of the minimum level up to 100%. This expanded scale control is necessary because there must be sufficient energy available to illuminate the LEDs sufficiently to make an intelligent judgment of the color temperature selection. In other applications and embodiments, cycling power of and on could be used to change a control mode so as to control other features of a device, or other devices, such as speed of a fan (e.g., as in a bathroom light fixture). For such other applications, there may be no need to provide for an expanded scale control.

Color temperature selection may be performed by varying the relative power levels sent to the LEDs. There may be at least two different color temperature LEDs installed so that the relative power provided to each will result in a visible difference in the warmness or coolness of the illumination. In Mode 2, the input energy value typically in a range between 70% and 100% is used to determine the value of a function register which can be used to control color, color temperature or other features. The selected function is applied to the output in real time and is stored when the input power drops below a threshold value.

A table of values is used to adjust as many different LEDs as desired. If four different color temperatures are installed, then the relative brightness of each is adjusted as the relative level of the input power is modified using the dimmer switch.

When AC power is removed, the current setting of the color temperature is stored for future use.

Power to the microcontroller is provided through an independent regulator circuit. The microcontroller is able to perform several tasks after removal of AC power, such as changing modes and storing intensity and color temperatures values.

Changing modes is accomplished by cycling the power OFF and ON within a predetermined period of time, such as ½-5 seconds or so, although different time periods may be used. Color temperature mode is entered if AC power is re-connected before the capacitor supplying power to the microcontroller has lost its charge. If the microcontroller is still running on stored energy and intensity mode is in effect when AC power is restored, then color temperature mode is entered. The number of possible operating modes is not limited by the architecture. At microcontroller power up, after more than a few seconds without power, Mode 1 is in effect by default. The operating mode is changed when input power is applied and sufficient power for operation of the microcontroller remains in the storage capacitor. In normal use, mode switching is performed by a rapid on/off sequence of the dimmer controller. Other useful modes of operating could be to turn a fan on or off or to set the speed of operation. In this manner, a single dimmer switch can control the functions of a complex ceiling light with fan and other features. It can also control the volume of a music system as well as the musical selection or a television, DVD player or other entertainment functions.

Figure 15B:
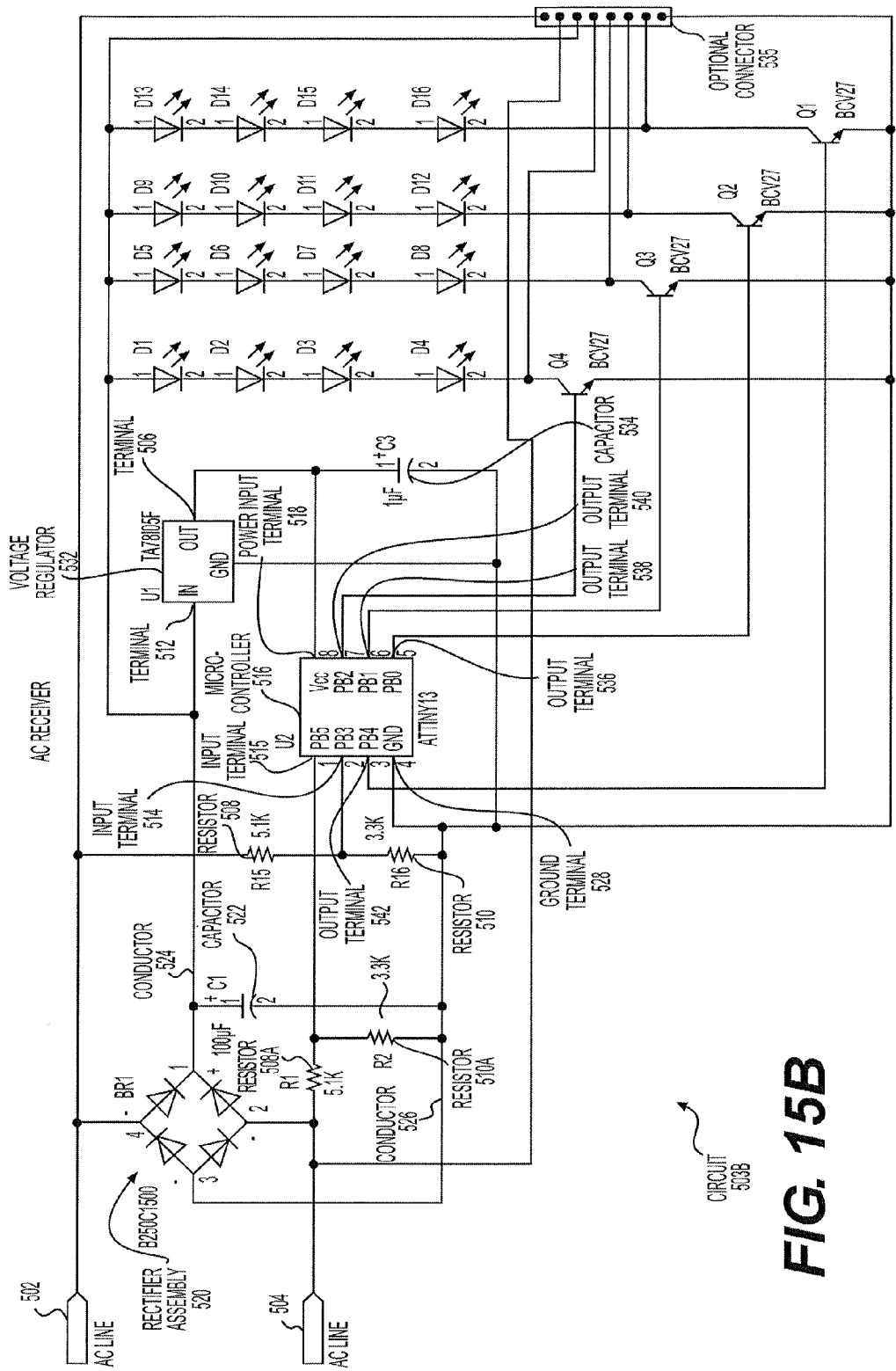

Method 2 in this application thus uses waveform changes or modulations such as illustrated in FIGS. 10A and 10B, generated by a conventional light dimmer switch, as information that may be communicated over power lines to inexpensive AC receiver and controller embodiments. Such receiver and controller embodiments may then use information transmitted in such waveform modulations to control one or more functions or characteristics of a controlled load. In some embodiments, for example, both intensity and color temperature of an LED lamp fixture including LEDs of different color temperatures, such as illustrated in FIGS. 15A and 15B (and similar to multiple strings of LEDs as described in association with FIG. 6), may be dependently or independently controlled by a single unmodified conventional light dimmer control switch, as further described below.

In a dependent approach, for example, color temperature of light from a fixture having multiple LEDs with different color temperatures may be changed automatically, as a function of intensity, by software implemented in a microcontroller which may be included in such a light fixture. In this manner, as described in more detail below, a composite perceived color temperature from a light fixture comprising such multiple LEDs may be changed under software control to match, for example, a curve of color temperature versus intensity from a conventional incandescent light fixture, to which some users have become accustomed and which some users find desirable. This function may be implemented, for example, using lookup tables based on integrated values of half-cycles of an input AC power waveform, which in turn are related to overall light intensity. Values from lookup tables may be used to control pulse width modulation variables for different strings or banks of LEDs having different color temperatures, as described earlier in association with FIG. 6. In a dependent approach, and as shown in the embodiment for Method 2 where color temperature is modified automatically by a light fixture as a function of (i.e., depending upon) overall light intensity, which in turn is controlled by power in an AC power waveform modified by an unmodified conventional dimmer control switch, normal user operation of such dimmer control switch is unchanged from conventional usage in switching lights on or off and controlling lighting intensity by adjustment of a rotary or linear slide mechanism provided on such conventional controller.

A circuit such as illustrated in FIG. 15A may be positioned near a load to be controlled. In some embodiments, a load to be controlled may be a light fixture that includes multiple strings of LEDs, similar to or like strings of LEDs illustrated in FIG. 6, wherein each string may comprise LEDs having a different color temperature from LEDs in other strings. In FIG. 15A, AC power lines 502 and 504 provide a source of alternating current to rectifier assembly 520 which provides a DC voltage potential and a source of direct current between conductors 524 and 526. Conductor 524 connects to input terminal 512 on voltage regulator 532. Capacitor 522 helps smooth a DC voltage provided via voltage regulator 532 terminal 506 to power input terminal 518 on microcontroller 516, where DC voltage supplied to power input terminal 518 is further smoothed by capacitor 534, which has sufficient capacitance to provide power to microcontroller 516 for approximately 250 to 500 milliseconds after a loss of input AC power. While a capacitor sufficient for 500 milliseconds of operation of the microprocessor is disclosed, a larger capacitor that would extend operational time of the microprocessor may be used, such as one that would allow operation for one or more seconds. Being able to continue operation of microcontroller 516 for a short period after loss of input AC power allows microcontroller 516 to sample input AC power waveform to determine that input AC power has been de-energized (e.g., switched off), which begins a mode change event.

If AC power is re-energized while microcontroller 516 is still operating on power from capacitor 534, a mode change event is completed (e.g., a software flag is set in memory, or a MODE variable with a modulo based on number of modes is incremented to cycle through multiple modes), and, in an example embodiment using an independent, user-controlled color temperature approach, microcontroller 516 resumes operation in a mode wherein integrated values of input AC waveforms are used to change color temperature of light from a controlled light fixture. For embodiments using an independent, user-controlled approach to adjusting color temperature, a look-up table may be used which includes values of a pulse width modulation variable for each string (e.g., PWM (I), I=1.4 in this example) as a function of values of integrals of voltage versus time areas under positive half-cycles of an input AC power waveform. To help insure adequate power is available for illumination of different LED strings so that a user is able to perceive differences in color temperature, such a look-up table may be based on a range of values of half-cycle integrals that correspond to average power levels from approximately 70 percent of maximum power to 100 percent of maximum power that can be delivered by a conventional light dimmer switch. DC power provided via conductors 524 and 526 may also be used to provide power to multiple strings of LEDs, as illustrated in FIG. 15A, which in some embodiments may comprise LEDs of different color temperatures in different strings, similar to a configuration described in association with FIG. 6. Resistor 508 and resistor 510 may comprise a voltage divider between AC power conductor 502 and conductor 526 which is coupled to ground terminal 528 on microcontroller 516. Conductor 526 also provides a DC current return path to rectifier assembly 520. Resistance values of resistor 508 and resistor 510 may be selected so that a range of voltages presented to input terminal 514 of microcontroller 516 is maintained within a dynamic range of an analog-to-digital converter integrated with terminal 514.

Figure 16A:
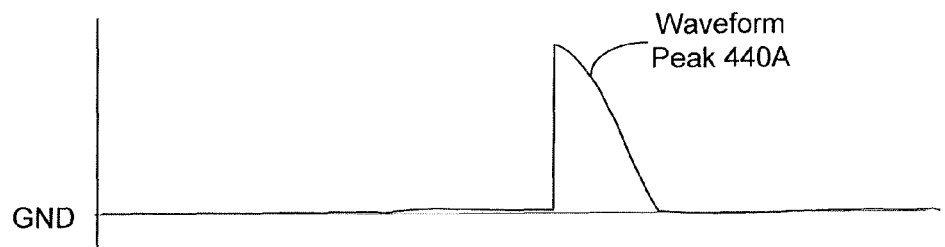
FIGS. 16A-16C generally illustrate half-cycles in accordance with the present invention.

During a positive half-cycle of an input AC power waveform, when voltage at input terminal 502 is positive with respect to voltage potential at neutral terminal 504, voltage present at microcontroller 516 input terminal 514 is positive with respect to ground terminal 528, and, over time, a voltage waveform present at terminal 514 provides amplitude-reduced close replicas 440A, as illustrated in FIG. 16A, of positive half-cycles 440 of voltage waveform 441, as illustrated in FIG. 10A, present at input terminal 502 with respect to terminal 504. During a negative half-cycle of an input AC power waveform, when voltage at input terminal 502 is negative with respect to voltage potential at neutral terminal 504, voltage present at input terminal 514 is essentially zero volts with respect to ground terminal 528 since a forward-conducting diode in rectifier assembly 520 prevents any significant voltage from developing across resistor 510 and resistor 508. Thus, example circuit 503A may be used in embodiments implementing Methods where integration of only positive half-cycles is needed to support extraction of desired information from an input AC power waveform. Optional connector 535 and associated conductors as illustrated in FIG. 15A may be used to access selected points within circuit 503A to support testing during circuit and software development and verification, and where desired, during production.

Depending upon voltage and power requirements of a controlled load, output terminals 536, 538, 540, 542 of microcontroller 516 may be connected to a controlled load directly or indirectly via power switching or control devices such as transistors or relays. In an example illustrated in FIG. 15A, a controlled load comprises four strings of LEDs, with each string comprising LEDs having a different color temperature from LEDs in other strings. In a manner similar to an example illustrated in FIG. 6 and described in association therewith, current flow and duty cycle of LEDs in each string are controlled by microcontroller 516 responsive to information transmitted within an AC power voltage waveform over power conductors 502 and 504. Such information may be or extracted from such voltage waveform by integrating voltage versus time areas under half-cycles of such waveform. Since voltage waveforms from an unmodified conventional AC dimmer control switch are generally symmetrical about a neutral or ground voltage level, voltage versus time integrals may be accomplished on either positive or negative half-cycles, but in an example circuit illustrated in FIG. 15A, such integrals are accomplished on positive half-cycles. In an example embodiment dealing with an AC power voltage waveform, supplied via conductors 502, 504, which has been modulated by a conventional AC dimmer control switch, information available in AC power waveforms, such as those illustrated in FIGS. 10A and 10B, transmitted over power lines 502, 504 may comprise, for example, total energy or power available in each half-cycle, or a duration of a delay in each half-cycle before current is allowed to flow. Duration of such a delay may be expressed, for example, as a time duration (e.g., in milliseconds) from a nominal zero crossing, or as a percentage of a nominal half-cycle period when current is allowed to flow by a TRIAC, SCR, or other switching component, but for most applications and embodiments of the instant invention, it is adequate to use the value of an integral of voltage versus time area under selected voltage half-cycles to support further decisions related to decoding of transmitted information or implementation of control actions responsive to transmitted information. Thus, in many embodiments, a simple value of a voltage versus time integral for one or more half-cycles provides sufficient information needed for interpretation of transmitted information and/or execution of control responses to transmitted information. As described, such information may be received and decoded by microcontroller 516, using an integrated analog-to-digital converter, and received and decoded information may then be used, in an example embodiment shown in FIG. 15A, to control intensity and composite color temperature of light emitted from LEDs illustrated in FIG. 15A.

FIG. 15A and description above associated therewith illustrated an example embodiment wherein a single analog-to-digital converter is used to sample a voltage waveform and support integration of areas under positive half-cycles of an input AC power waveform. FIG. 15B illustrates another example embodiment of a receiver circuit wherein two terminals of a microcontroller are configured as inputs with analog-to-digital conversion capabilities to support separate sampling of positive half-cycles and negative half-cycles of an input AC power waveform. In FIG. 15B, AC power lines 502 and 504 provide a source of alternating current to a rectifier assembly 520 which provides a DC voltage potential and a source of direct current between conductors 524 and 526. Capacitor 522 helps smooth a DC voltage provided via voltage regulator 532 terminal 506 to power input terminal 518 on microcontroller 516, where DC voltage supplied to terminal 518 is further smoothed by capacitor 534, which also has sufficient capacitance to maintain power to microcontroller 516 for approximately 250 to 500 milliseconds, or in some instances more as described above, after a loss of input AC power.

In an example embodiment as illustrated in FIG. 15B, DC power provided via conductors 524 and 526 may also be used to provide power to multiple strings of LEDs, which in some embodiments may comprise LEDs of different color temperatures in different strings, similar to a configuration described in association with FIG. 6. Resistor 508 and resistor 510 may comprise a voltage divider between AC power conductor 502 and conductor 526 which is coupled to ground terminal 528 on microcontroller 516. Conductor 526 also provides a DC current return path to rectifier assembly 520. Resistance values of resistor 508 and resistor 510 may be selected so that a range of voltages presented to input terminal 514 of microcontroller 516 is maintained within a dynamic range of an analog-to-digital converter integrated with terminal 514. Resistor 508A and resistor 510A may comprise a voltage divider between neutral AC power conductor 504 and conductor 526 which is coupled to ground terminal 528 on microcontroller 516. Conductor 526 also provides a DC current return path to rectifier assembly 520. Resistance values of resistor 508A and resistor 510A may be selected so that a range of voltages presented to input terminal 515 of microcontroller 516 is maintained within a dynamic range of an analog-to-digital converter integrated with terminal 515. Note that when AC power conductor 502 is in a positive half-cycle with respect to neutral power conductor 504, then resistance of DC circuit components connected to conductor 524 causes a voltage to develop across a voltage divider comprising resistor 508 and resistor 510 such that terminal 514 samples a voltage half-cycle that is an amplitude reduced approximate replica of such positive half-cycles of input AC power waveform and which is positive with respect to microcontroller 516 ground terminal 528, such as half-cycle 440A illustrated in FIG. 16C. When conductor 502 is positive with respect to conductor 504, a forward conducting diode in rectifier 520 prevents any significant voltage developing across a voltage divider comprising resistor 508A and resistor 510A, so that terminal 515 is not presented with any significant negative voltage. When AC power conductor 502 is in a negative half-cycle with respect to neutral AC power conductor 504, resistance of components connected to conductor 524 causes a voltage to develop across a divider network comprising resistor 508A and resistor 510A, such that terminal 515 samples a voltage half-cycle that is an amplitude-reduced approximate replica of such negative half-cycle of input AC power waveform but which is inverted to positive with respect to microcontroller 516 ground terminal 528, such as half-cycles 440B illustrated in FIG. 16C. When conductor 502 is negative with respect to conductor 504, a forward conducting diode in rectifier 520 prevents any significant voltage developing across a voltage divider comprising resistor 508 and resistor 510, so that terminal 514 is not presented with any significant negative voltage. Thus, with a circuit such as illustrated in FIG. 15B, terminal 514 samples, in a positive domain with respect to ground terminal 528, positive half-cycles of an AC power voltage between conductor 502 and conductor 504, and terminal 515 samples, in a positive domain with respect to ground terminal 528, negative half-cycles of an AC power voltage between conductor 502 and conductor 504. When combined with appropriate software, a receiver circuit, such as illustrated in FIG. 15B, that can separately integrate voltage versus time areas under both positive and negative half-cycles of an AC power voltage waveform may be used in embodiments of the instant invention to support any of Methods 2 through 7.

Figure 16B:
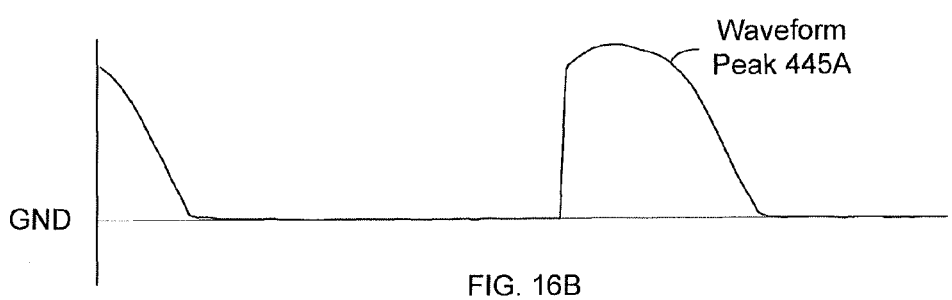
Figure 16C:
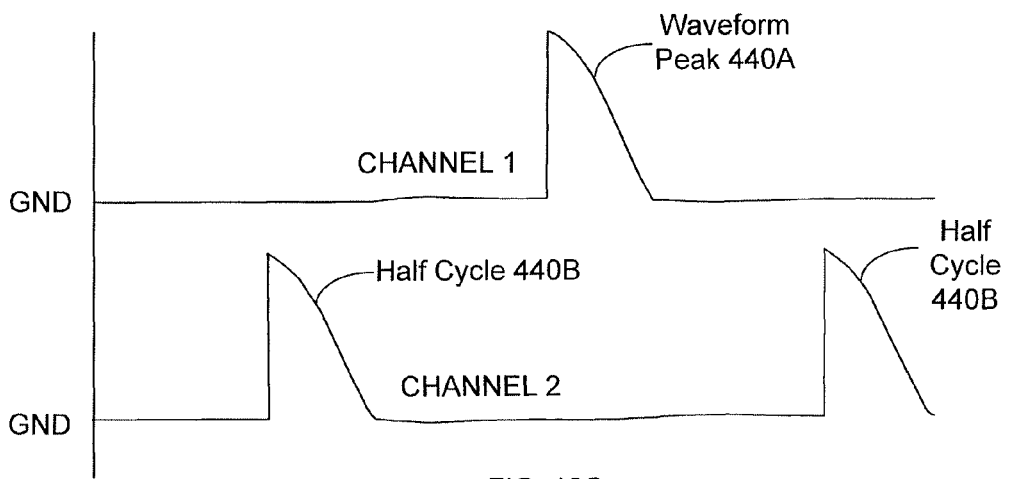

As noted earlier, FIGS. 12A and 12B illustrate how AC power voltage waveforms shown in FIGS. 10A and 10B, respectively, are modified by an example circuit shown in FIG. 15A so that voltage amplitudes of positive half-cycles, such as illustrated by waveform peak 440A in FIG. 16A, and waveform peak 445A in FIG. 16B, are within a dynamic range of an analog-to-digital converter coupled to terminal 514 of microcontroller 516, and negative half-cycles are not presented at terminal 514, so all voltage samples are in a positive domain with respect to ground terminal 528 of microcontroller 516. Understanding of how waveform information is presented to analog-to-digital converters used in different receiver embodiments may be helpful to development of software to be implemented in one or more microcontrollers to be used to decode and make application of information transmitted in AC power waveforms. The following sections provide examples of software that may be used to support implementation of Methods 2 through 7.

Software executing within microcontroller 516 in AC receiver and decoder circuit embodiments, such as examples illustrated in FIG. 15A (which may be used with Methods 2, 6, and 7) and 15B (which may be used with Methods 2 through 7), may generally comprises at least two activities. In a main program, after power-up and initialization of operating configuration, variables, and constants, and establishing a clock-driven interrupt rate and/or analog-to-digital conversion complete interrupts, and enabling such interrupts, much of microcontroller 516 processing time is typically spent in a loop which is controlling pulse width modulation intervals of one or more output terminals, similar to loop 252 illustrated in FIG. 7A and described in association therewith. Such a loop, referred to herein as a main loop, may typically operate at a rates from hundreds to thousands of Hertz which minimizes human perceptible flicker when such loop is used to control power to LEDs or other lighting devices. However, other loop rates may be established as needed for particular applications. Another activity is satisfying periodic interrupts, such as clock driven or conversion complete interrupts noted above, via one or more interrupt service routines which typically include steps to perform integrals of half-cycles of an input AC power waveform and which also include steps needed to respond to results of such integrals of half-cycles to decode transmitted information and implement decisions and/or implement control-related changes responsive to such transmitted information. In many embodiments, control-related changes implemented in interrupt service routines may involve changing values of pulse width modulation variables used in a main loop, which as noted may be similar to loop 252 in FIG. 7A, to control duration of a pulse widths for one or more controlled loads during each pulse width modulation loop cycle in which one or more output terminals of microcontroller 516 are energized. A pulse width modulation loop cycle typically comprises energizing one or more controlled loads at a beginning of a cycle, followed by multiple repetitions of a loop during which a loop counter is compared to a pulse width modulation variable for a particular microcontroller output terminal and load to determine when power is to be removed from that output terminal and controlled load. A pulse width modulation loop cycle is typically completed when a loop counter register overflows, but other criteria could also be used to complete a cycle and begin another.

However, in some embodiments, control-related actions or activities other than pulse width modulation of a load may also be implemented in interrupt service routines. Flowchart drawings and associated descriptions which follow provide examples of software which could be implemented in a main program and in interrupt service routines to extract information transmitted via AC power voltage waveforms and, in some example embodiments, to also implement control-related responses to such transmitted information.

Figure 17A:
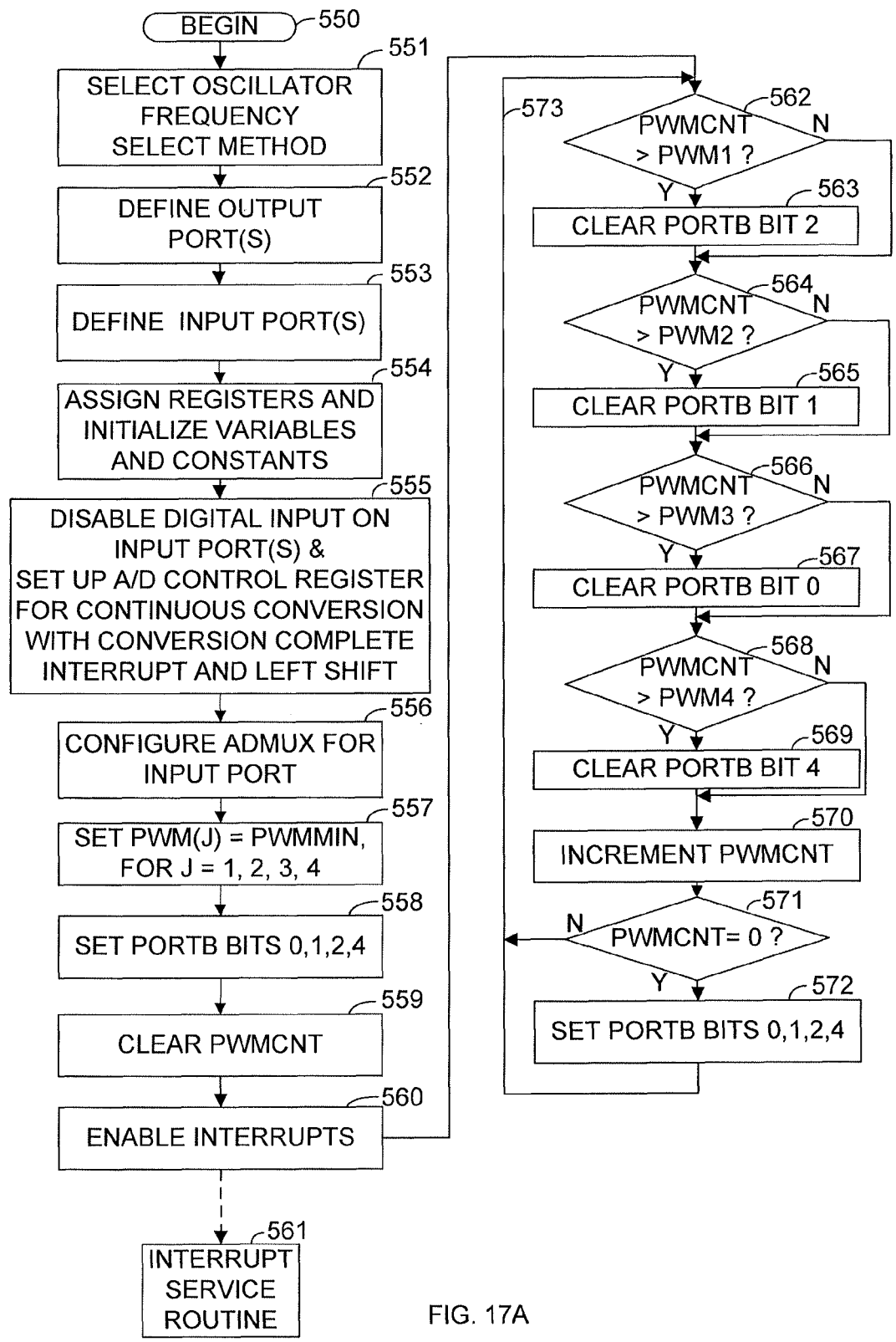
FIG. 17A illustrates an exemplary embodiment of software steps which may be implemented into a microcontroller as a main program to perform setup and configuration functions and to implement a loop that controls pulse width modulation of multiple loads.

FIG. 17A is a flowchart that illustrates an example of software that may be implemented in microcontroller 516 as a program to perform setup and configuration functions and to implement a loop that controls pulse width modulation of multiple loads, which in this example comprise different strings of LEDs, similar to an example for an embodiment for direct current (DC) applications disclosed earlier in FIGS. 6 through 8E and described in association therewith. In FIG. 17A, at step 551, an oscillator frequency is selected for microcontroller 516, and, in this example embodiment, a communications Method (e.g., from Method 2 through 7 discussed previously) is selected and stored. In many embodiments, these selections and some others identified below may be made and loaded during programming of a microcontroller for a particular application. Note that in the example embodiment, software capable of processing any of the Methods disclosed herein, or other related or suitable methods, may be loaded and stored in a microcontroller during manufacture of a light fixture or other device employing a communications Method, and selection of a Method to be used in a particular application may be made later (e.g., during product assembly or installation, or by an end user). In other embodiments, a particular Method may be selected and only the software needed to implement that Method may be loaded and stored in a microcontroller to be used for a particular application. From the disclosure and descriptions which follow of software to implement each method, show how to select and implement software for one or more Methods than described in the following.

Continuing now with a description of a flowchart of example software in FIG. 17A, at step 552 one or more output ports for a selected application are selected and properties defined as typically indicated in a data sheet for a selected microcontroller. At step 553, input ports for a selected application and selected circuit configuration are selected and properties defined. If a receiver circuit such as illustrated in FIG. 15A is adequate for a selected Method, one input port may be adequate, and may be configured via property selection per a microcontroller data sheet to use an integral analog-to-digital conversion capability. If a selected Method requires two input ports so that integrals may be performed on both positive and negative half-cycles, a receiver circuit such as illustrated in FIG. 15B may be used, and two input ports may be defined at step 553. At step 554, registers are assigned and variables and constants are initialized. These include initializing variables DATAPRESENT, SAMPLE COUNT (or SAMPLE COUNT1 and SAMPLE COUNT2, depending upon embodiment), POSITIVE SUM, NEGATIVE SUM, and START to "0" and setting MODE equal to "1." At step 555 input port(s) are further defined to disable digital inputs, enable analog-to-digital conversion capabilities, and set up an analog-to-digital control register for continuous conversion with Conversion Complete Interrupt and a left shift in analog-to-digital conversion results registers. In step 556, an analog-to-digital multiplexer control register ADMUX is configured to initially select an input terminal, which in an example embodiment is configured for a terminal that samples positive half-cycles. At step 557, pulse width modulation variables PWM(J) are initialized to their respective minimum values for each of four output terminals and loads. At step 558, selected bits are set in PORTB in order to energize selected output ports. At step 559, a loop counter, PWMCNT, used to help control pulse width modulation intervals is set to zero. At step 560, interrupts are enabled, which in this example include Analog-to-Digital Conversion Complete Interrupts, and interrupts are serviced by an interrupt service routine 561, described in detail later. Step 562 is an initial step in loop 573. Loop 573 is used to control pulse width modulation intervals for each output port in a manner similar to loop 252 in FIG. 7A, which was described in association with FIG. 7A and not repeated here. Values of pulse width modulation variables PWM1, PWM2, PWM3, and PWM4 are modified in one or more interrupt service routines responsive to information transmitted of AC power lines.

Figure 17B:
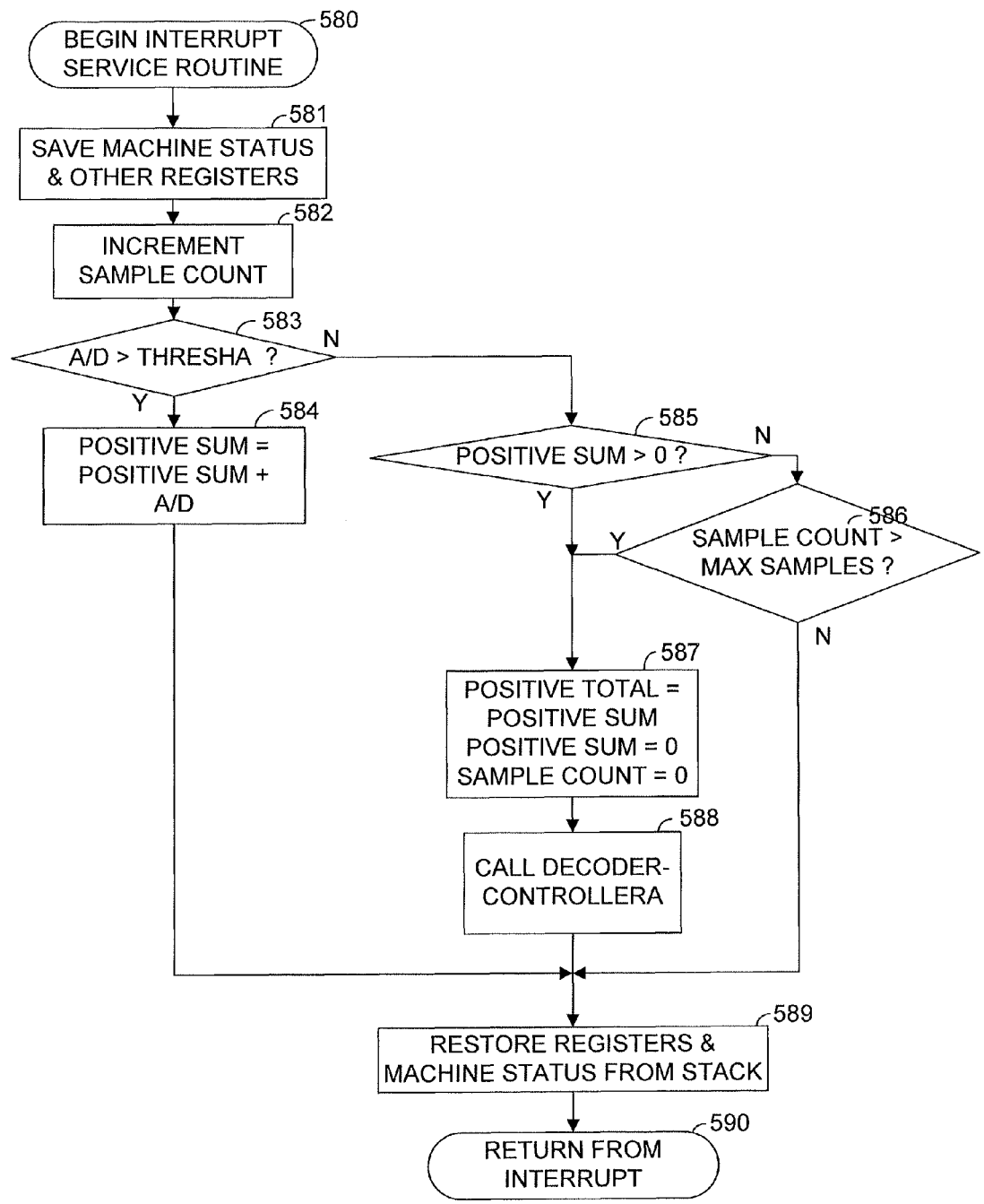
FIG. 17B illustrates steps in an exemplary method of an interrupt service routine that may be used in circuits, such as those illustrated in FIG. 15A.

FIG. 17B is a flowchart of an example of an interrupt service routine that may be used in circuits such as illustrated in FIG. 15A, that use only one input analog-to digital conversion port, and Methods that use integration of only positive half-cycles to support extraction or decoding of information in an AC power waveform. In FIG. 17B, after being triggered, in this example, by an A/D Conversion Complete Interrupt, machine status and other registers are saved to stack at step 581, and SAMPLE COUNT is incremented at step 582. SAMPLE COUNT is used to control a maximum duration of integration for a half-cycle for those cases where power is removed and voltage does not exceed and then fall below a threshold during a half-cycle interval. In step 583, if a result A/D of an analog-to-digital conversion exceeds threshold THRESHA, typically selected to be slightly above circuit thermal noise, then conversion result A/D is added to POSITIVE SUM at step 584, after which registers and machine status are restored from stack in step 589 and execution control is returned from interrupt service routine to a main program.

If result A/D does not exceed THRESHA at step 583, control passes to step 585, where the value of POSITIVE SUM is checked to determine if it exceeds zero, indicating that at least some previous samples have exceeded THRESHA since POSITIVE SUM was last set to zero. If POSITIVE SUM exceeds zero at step 585, an end of a half-cycle is indicated and control passes to step 587 where POSITIVE TOTAL is set equal to POSITIVE SUM, and POSITIVE SUM and SAMPLE COUNT are set to zero. At step 588, control passes to a routine DECODER-CONTROLLERA, described in association with FIG. 17C, which uses POSITIVE TOTAL result from a half-cycle integral to decode information in an AC power waveform and implement changes responsive to such information. After control returns from step 588, registers and machine status are restored at step 589, and a return from interrupt is executed at step 590.

If POSITIVE SUM is not greater than zero at step 585, then THRESHA has not been exceeded since POSITIVE SUM was last set to zero, indicating that power may have been removed from supplied AC power being monitored by this receiver embodiment. Thus control passes from step 585 to step 586 where SAMPLE COUNT is compared to MAX SAMPLES, which is based on a number of samples made during an AC power half-cycle interval at a selected sampling rate, plus a small margin. If MAX SAMPLES has not been exceeded, control passes to step 589 where registers and status are restored as before in preparation for a return from interrupt at step 590. If SAMPLE COUNT exceeds MAX SAMPLES at step 586, indicating an end of a half-cycle interval, control passes to step 587, where variable values are assigned as described earlier. Note that for the logic path just described, POSITIVE TOTAL will now be equal to zero when routine DECODER-CONTROLLERA is called at step 588, indicating power has been off for at least a half-cycle.

Figure 17C:
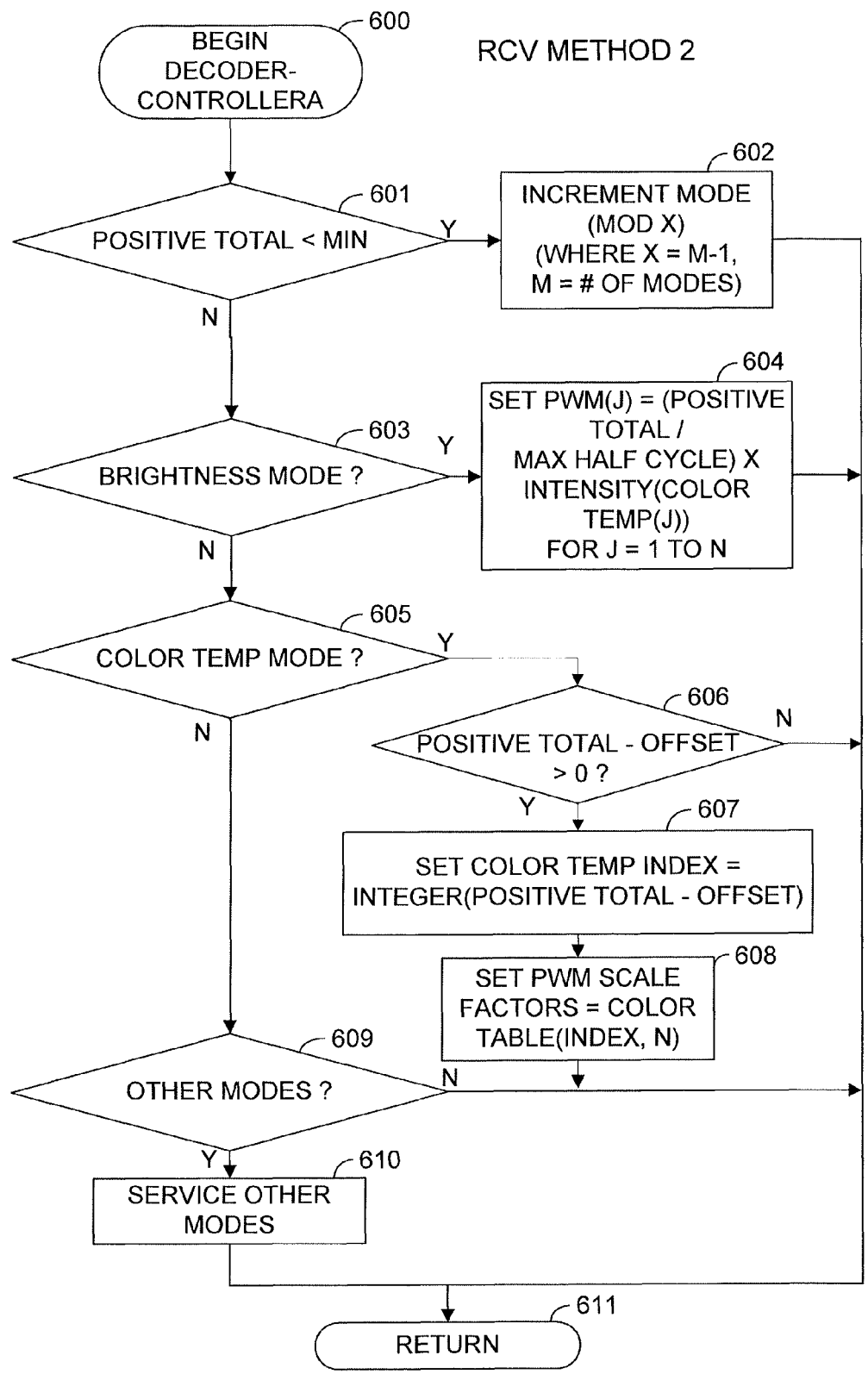
FIG. 17C illustrates steps in an exemplary method for implementing logic to support Method 2 as described herein.

FIG. 17C provides an example of logic that could be implemented in an embodiment to support Method 2, as described earlier, wherein an example receiver and controller such as illustrated in FIG. 15A may be used with software similar to that disclosed in association with FIGS. 17A, 17B, and 17C to provide a capability to extract information from an AC power waveform, such as illustrated in FIGS. 10A and 10B, from a conventional light dimmer control in order to control both intensity and color temperature of a light fixture having two or more LEDs or strings of LEDs having different color temperatures. As noted, Method 2 may be implemented using a dependent approach, wherein information related to available power in an AC waveform from a conventional dimmer switch is used to automatically adjust color temperature dependent upon overall intensity of light output from a light fixture. Method 2 may also be implemented in an independent approach, wherein information in an AC waveform from a conventional dimmer switch is used in one mode to control intensity of light from a fixture and is used in a different mode to control overall color temperature of light from a light fixture having two or more LEDs or strings of LEDs having different color temperatures as described earlier herein. An example circuit disclosed in FIG. 15A and example software disclosed in FIGS. 17A through 17C permit a user to change from one mode to another by using a power on/off switch integral to a conventional light dimmer control switch to momentarily turn power off to a controlled light fixture, and then back on, nominally within about a quarter-second or less, although where larger capacitors are used to provide power to the microcontroller, a longer period of time for changing the mode would be implemented.

In Methods 3 through 6, there is communication of commands in digital form. The PWM duty cycle for these Methods may be incremented or decremented from an existing value based on received command data. In Method 2, the duty cycle for LEDs or other controlled devices is set directly based on values of half-cycle integrals, so the approach for combining brightness and color temperature is a bit more complex. If brightness alone were to be controlled, then the approach would be more direct. The scaled value of the input (e.g., the value of a half-cycle integral of an input AC power waveform) is applied to the PWM register. When the brightness of the individual LEDs is to be controlled by two quantities, brightness and color temperature, then the color temperature value is used to scale the brightness. The values to be stored in color temperature registers are relative percentages. For example, if there are LEDs with four color temperatures installed, relative brightness values for each color temperature would vary depending on a desired equivalent color temperature. Suppose that these four values were 100%, 75%, 30% and 10%. When the brightness setting is 63% then the final output to each color temperature is 63%, 47%, 19% and 6.3%. The four values are recalculated in an interrupt routine each time the input changes and are applied asynchronously in a loop in a main program that tests individual PWM values and turns off those that are less than a loop counter. When the loop counter overflows, the outputs are turned on.

In FIG. 17C, after routine DECODER-CONTROLLERA is called at step 600, a comparison is made at step 601 to determine if POSITIVE TOTAL is less than MIN, a value selected to determine whether a low value of POSITIVE TOTAL should be counted as a positive half-cycle with limited power (as from a conventional dimmer control set to lowest power), or whether a low value of POSITIVE TOTAL indicates that power has been removed from supplied AC power for at least a half-cycle, indicating a possible beginning of a momentary power outage initiated by a user as part of a mode change sequence. If POSITIVE TOTAL is less than MIN at step 601, control passes to step 602 where variable MODE is incremented but which has a modulo established which is one less that a number of supported modes, thus allowing a user to change modes by causing a momentary power outage having a typical duration of a quarter second or less. In this example, a mode change occurs after POSITIVE TOTAL for one positive half-cycle falls below MIN, but in other embodiments, additional logic could be used to require that POSITIVE TOTAL for several half-cycles in succession fall below MIN before a mode change event is executed. Control then passes from step 602 to return control to a calling routine at step 611. If POSITIVE TOTAL is not less than MIN at step 601, control passes to step 603 where a check is made to determine if a value of MODE matches a value assigned to a mode called in out example a BRIGHTNESS MODE. If so, control passes to step 604 where values of PWM variables (typically two or more such variables, with four being used in the present example) may be adjusted to change, in this example, overall brightness of an assembly of LEDs in a light fixture according to an algorithm that generally maintains an existing color balance or color temperature, for example, where a pulse width modulation variable (PWM(J)) for each string of LEDs in FIG. 15A is adjusted based on a ratio of a value POSITIVE TOTAL of an integral of a positive half-cycle over a maximum integral value MAX HALF CYCLE of a half-cycle integral multiplied by an existing intensity value for a particular color temperature string of LEDs. Additional logic, similar to logic described in association with FIGS. 7A through 8E, may be added where desired to limit a range of adjustment of intensity to prevent shifting of color temperature as upper or lower intensity limits are reached.

After PWM values are adjusted in step 604, control passes to step 611, where control is returned to a calling routine. If a value of MODE does not match a value selected for BRIGHTNESS MODE in step 603, then control passes to step 605 where a comparison is made to determine if a value of MODE matches a value assigned to a COLOR TEMP MODE. If so, control passes to step 606 where a comparison is made to determine if a value of POSITIVE TOTAL is greater than a value of OFFSET, where OFFSET is a predefined value of an integral of a half-cycle of an AC waveform that represents some percentage, nominally between 70 percent and 80 percent, of power supplied to a light fixture when a conventional light dimmer control is adjusted to a full brightness setting. This offset is used to help insure that overall brightness from a light fixture is sufficient that a human can perceive and select a desired change in color temperature from a fixture when control has changed to a color temperature mode. If POSITIVE TOTAL is not greater than OFFSET at step 606, no adjustment is made to color temperature, and control passes to step 611 for a return to a calling routine. After a user has adjusted a conventional dimmer control so that available power to a controlled light fixture exceeds a selected nominal amount (e.g., 70 or 80 percent of full power), POSITIVE TOTAL is greater than OFFSET at step 606 and control passes to step 607. In step 607, a value of a COLOR TEMP INDEX is set, in this example, equal to an integer value based upon an amount POSITIVE TOTAL is greater than OFFSET.

Thus, an index, which may be used in a lookup table to adjust a perceived composite color temperature coming from a light fixture, is based upon POSITIVE TOTAL values (from half-cycle integrals) where available power and thus overall intensity of light from such a fixture is sufficient for a human to perceive and adjust color temperature as desired. A value of COLOR TEMP INDEX may then be used in step 608 in a table lookup to select and implement different values of pulse width modulation variables so that light output from a controlled fixture is modified in near real time with adjustments of a conventional dimmer control switch being made by a user. Values of pulse width modulation variables stored in such lookup table as a function of COLOR TEMP INDEX may be selected to provide different effects and ranges of effects as a user adjusts a conventional dimmer control switch in a range above a power setting corresponding to a selected value of OFFSET. After changes to pulse width modulation variables are selected based upon a current value of POSITIVE TOTAL and implemented in an interrupt service routine, such values are available to and used with loop 573 of FIG. 17A so that changes in color temperature become immediately visible to a user. After a user has selected a desired color temperature, a user may then change modes again by momentarily switching power off and then back on using an on/off switch function found in typical convention light dimmer control switches. If no additional modes are implemented at step 609, which would be serviced by additional logic in step 610, then a controlled light fixture implementing logic as described in FIG. 17C would return to a BRIGHTNESS MODE which permits a user to make further adjustment to light intensity (at a selected color temperature) using a conventional dimmer control light switch in its convention manner.

FIG. 17C and associated description disclose an implementation of what was referred to earlier as an independent approach to controlling intensity and color temperature. An embodiment using a dependent approach to controlling color temperature as a function of overall light intensity may be implemented using a simplified version of a flowchart illustrated in FIG. 17C, wherein only one mode is used, namely a BRIGHTNESS MODE, but where color temperatures are adjusted in step 604 using a lookup table wherein an index is based upon a discrete value of POSITIVE TOTAL (related to overall power available or overall intensity), and values of pulse width modulation variables, for LEDs or LED strings having different color temperatures, are selected to provide a desired effect, such as following a color temperature curve for a tungsten filament as its temperature and intensity are changed.

Figure 18A:
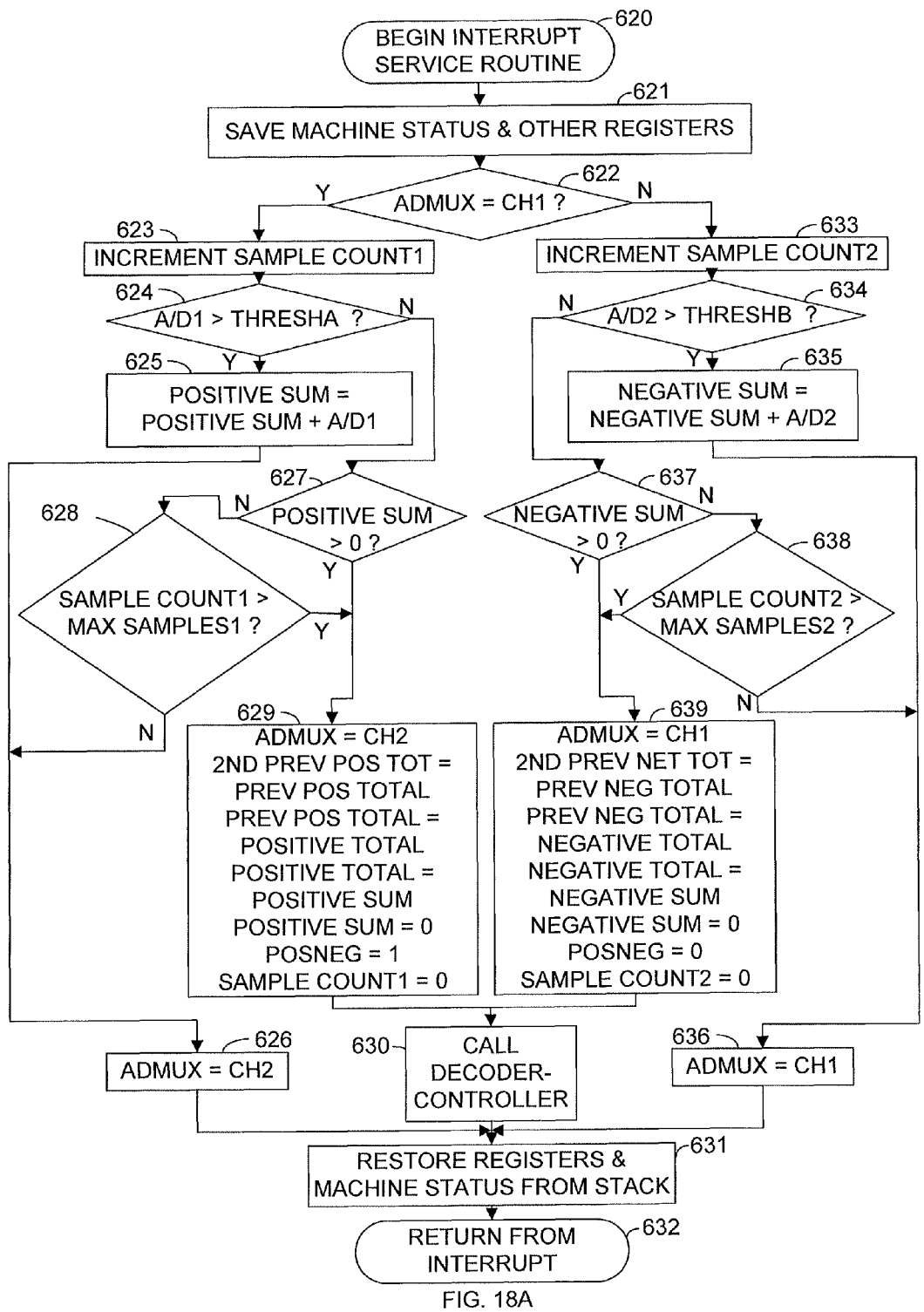
FIG. 18A illustrates an exemplary embodiment of software steps that may be implemented in an interrupt service routine in a microcontroller in embodiments that use a circuit, such as that illustrated in FIG. 15B.

FIG. 18A provides an example of software that may be implemented in an interrupt service routine in a microcontroller in embodiments that use a circuit such as illustrated in FIG. 15B that uses two input ports to allow separate integration of positive half-cycles and negative half-cycles of an input AC power waveform that may be modified according to a Method for information transfer disclosed herein. In such embodiments, when an interrupt service routine is triggered by an A/D Conversion Complete Interrupt after interrupts are enabled at step 560 of a main program such as illustrated in FIG. 17A, a first interrupt occurs after completion of an analog-to-digital conversion based upon an input port selected during initialization of ADMUX (reference data sheet for ATMEL AVR ATtiny13A), which in an example embodiment disclosed here is a port that normally performs analog-to-digital conversions on positive half-cycles of an input waveform. In FIG. 18A, after step 621 where machine status and other register values are stored, a check is made at step 622 to determine which input channel was digitized to provide a conversion value stored in a register (or a pair of registers—ADCH and ADCL for an ATtiny13A) holding analog-to-digital conversion results, referred to in FIG. 18A as A/D1 if such value represents results from integration of inputs on a port assigned for integration of positive half-cycles, and A/D2 if such value represents results from integration of inputs on a port assigned for integration of negative half-cycles. (For most applications, it is adequate to use an 8-bit conversion result stored left-shifted in ADCH to represent results of an A/D conversion.)

At step 622, if an input port selection value in ADMUX was set for a input port (e.g., CH1) configured to receive and perform analog-to-digital conversions on positive half-cycles of an AC power waveform, control passes to step 623 where SAMPLE COUNT1, a variable used to limit an integration period for positive half-cycles for Methods and situations where no power is applied for one or more half-cycles, is incremented. At step 624, conversion result A/D1 is compared to THRESHA, a threshold value selected to separate valid positive voltage values from thermal or other noise. If A/D1 is greater than THRESHA, A/D1 is added to POSITIVE SUM at step 625, thereby contributing to an integral of voltage versus time under a positive half-cycle of an input AC power waveform. Control then passes to step 626 where an input port selection value in ADMUX is changed to select a port, for the next A/D sample and conversion cycle, configured to receive and perform analog-to-digital conversions, in a positive domain with respect to microcontroller ground, on negative half-cycles of an AC power waveform. Control then passes to step 631 where registers and machine status saved at step 621 are restored before a return from interrupt at step 632. At step 624, if A/D1 is not greater than THRESHA, control passes to step 627 where a check is made to determine if POSITIVE SUM is greater than zero, indicating a possible end of a positive half-cycle where some samples contributed values greater than zero to POSITIVE SUM. If POSITIVE SUM is greater then zero, control then passes to step 628 where an input port selection value in ADMUX is changed to select an input port for negative half-cycles for the next A/D sample, and values of previous POSITIVE TOTAL integrals are shifted into variables 2ND PREV POS TOTAL and PREV POS TOTAL before a value in current POSITIVE SUM is assigned to POSITIVE TOTAL, and POSITIVE SUM is set to zero for a future half-cycle integral. Thus, in this example, a memory is retained of results of a most recent integral during a positive half-cycle period as well as results of at least two previous positive half-cycle integrals. These values are needed in decoding data transmitted using some Methods as described later herein, but are not necessary for simpler embodiments using other Methods, as will become apparent from descriptions of receiver processing flowcharts for different Methods. Also in step 629, a variable POSNEG, used as a flag to indicate whether routine DECODER CONTROLLER is called after completion of an integral of a positive half-cycle or a negative half-cycle, is set equal to "1," indicating completion of a positive half-cycle. In addition, variable SAMPLE COUNT1 is reset to zero in preparation for a subsequent half-cycle integration period.

Figure 18B:
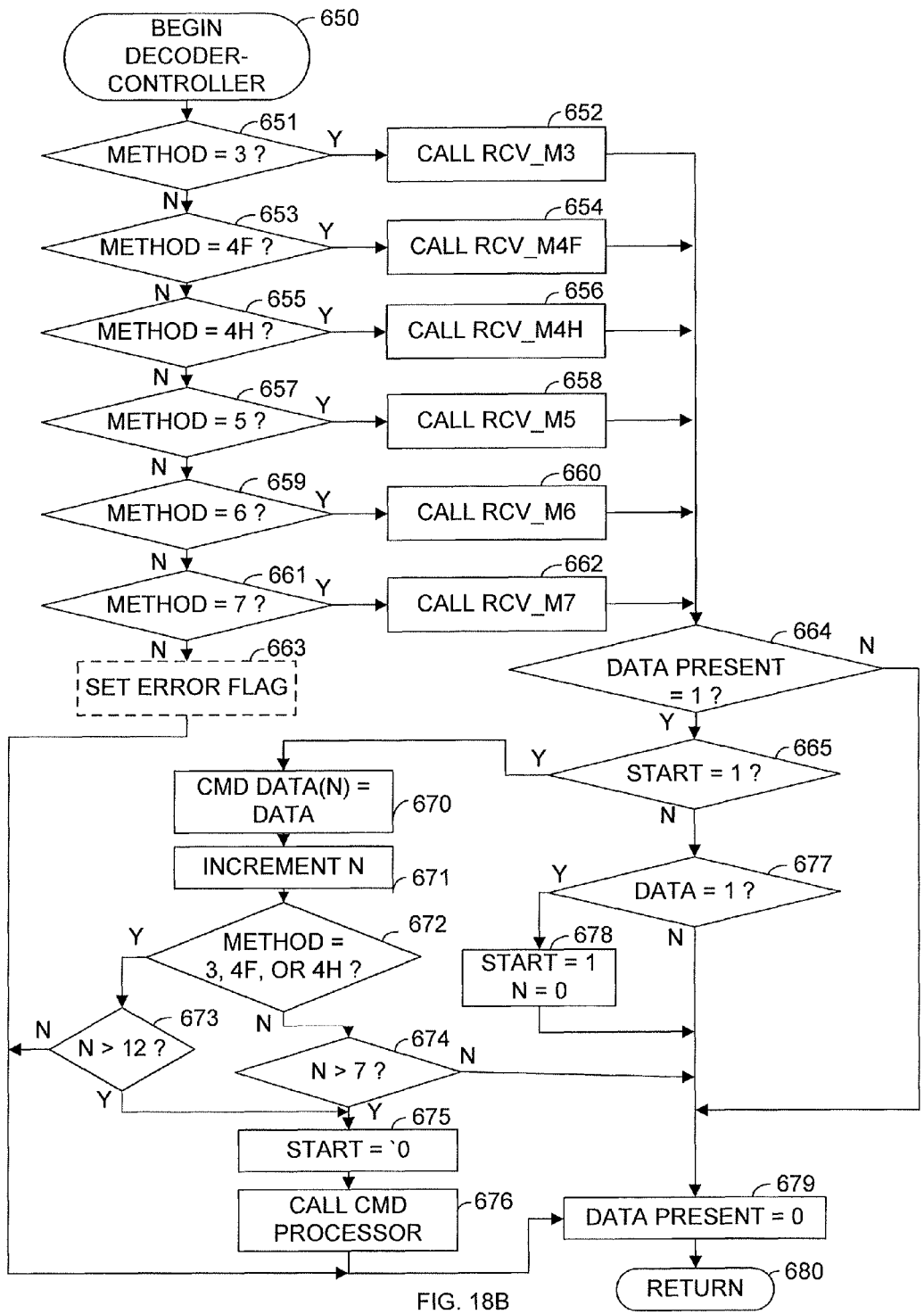
FIGS. 18B-18G illustrate steps in an exemplary method for selecting appropriate software from stored software during execution of a given Method as described herein.

Control then passes to DECODER CONTROLLER, described in association with FIG. 18B, via a call at step 630. After processing control is returned from DECODER CONTROLLER, registers and machine status are restored at step 631 and a return from interrupt is executed at step 632. At step 627, a value of POSITIVE SUM not greater than zero indicates that none of the analog-to-digital conversion samples accumulated through the current interrupt, during the current half-cycle integration period, have exceeded THRESHA, which can occur with Method 2, 3, 5, or 6, or when a user has removed power momentarily (as for a mode change) or longer, so control passes to step 628 to determine if SAMPLE COUNT1 has exceeded MAX SAMPLES1, a value selected based on a sampling rate being provided for positive half-cycles and a maximum number of samples, plus a small margin, typically one or two samples, that may be performed during a half-cycle interval for an AC frequency (e.g., 60, 50, or 400 cycles per second) being supported in a particular embodiment and application. If SAMPLE COUNT1 has not exceeded MAX SAMPLES1, then control passes to step 626, where an input port selection value in ADMUX is changed to select an input port for negative half-cycles for the next A/D sample. Processing control then passes to step 631 where registers and machine status are restored before returning from interrupt at step 632. If SAMPLE COUNT1 has exceeded MAX SAMPLES1 at step 628, an end of a half-cycle sampling period has been reached without any A/D samples exceeding THRESHA, indicating possible data if Method 5 is being used, or a possible beginning of a mode change event if Method 2 or Method 7 is being used, so control is passed to step 629 where processing continues as described earlier for step 629, after which control passes to DECODER CONTROLLER at step 630. After processing control returns from DECODER CONTROLLER, processing control moves to step 631 where registers and machine status are restored prior to execution of a return from interrupt at step 632. At step 622, if an input port selection value in ADMUX is not directed to an input port for positive half-cycles, control branches to logic beginning at step 633 that supports processing of analog-to-digital conversion samples received via an input port configured to receive, and support integration of, negative half-cycles. Processing logic for analog-to-digital conversion results for negative half-cycles of an input AC power waveform is similar to processing logic described earlier for A/D conversion results for positive half-cycles and should now be evident, based on the flowchart in FIG. 18A and an earlier description of processing flow for A/D conversion results for positive half-cycles.

When DECODER-CONTROLLER is called, beginning at step 650 in FIG. 18B, an initial decision, in this example embodiment, is to use a Method identifier selected during initialization (reference FIG. 17A and associated description) to select an appropriate processing routine for a selected Method. Recall that it was noted in describing FIG. 17A that in some embodiments, software capable of supporting multiple Methods may optionally be loaded in microcontroller memory, with a selection of which Method to use for a particular application being made during production assembly of a product employing a Method. An example flowchart in FIG. 18B and supporting flowcharts (FIGS. 18C through 18G) illustrate how software for a selected Method may be selected from stored software during execution. However, embodiments may be developed which use and load software for only one of the Methods disclosed herein. In steps 651, 653, 655, 657, 659, and 661 ("METHOD=3?," "METHOD=4F?," "METHOD=4H?," "METHOD=5?," "METHOD=6?," and "METHOD=7?," respectively), a Method identifier selected during initialization of a microcontroller is use to select which routine to call from steps 652, 654, 656, 658, 660, and 662 ("CALL RCV_M3," "CALL RCV_M4F," "CALL RCV_M4H," "CALL RCV_M5," "CALL RCV_M6," and "CALL RCV_M7," respectively), to process results from a most recent half-cycle integration as described in FIG. 18A. An optional error flag may be set at step 663 if no match is found before DATA PRESENT is reset to zero at step 679 and processing control is returned to a calling program at step 680. When a Method match is found and a selected integration results processing routine is called, processing control passes to step 664 after processing control is returned from a called routine. In step 664, a DATA PRESENT flag is used to indicate whether valid data was returned. If not control passes to step 679 and to a calling program at step 680.

If valid data is present, control passes from step 664 to step 665 where a check is made to determine if a START flag has be set to indicate that an ASCII start bit has been previously received. Note than in an example embodiment described here, ASCII code is used as a convenient code for transmission of data. However, other conventional or customized data transmission codes could be used for particular applications and embodiments. In standard ASCII character transmission techniques, a beginning of an ASCII character is signaled by a "start bit" which is a "1" following an "off" bit. The start bit is then followed by 8 bits that comprise a code for an ASCII character, which is then followed by a "stop bit" which is typically a "0." Thus, in this example, if a START flag has not been previously set at step 665, control passes to step 677 where a check is made to see if data received from a results processing routine was a "1." If so, processing control passes to step 678 where a START flag is set to "1" to indicate that following data bits comprise a code for an ASCII character, and bit counter N is set to zero before processing control is returned to steps 679 and 680, described earlier. When DECODER-CONTROLLER is called again after a subsequent half-cycle integration is completed (see FIG. 18A), and valid data is returned from a results processing routine, so that START equals "1" at step 665, control passes from step 665 to step 670 where DATA returned from a results processing routine is stored in an appropriate location in a variable established to accumulate received data bits. For ASCII data, received bits may be shifted into a most significant bit of a designated storage register so that bits will be in appropriate order after the bits in a character code are received since least significant bits of an ASCII character code are transmitted first in standard ASCII implementations.

After a received bit is stored at step 670, variable N is incremented at step 671, and a check is made at step 672 to determine if a Method being used in a particular embodiment and application is Method 3, 4F, or 4H. When ASCII characters are transmitted using these methods, there is a possibility of a net electrical charge imbalance developing between an AC power transmitter location and an AC power receiver location. Although this is generally not a problem, a charge imbalance could be important for particularly sensitive equipment installations. Consequently, methods consistent with the present invention provide for transmission of charge balance bits if required for selected applications and embodiments. A maximum of three additional bits may be required to rebalance electrical charge after transmission of codes for certain ASCII characters according to some of the Methods disclosed here. Generation and transmission of such charge balance bits is described later herein in descriptions of transmitter circuits and software. For embodiments where charge balance bits are used, a test is made at step 672 to determine if Method 3, 4F, or 4H is being used. If so, control branches to step 673 so that additional charge balance bits may be allowed to pass before START is reset at step 675 in preparation for reception of another ASCII character. Use of charge balance bits may lead to a total bit count of up to 13 associated with an ASCII character transmission (only the first 8 bits comprise ASCII data, remaining bits are discarded).

For Methods that do not employ charge balance bits, processing control passes from step 672 to step 674 where a check is made to determine if N is greater that "7." If so, a complete code for an ASCII character has been received, and control passes to step 675, where START is reset to zero in preparation for receptions of a subsequent ASCII character, and a call is made to CMD PROCESSOR at step 676 to implement an appropriate response, depending upon a particular application and embodiment, to a received character or command code. From step 676, processing control passes to step 679 where DATA PRESENT is reset to zero prior to returning control to a calling program at step 680. CMD PROCESSOR may be similar to software illustrated if FIGS. 8A through 8E and described in association therewith, or other custom software appropriate to other applications and embodiments.

Figure 11A:
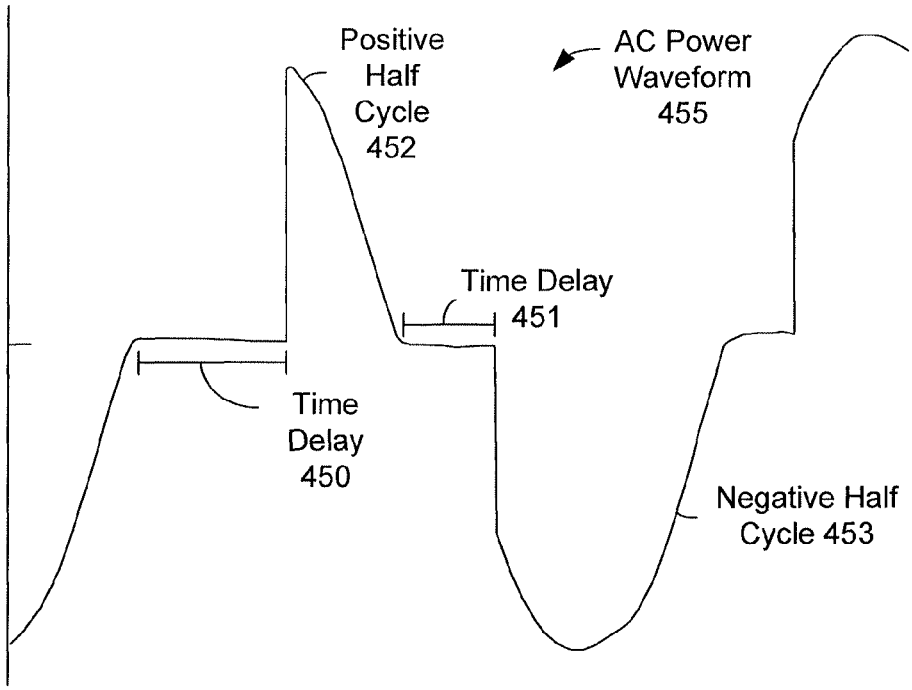
FIGS. 11A and 11B illustrate representative waveforms for data transmitted using Method 3 in accordance with methods and systems consistent with the present invention.
Figure 11B:
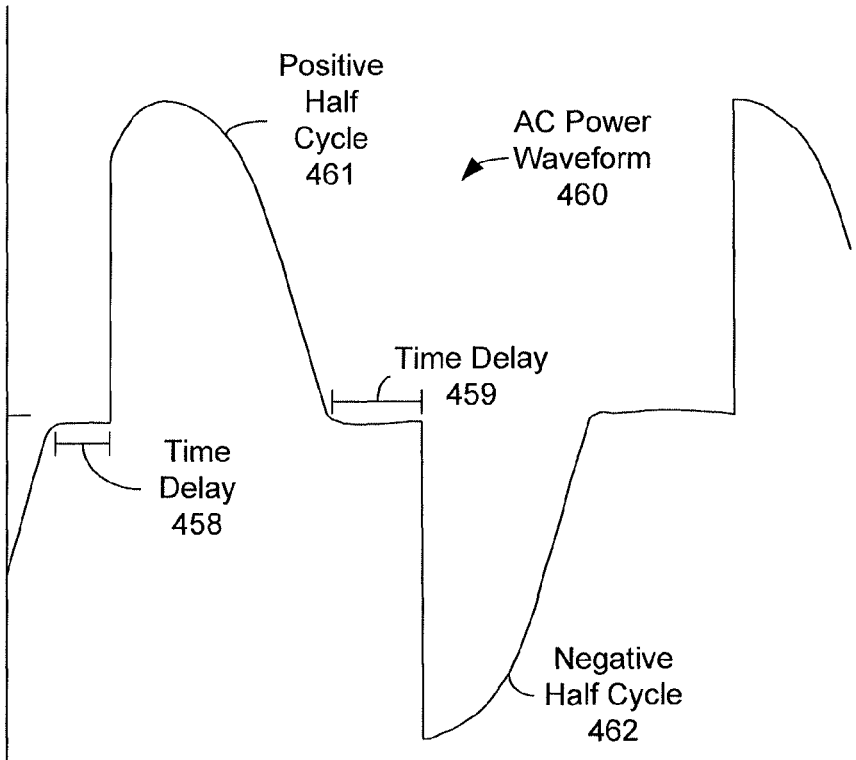
Figure 18C:
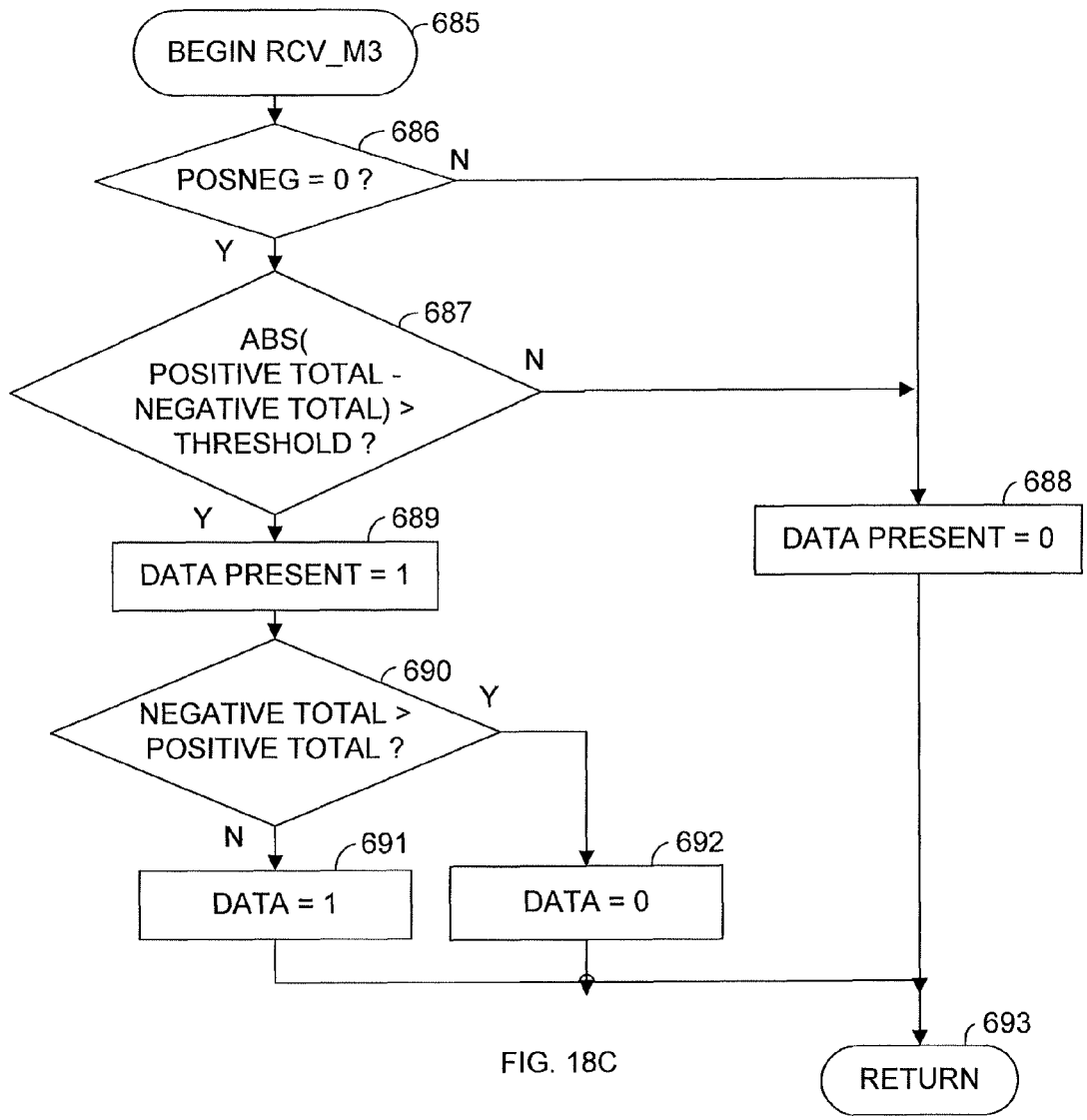

FIG. 18C is a flowchart of example software that may be called at step 652 of FIG. 18B to process potential data using Method 3. Refer to FIGS. 11A and 11B for representative waveforms for data transmitted using Method 3. Data may be transmitted in ASCII code, for instance, where the first unequal energy level condition following at least one full cycle with both half cycle containing equal energy levels constitutes a start bit in the ASCII code. The polarity of the first data bit is known and is constant. Likewise, the stop bit polarity is constant. Commands may be sent as selected ASCII characters, such as "U", "D", "C" and "W". Any series of bits that do not match one of these characters may be discarded. Any subsequent cycle of a standard ASCII character containing equal energy levels constitutes an error and the decoding process reverts to a reset condition. The data is recovered from the 9 cycles of AC power following the first cycle in which the integrated value of any half cycle is significantly less than the integrated value of the preceding half cycle. Similarly, any transmission that meets the definition of a valid ASCII character, but is not included in the command list for the controller in use, constitutes an error and may be ignored. Stating the test in this manner allows the AC input to be full wave rectified without loss of information. There is no requirement to preserve the identification of whether the half cycle was sent as a positive pulse or a negative pulse. At any point in the reception of a character, the failure of any bit to meet the requirement of differing integration values results in the abandonment of the decoding sequence. A new decoding sequence does not begin until at least one cycle of power has been received with equal values for positive and negative half cycles. This Method of reception is much more likely to fail due to rejection of proper commands than due to the acceptance of improper commands.

An additional consideration of Method 3 is that there is a possibility of unequal electrical charge being accumulated on between a transmit device and a receive device on a transmission line. To maintain zero net charge, it may be desirable to transmit null characters or data bits that are ignored by the decoder and are transmitted for the purpose of charge balancing. An example would be in the transmission of an ASCII "A", which has three more "1"s than "0"s. The excess "1"s can be balanced by sending three "0"s immediately after the stop bit. Any number of "1"s or "0"s sent after the stop bit will be ignored by the decoder because a valid start bit is preceded by a null cycle with equal energy levels for both half cycles.

At step 686 of FIG. 18C, POSNEG is checked to determine if DECODER-CONTROLLER was called at step 630 of FIG. 18A after completion of integration of a positive half-cycle (POSNEG=1) or a negative half-cycle (POSNEG=0). For Method 3, in our example embodiment, data is encoded using a positive half-cycle followed by a negative half-cycle, so data decoding is performed after receipt of a negative half-cycle in a positive and negative half-cycle pair. Consequently, if POSNEG is not equal to zero at step 686, processing control passes to step 688 where DATA PRESENT is set to zero to indicate that no valid data was generated from this call to RCV_M3, and control is returned to a calling routine at step 692 to await reception of information after integration of a negative half-cycle. When POSNEG is equal to zero at step 686, control passes to step 687 where a check is made to determine if an absolute value of a difference between an integral of a preceding positive half-cycle (POSITIVE TOTAL) and an integral of a negative half-cycle (NEGATIVE TOTAL) is greater that a THRESHOLD used to separate significant differences resulting from data transmission according to Method 3 from differences that may result from noise or transients on a AC power line.

Where the difference does not exceed THRESHOLD, processing control is returned through steps 688 and 693 as described earlier to await a subsequent call. Where the difference does exceed THRESHOLD at step 687, control passes to step 689 where DATA PRESENT is set to "1" to indicate valid data has been received, and a comparison is made at step 690 to determine if NEGATIVE TOTAL is greater than POSITIVE TOTAL. If so, DATA transmitted according to Method 3 set to "0" at step 692. If not, DATA is set to "1" at step 691. Processing control then passes from step 691 or 692 to return to a calling routine at step 693.

Figure 18D:
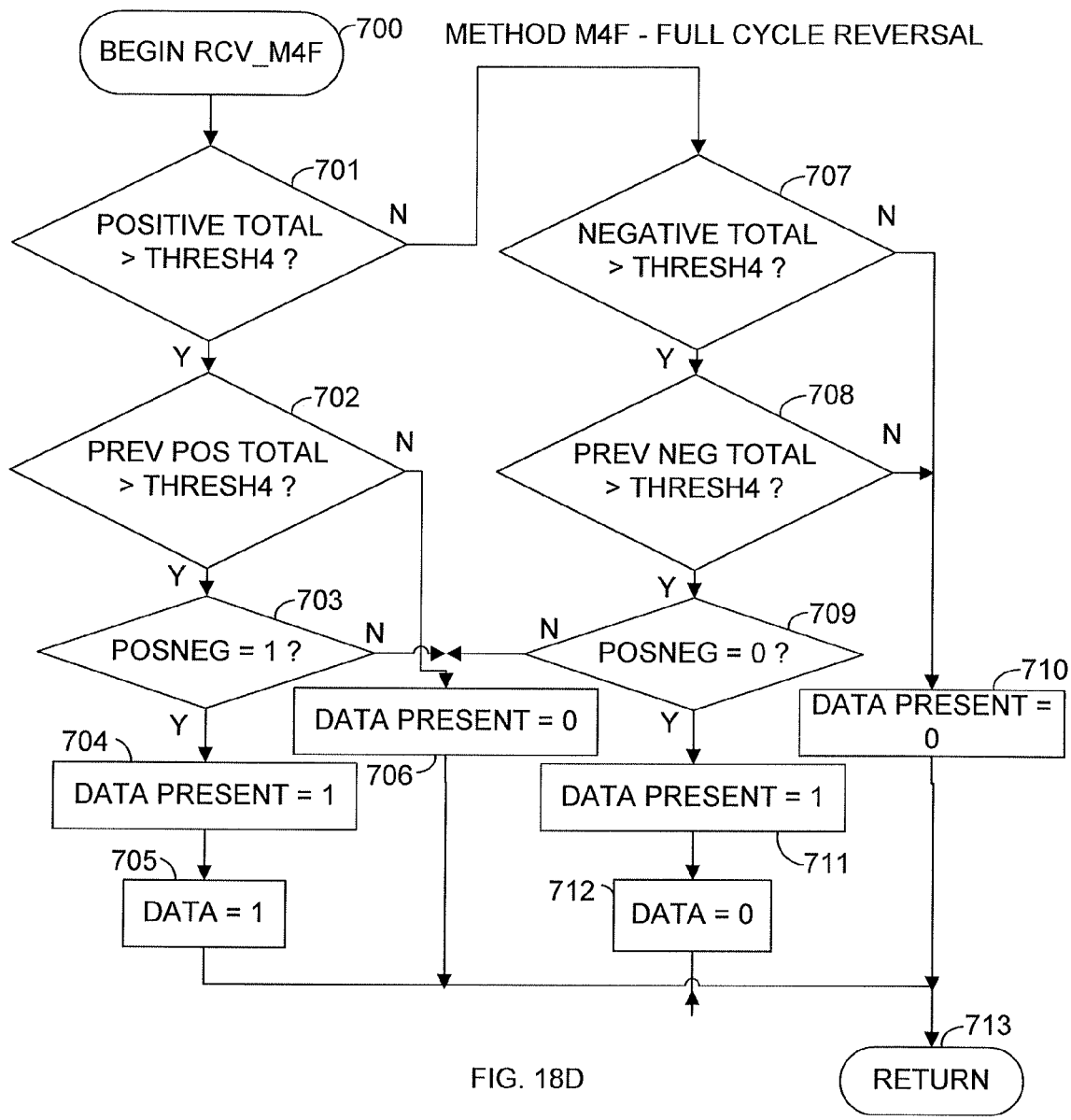

FIG. 18D is a flowchart of example software that may be called at step 654 of FIG. 18B to process potential data using Method 4F, which uses polarity reversal of a full cycle following either a positive half-cycle or a negative half-cycle to indicate transmission of a "1" or "0," respectively. Refer to FIG. 12A for a representative waveform for data transmitted using Method 4F. The benefit of this method of modulation is that there is no diminution of energy is required to transmit information. The limitation of use is that this method is not allowed for use in single phase sub-circuits where one of the conductors is required to be at zero potential. This method is applicable to situations where there are two or more conductors that are not required to be at ground potential. An example would be a 220-volt circuit such as used for water heaters, ovens and high-wattage heaters that distribute two phases to a load, in addition to a neutral conductor.

Specialized applications of two-wire, single-phase circuits where the phase reversal method can be used are irrigation control systems, Christmas lighting, amusement industry lighting, electronic signage, architectural lighting, decorative fountains and any application where elimination of control lines in addition to the power conductors presents an advantage. An example is when power is connected through a transformer and distribution of additional wiring is undesirable.

The ability to communicate through a transformer is a benefit of this method. Competing methods inject high frequencies onto the line, which do not pass through transformers. Limiting the distribution of control commands can be a benefit in some applications, such as limiting controls to a group of homes served by a common transformer. Homes sharing a power transformer use unique addresses to avoid control conflicts, but those served through a different transformer have no conflicts.

At step 701 of FIG. 18D, a comparison is made to determine if a result POSITIVE TOTAL from an integration of a positive half-cycle exceeds THRESH4, a value of which is selected to help insure POSITIVE TOTAL sufficiently large to represents an integration of a full positive half-cycle and not just transient data or noise. If so, control passes to step 702 where a similar test is performed to determine if PREV POS TOTAL exceeds THRESH4. If so, another test may be performed at step 703 using POSNEG equal to "1" to determine if RCV_M4F was called immediately after completion of an integral of a positive half-cycle. If so, confidence exists that a "1" was transmitted, and control passes to step 704 where DATA PRESENT is set to "1" and step 705 where DATA is set to "1" before control is returned to a calling routine at step 713. If POSITIVE TOTAL does not exceed THRESH4 at step 701, processing control passes to step 707 where a comparison is made to determine if a result NEGATIVE TOTAL of an integration of a negative half-cycle exceeds THRESH4. If not, criteria for valid data are not met, and control passes to step 710, where DATA PRESENT is set to zero before processing control is returned to a calling routine at step 713.

If NEGATIVE TOTAL exceeds THRESH4 at step 707, processing control passes to step 708 where a comparison of an integral of a previous negative half-cycle PREV NEG TOTAL is made to determine if THESH4 is exceeded. If not, criteria for valid data are not met and control passes to steps 710 through 713 ("DATA PRESENT=0?," "DATA PRESENT=1," "DATA=0," and "RETURN," respectively) as described earlier. If PREV NEG TOTAL exceeds THRESH4 at step 708, a test is made at step 709 to determine, using POSNEG="0" if RCV__4F was called after completion of an integral of a negative half-cycle. If so, confidence exists that a "0" was transmitted, so processing control passes to step 711 where DATA PRESENT is set to "1" and to step 712 where DATA is set to "0" before control is returned to a calling routine via step 713. When comparisons are negative at steps 702, 703, or 709 ("PREV POS TOTAL>THRESH4?," "POSNEG=1?," or "POSNEG=0?," respectively), criteria for valid data are not met, and processing control passes to step 706, where DATA PRESENT is set to "0" before processing control is returned to a calling routine via step 713. It should be noted that POSNEG tests at step 703 and 709 are optional for this Method and may not necessarily be used in some embodiments.

Figure 18E:
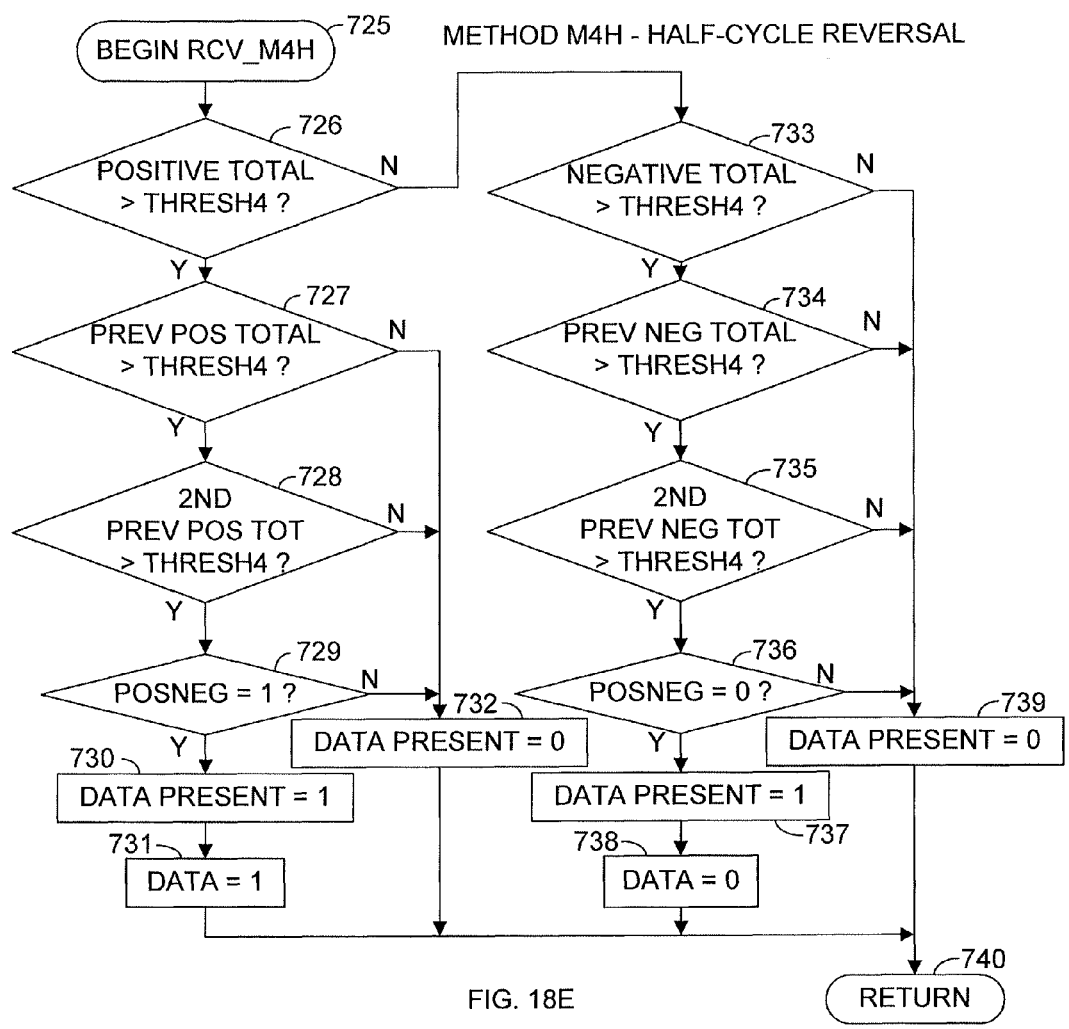

FIG. 18E is a flowchart of example software that may be called at step 656 of FIG. 18B to process potential data using Method 4H, which uses polarity reversal of a half cycle following either a positive half-cycle or a negative half-cycle to indicate transmission of a "1" or "0," respectively. Refer to FIG. 12B for a representative waveform for data transmitted using Method 4H. At step 726 of FIG. 18E, a comparison is made at step 726 to determine if POSITIVE TOTAL exceeds THRESH4, set as explained earlier. If so, processing control passes to step 727, where a comparison is made to determine if PREY POS TOTAL exceeds THRESH4. If so, processing control passes to step 728, where another comparison is made to determine if 2ND PREY POS TOT exceeds THRESH4. If so, control passes to step 729 where a test is performed to determine if POSNEG equals "1" indicating RCV_M4H was called following completion of an integral of a positive half-cycle. If so, confidence exists that a valid "1" was transmitted, so control passes to step 730 where DATA PRESENT is set to "1" and then to step 731 where DATA is set to "1" before processing control is returned to a calling routine at step 740. If POSITIVE TOTAL is not greater than THRESH4 at step 726, processing control passes to step 733 where a comparison is made to determine if NEGATIVE TOTAL is greater than THRESH4. If so, control passes to step 734 where a comparison is made to determine if PREY NEG TOTAL is greater than THRESH4. If so, control passes to step 735 where a comparison is made to determine if 2ND PREY NEG TOT is greater than THRESH4. If so, control passes to step 736 where a test is performed to determine if POSNEG equals zero indicating RCV_M4H was called following completion of an integral of a negative half-cycle. If so, confidence exists that a "0" was transmitted, so control passes to step 737 where DATA PRESENT is set to "1" and then to step 738 where DATA is set to "0" before processing control is returned to a calling routine via step 740. If comparisons are negative at any of steps 727, 728, 729, 733, 734, 735, or 736 ("PREV POS TOTAL>THRESH4?," "$2^{ND}$ PREV POS TOT>THRESH4?," "POSNEG=1?," "NEGATIVE TOTAL>THRESH4?," "PREV NEG TOTAL>THRESH4?," "$2^{ND}$ PREV NEG TOT>THRESH4?," or "POSNEG=0?," respectively), criteria for valid data are not met, and control is returned to a calling routine via steps 732 or 739, where DATA PRESENT is set to zero, and RETURN step 740. POSNEG tests at steps 754 and 761 establish confidence in valid data but are optional and may be omitted in some embodiments.

Figure 18F:
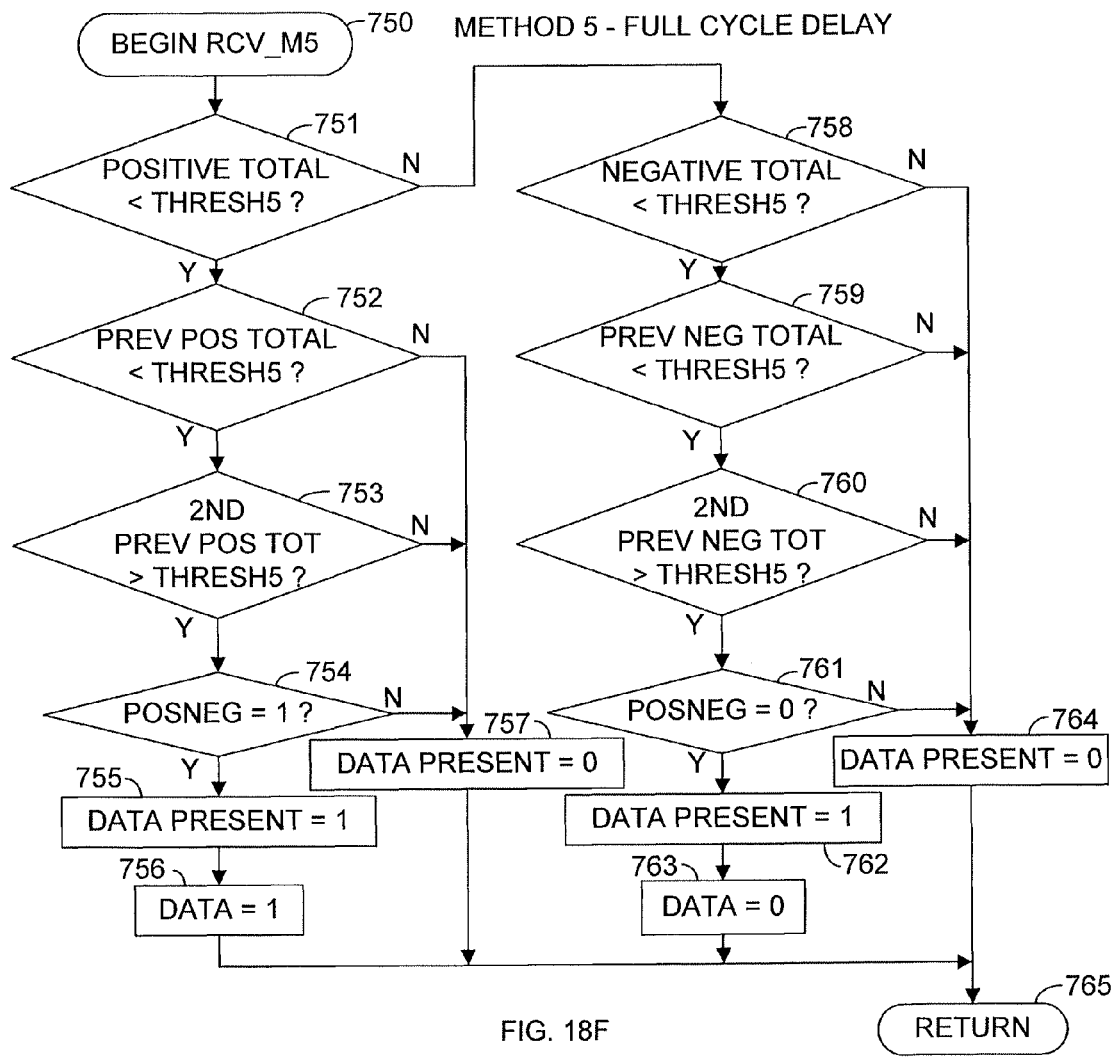

FIG. 18F is a flowchart of example software that may be called at step 658 of FIG. 18B to process potential data using Method 5, wherein flow of current is blocked for one full cycle following a positive half-cycle or a negative half-cycle, indicating transmission of a "1" or a "0", respectively. Refer to FIG. 13 for a representative waveform for data transmitted using Method 5. Method 5 is used by applications where the loss of one or more cycles of AC power does not materially affect operation. There must be a minimum of one full cycle of power following a data bit. As with the other methods, data can be transmitted in ASCII coding. A unique aspect of this modulation technique is that it is inherently DC balanced.

At step 751 of FIG. 18F a comparison is made to determine if POSITIVE TOTAL is less that THRESH5, where a value for THRESH5 is selected to help insure that half-cycle integrals with values less than THRESH5 are likely to represent half-cycles where current flow has been prevented. If POSITIVE TOTAL is less than THRESH5 at step 751, control passes to step 752 where a comparison is made to determine if PREV POS TOTAL is also less than THRESH5. If so, control passes to step 753 where a comparison is made to determine if 2ND PREV POS TOT is greater than THRESH5. If so, a test is made at step 754 to determine if POSNEG equals "1." If so, confidence exists that a "1" was transmitted, and control passes to step 755, where DATA PRESENT is set to "1" and to step 756 where DATA is set to "1" before processing control is returned to a calling routine via step 765. At step 751, if POSITIVE TOTAL is not less than THRESH5, control passes to step 758 where a comparison is made to determine if NEGATIVE TOTAL is less than THRESH5. If so, control passes to step 759 where a comparison is made to determine if PREV NEG TOTAL is less than THRESH5. If so, control passes to step 760 where a test is performed to determine if 2ND PREV NEG TOT is greater than THRESH5. If so, control passes to step 761 where a test is performed to determine if POSNEG is equal to zero. If so, confidence exists that a "0" was transmitted, and control passes to step 762 where DATA PRESENT is set to "1" and then to step 763 where DATA is set to "0" before processing control is returned to a calling routine via step 765. If comparisons are negative at any of steps 752, 753, 754, 758, 759, 760, or 761 ("PREV POS TOTAL>THRESH5?," "$2^{ND}$ PREV POS TOT THRESH5?," "POSNEG=1?," "NEGATIVE TOTAL<THRESH5?," "PREV NEG TOTAL<THRESH5?," "$2^{ND}$ PREV NEG TOT>THRESH5?," or "POSNEG=0?," respectively), criteria for valid data are not met and control passes to either step 757 or 764 where DATA PRESENT is set to "0" before processing control is returned to a calling routine at step 765. Use of a POSNEG test in this example at steps 754 and 761 lends confidence to validity of data but is optional and may be omitted in some embodiments. It should also be noted that since POSITIVE TOTAL and NEGATIVE TOTAL integrals are generally generated by a positive channel (i.e., an input terminal configured to A/D sample positive half-cycles in an input AC power waveform) and a negative channel (i.e., an input terminal configured to process negative half-cycles in an input AC power waveform), respectively, during each half-cycle interval, sufficient data will generally be present to permit use of alternative algorithms for decoding received data for Method 5 and for some of the other Methods disclosed herein.

Figure 18G:
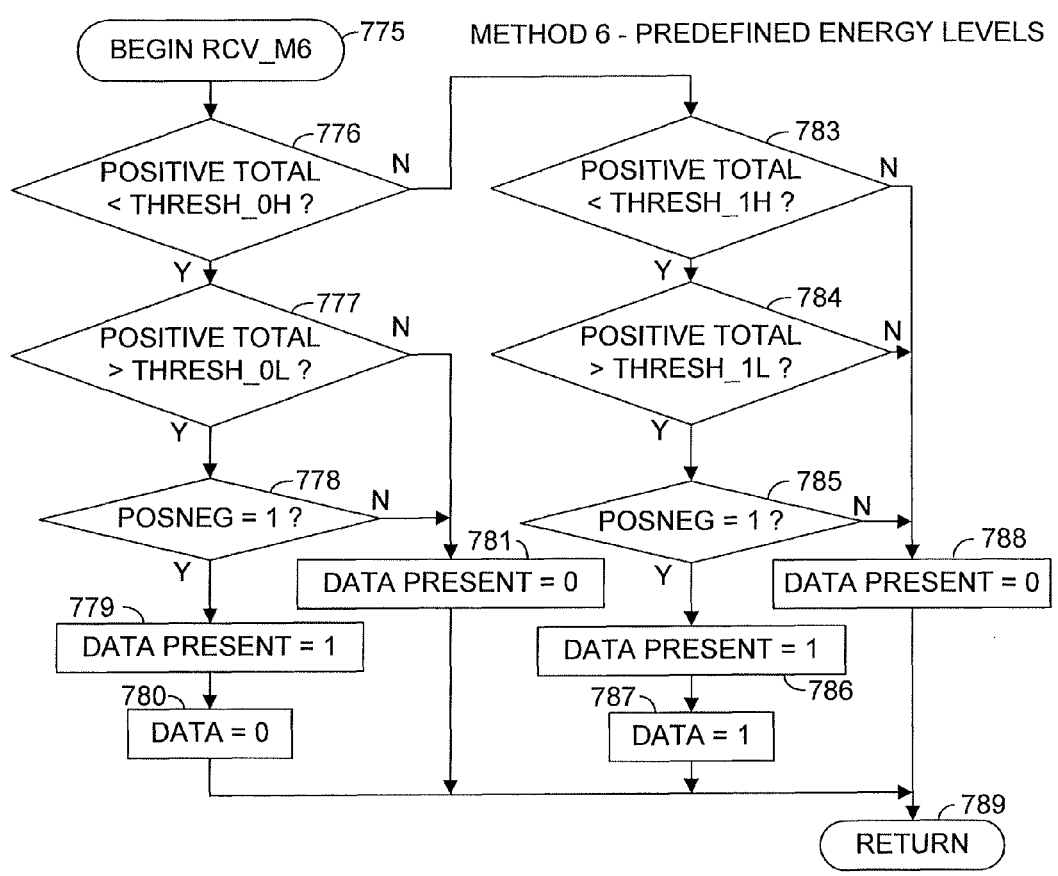

FIG. 18G is a flowchart of example software that may be called at step 660 of FIG. 18B to process potential data using Method 6, wherein data is transmitted by using predefined energy levels in each positive and negative half-cycle pair of an AC power waveform to indicate a "0" or a "1." Method 6 sends data by selecting one of two firing delays for firing an SCR or TRIAC after a zero crossing of an AC power waveform. For example, a logical "1" can use a 20 percent (of a half-cycle interval) delay after zero crossing in firing for both positive and negative half-cycles, and a logical "0" can use a 80 percent delay in firing for both positive and negative half cycles. Any waveform with no delay is considered to not contain data. Refer to FIG. 14 for a representative waveform for data transmitted using Method 6. This is a Method that does not present a risk of a charge imbalance. It is inherently DC balanced because both half cycles of the waveform are equally affected. It should be noted that Method 6 is not limited to two discrete values but could be expanded to use other "states" or "symbols" having different delays (e.g., 40 percent, 60 percent) from those presented above. This could allow additional information to be encoded in an AC waveform and increase effective data transmission rates in some applications and embodiments.

At step 776 of FIG. 18G, a comparison is made to determine if POSITIVE TOTAL is less than THRESH_0H, a value selected based on an upper bound of energy used to transmit a "0" plus a small noise threshold. If so, control passes to step 777 where a comparison is made to determine if POSITIVE TOTAL is greater than THRESH_0L, a value selected based on a lower bound of energy used to transmit a "0" reduced to also provide a noise margin. If so, control passes to step 778 where another test is made to determine if POSNEG equals "1." If so, confidence exists that a "0" was transmitted so processing control passes to step 779 where DATA PRESENT is set to "1" and then to step 780 where DATA is set to "0" before processing control is returned to a calling routine via step 789. At step 776, if POSITIVE TOTAL is not less than THRESH_0H, control passes to step 783 where a comparison is made to determine if POSITIVE TOTAL is less than THRESH_1H, a value selected based on an upper bound of energy used to transmit a "1" plus a noise margin. If so, control passes to step 784 where a comparison is made to determine if POSITIVE TOTAL is greater than THRESH_1L. If so, control passes to step 785 where a test is made to determine if POSNEG is equal to "1." If so, confidence exists that a "1" was transmitted, so processing control passes to step 786, where DATA PRESENT is set to "1" and then to step 787 where DATA is set to "1" before processing control is returned to a calling routine via step 789. If comparisons are negative at any of steps 777, 778, 783, 784, or 785 ("POSITIVE TOTAL>THRESH_0L?," "POSNEG=1?," "POSITIVE TOTAL<THRESH_1H?," "POSITIVE TOTAL>THRESH_1L?," or "POSNEG=0?," respectively), criteria for valid data are not met, and processing control passes to step 781 or 788, where DATA PRESENT is set to "0" before processing control is returned to a calling routine via step 789.

In Method 7, an unmodified on/off switch is used to control a parameter such as lamp brightness at the load. Method 7 requires integrating the ac input over several cycles. When power is first applied to the circuit, power to the load is controlled so that it increases gradually. The PWM duty cycle is increased over a relatively slow period, allowing the opportunity for the operator to select a desired brightness level by interrupting the AC power momentarily. When the desired power level is achieved, a rapid off/on sequence is used to set the power level at that point and maintain it until power is removed. The output PWM is set to the integrated value until the integrated value begins to decrease. This indicates that power has been removed. Like Method 2, the logic is dependent on the fact that the DC power supply to the microcontroller is available for a period of time after loss of AC power. This allows decisions to be made in the software based on interruption of power for a short period, which is determined by the time required to discharge the DC supply to the microcontroller. The length of time required for the total integrated value to reach 100% PWM duty cycle is determined by the scaling factor. For example, to set a two second ramp for full intensity, the scale factor would be set to 120, which would require 120 cycles of the 60 Hz power to reach full output. Likewise, the time to ramp down to full off can be set by a separate scale factor. However, this method is available when the switch leg is rewired to supply a logic signal rather than switching the load directly, and the load receives power from another source (e.g., from a normal junction box on a circuit). By isolating the switch leg from the power path, it is possible to implement additional features such as slow dimming at switch off. When the power to the lamp flows through the switch, there is no source of power to implement this feature if the lamp power is being switched at the lamp. When the power is always available and the switch only provides control, then a slowly dimming function is available when the switch is turned off and left off. This allows time for performing activities such as walking across a room or setting an alarm switch before total loss of illumination. This feature is already available in some expensive high-end switches. It can also be implemented very inexpensively as an OEM module that mounts in the switch box, supplementing the inexpensive switch by providing additional features and functions based on mildly complex patterns of switch control as described in Method 7. However, if the switching circuit is mounted in the switch box and the switch leg continues to carry AC load current, the potential for high speed low cost communication with the switching circuit is lost.

When the switching is done at the load and the switch leg carries signaling currents, many additional options are available. Some of these functions include selecting multiple loads to be switched, such as additional lamps, electric shutters and blinds and fans as well as sub-loads consisting of different color temperature LEDs or different colors. Time of day schedules can be loaded, as well as preferred menus of lamp, fan, color, color temperature combinations. The complexity of the control device at the switch box can range from a simple switch to a built-in LCD color display with touch screen panel or an electrical jack for input and control using a portable electronic device. Mounting the TRIAC in the lamp housing, with the electronics in the switch housing provides many operating modes. Logic for changing modes may be similar to logic disclosed earlier for using power on/off/on cycling to implement mode changes. Logic for different modes may be implemented as disclosed in FIG. 17C.

Methods 2 and 7 do not require a special transmitter to generate commands. Method 7 does not make use of a predefined condition to select data states for transmission as a command. It selects power levels based on the timing of an on/off switch. The value of this method is the added functionality of a programmable dimmer function while reducing production cost. A side benefit is the extended life of incandescent bulbs when driven by this circuit due to the relatively slow power application. Incandescent bulb life can be extended by a factor of 8 to 10 times by gradual application of power and operation at 90% or less rated power. Therefore, a bulb rated for 2,000 hours operational life can be expected to remain in service for 15,000 to 20,000 hours using this method of control. The low cost circuit required for operation can be embedded in a "Smart Socket" for easy installation. It also works with 3-way or in-line lamp switches. The circuit can also be supplied in an "OEM" form suitable for use in an electrical enclosure, to be connected by an electrician or DIY. The form of the circuit is the same or similar to that of a standard TRIAC lamp dimmer with the addition of a microcontroller. A circuit based on Method 7 can be located either at the switch or at the lamp. When used for incandescent dimming, there is no need for additional circuitry at the lamp. When used with LEDs, there may be no advantage to putting the circuit at the switch. However, it should be noted that the switch need not be modified in either case. If the circuit is located at the switch, it can coexist in the same housing without modification to the switch. In its simplest form, it is merely a ramp control, slowing the application of full power over a period of time. If the power is interrupted momentarily, the present brightness level is held.

A circuit using a standard on/off toggle switch can be sold as a drop-in replacement for a dimmer switch that uses a rotary or linear potentiometer. It can also replace a standard on/off toggle switch. A standard microcontroller such as the Atmel ATtiny10 can be used to replace the potentiometer at a significant savings in component cost, as well as assembly cost.

Placing the switch in the on position starts a program in the microcontroller that gradually increases the power applied to the load, which can be a lamp, a fan motor or other electrical appliance such as a motor to raise or lower blinds.

If the switch is left on, the microcontroller program gradually increases the output power until it reaches the level set the last time a setting was made. If it is desired to increase the level to a new maximum, an on/off sequence applied after the level has stopped increasing, will enter a new mode where the level continues to increase up to maximum or until an on/off sequence stops it, as in the initial programming setup.

When power is removed without being re-applied within a half second or so, the output level gradually decreases. The present level can be stored and held by re-applying power as it is decreasing.

The power reduction rate will typically be set to be much longer than the power increase rate, which is selected as a compromise between too fast to be able to select the desired hold level and so slow that the user becomes impatient.

In practice, unless the user performs some activity other than simply turning the switch on and leaving it until leaving the room or going to bed, for instance, the power may simply increase gradually to the set point and hold it there. When the switch is turned off without any further action, the power gradually decreases until completely off, giving the user time to cross the room, go to bed or perform other activities before the light is completely extinguished. This feature is available in some high end dimmer switches, but typically not in an economy design.

All functions are controlled by integrating the input power cycles to detect power application sequences with time. The circuit comprises of a microcontroller replacing the potentiometer in a standard lamp dimmer circuit. The software implements the state diagram described above. Short periods of power loss are differentiated from long periods by the fact that there is power remaining in a power filter capacitor after a short loss, whereas a longer power loss results in a cold start because the microcontroller has stopped operating due to loss of power.

This Method also has value in the wiring of multi-axis mechanical positioning systems in the reduction of wiring to motors, encoders, limit switches and so on. Each axis in such systems may require 15 or more conductors which can become a problem in routing and cable management, as well as adding off-axis weight to precision stages.

Figure 19:
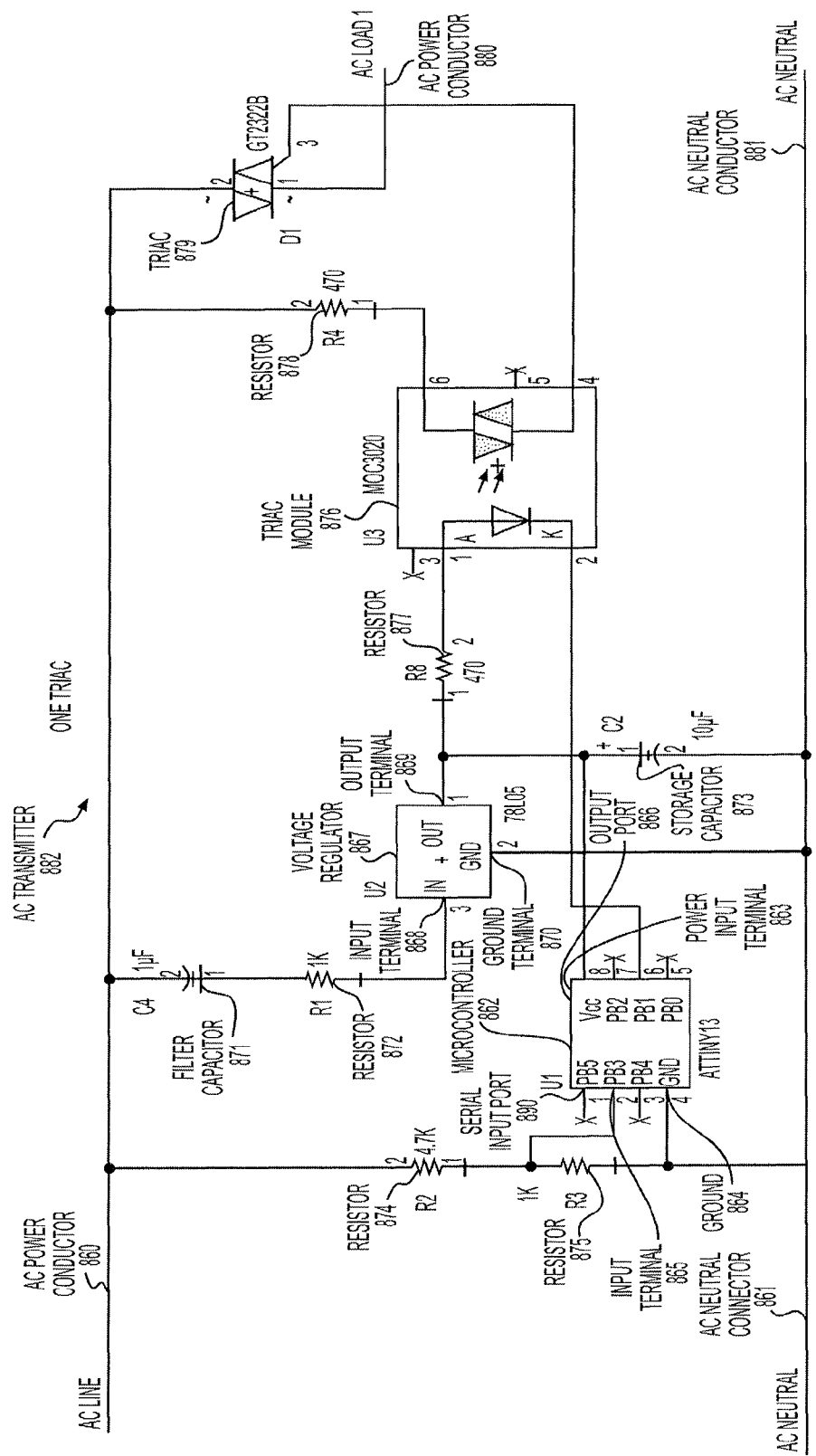
FIGS. 19 and 19A illustrate exemplary circuit diagrams for a representative AC transmitter to support data transmission using various Methods in accordance with methods and systems consistent with the present invention.

FIG. 19 shows an example circuit diagram for a representative AC transmitter 882 that could be used to support data transmission using any of Methods 3, 5, or 6. In FIG. 19, AC power for AC transmitter 882 may be provided via AC power conductor 860 and AC neutral conductor 861. AC transmitter 882 may employ a microcontroller 862 to support modulation, via TRIAC 879, of AC output power supplied to a load via AC power conductor 880 and AC neutral conductor 881, in order to transmit user data input to microcontroller 862 via serial input port 890. Microcontroller 862 may be an ATMEL AVR ATtiny13A microcontroller or a similar microcontroller from ATMEL or another vendor having an integral analog-to-digital converter or a zero crossing detector such as described in an ATMEL data sheet: AVR182 Zero Cross Detector, a capability to drive an output signal, which may be a pulse width modulated signal, on at least one output pin and, optionally, a serial data input pin. Microcontroller 862 may be connected to ground 864. A DC voltage supply for a power input terminal 863 of microcontroller 862 may be provided via storage capacitor 873 and output terminal 869 of voltage regulator 867, which receives AC power via filter capacitor 871, resistor 872, and input terminal 868, being grounded to AC neutral via ground terminal 870. A capability to monitor input AC power to sense positive and negative half-cycles and zero crossings is provided via resistors 874 and 875, which comprise a voltage divider network with values selected to provide a range of voltages to input terminal 865 of microcontroller 862 which is within an acceptable dynamic range of an integral A/D converter configured for operation in cooperation with input terminal 865. Switching control of AC power supplied via output conductors 880 and 881 may be provided by TRIAC 879 which is controlled by optically isolated TRIAC module 876, which is controlled by output terminal 866 of microcontroller 862 using power supplied by output terminal 869 of voltage regulator 867 via resistor 877. Resistor 878 limits flow of current through a TRIAC within optically isolated TRIAC module 876, which controls switching of TRIAC 879. This circuit allows microcontroller 862 to sense positive and negative zero crossings of an input AC power supply and provide switching of TRIAC 879, which controls output power to a load, in synchronization with supplied input power, but with independent time delays for switching of positive and negative half-cycles as needed to implement communication modulation techniques of any of Methods 3, 5, or 6 of the instant invention on AC power supplied to a load. Software that may be loaded in microcontroller 862 to accept input data and implement communication Method 3, 5, or 6 via AC power supplied to a load is described later herein.

Figure 19A:
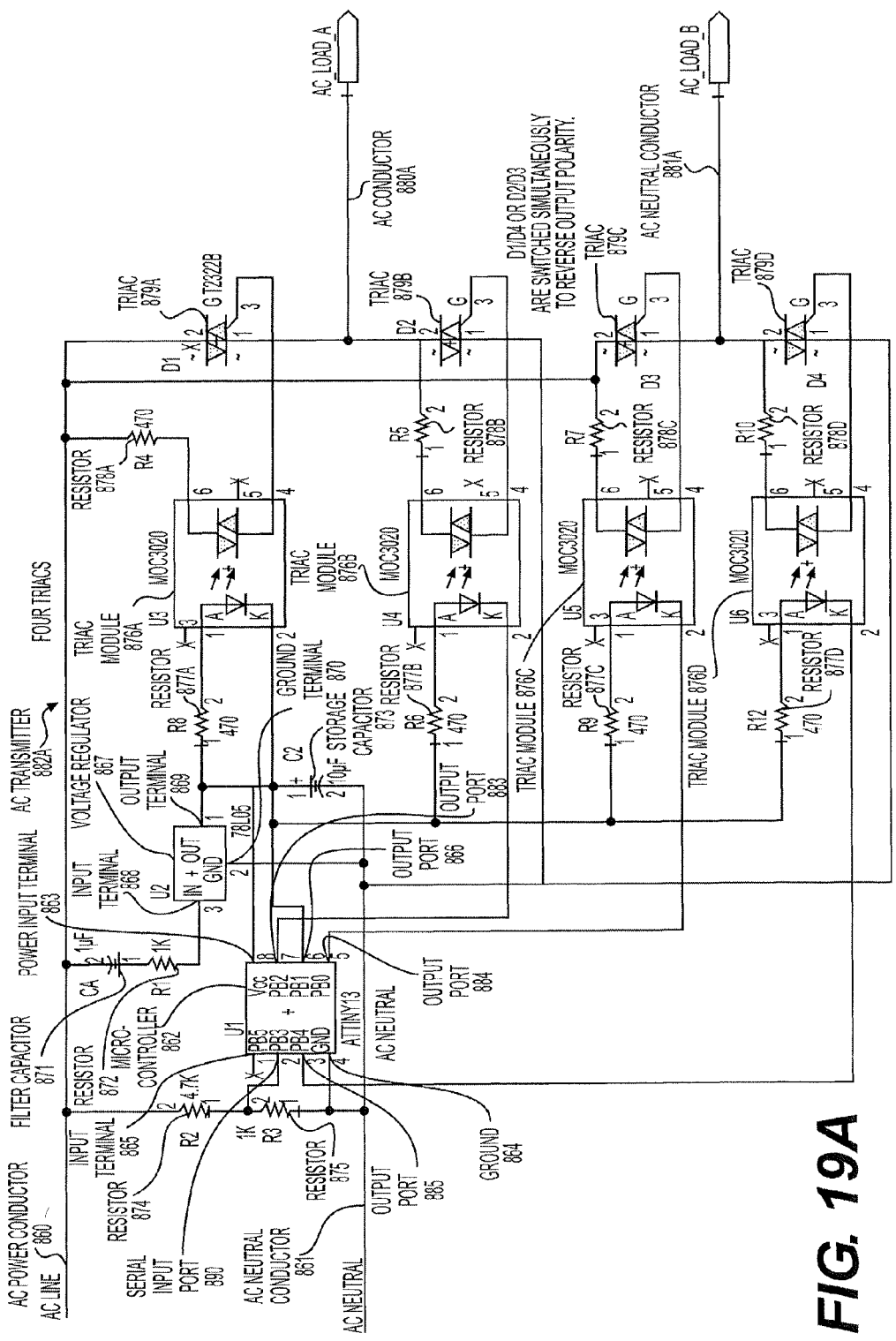

FIG. 19A shows an example circuit diagram for a representative AC transmitter 882A that could be used to support data transmission using Methods 4F or 4H of user data input to microcontroller 862 via serial input port 890. The difference between the circuit illustrated in FIG. 19A and the circuit illustrated in FIG. 19 and described in association therewith is that four output ports 866, 883, 884, 885 of microcontroller 862 are used, and these output ports are connected via four optical isolation TRIAC modules 876A through 876D to four power switching TRIACS 879A through 879D, respectively. The other portions of the transmitter circuit illustrated in FIG. 19A are the same as the transmitter circuit illustrated in FIG. 19, and the same reference numbers are used on corresponding components in FIGS. 19A and 19 so the description of FIG. 19 may be used to provide an understanding of these other components. This circuit allows microcontroller 862 to sense positive and negative zero crossings of an input AC power supply and provide independent switching of TRIACs 879A, 879B, 879C, and 879D, which control output power to a load. By switching different TRIACs in synchronization with supplied input power, microcontroller 862 can reverse polarity of full cycles or half-cycles following either positive half-cycles or negative half-cycles as needed to implement communication modulation techniques of either of Methods 4F and 4H on AC power waveforms supplied to a load via conductors 880A and 881A. Note that in this example embodiment, both conductors 880A and 881A are floating with respect to a neutral ground. A few potential applications for use of Methods 4F and 4H were described earlier herein. Software that may be loaded in microcontroller 862 to accept input data and implement communication Method 4F or 4H via AC power supplied to a load is described later herein.

Figure 20:
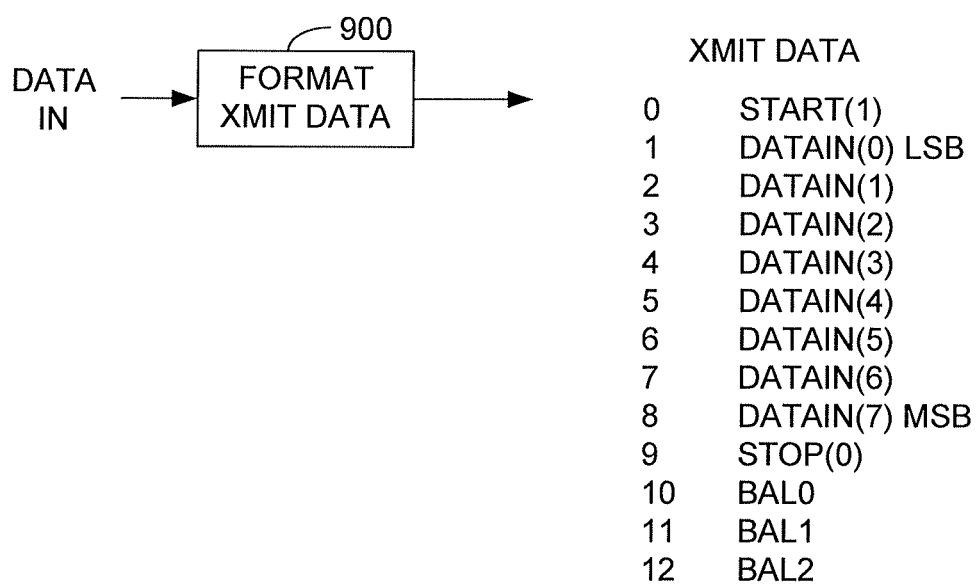
FIG. 20 illustrates an exemplary method for using a data formatting routine to accept input data and convert it to a bit sequence that is ready to transmit.

FIG. 20 illustrates how a data formatting routine 900 may be used to accept input data and convert it to a bit sequence that is ready to transmit, include addition of charge balancing bits for those Methods and applications that use charge balancing. Charge balancing bits are selected so that the number of "0's" and "1's" are equal after transmission of an ASCII character plus charge balancing bits.

Figure 21A:
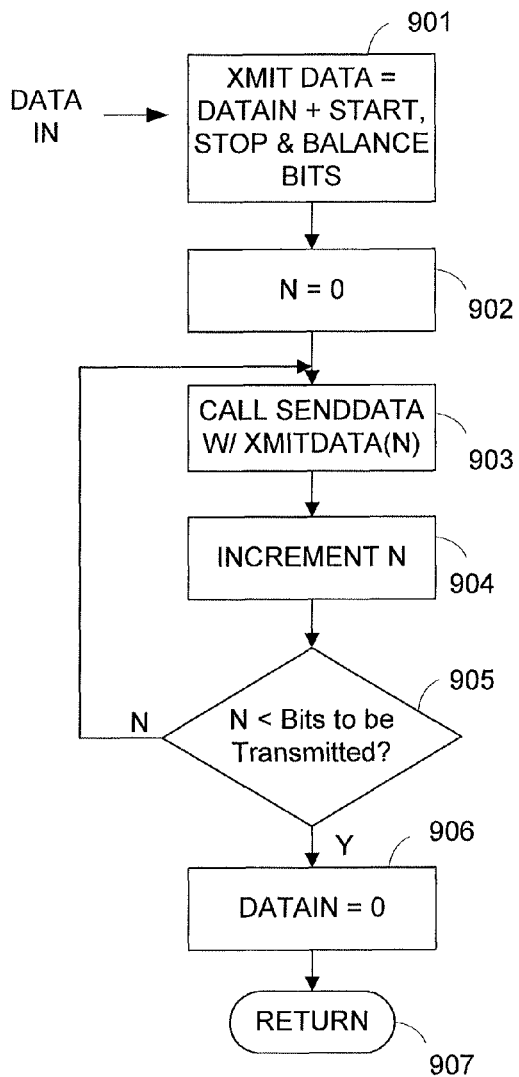
FIG. 21A illustrates steps in an exemplary method for using a data transmission control routine to control transmission of data using ASCII character codes plus balance bits.

FIG. 21A illustrates how a data transmission control routine may be used to control transmission of data using, in this example, ASCII character codes plus balance bits. Once data is formatted in step 901 as illustrated in FIG. 20, a bit counter N is cleared at step 902, and call is made to a SEND DATA routine at step 903 to send a start bit (N=0). The value of N is incremented at step 904 and checked at step 905 to determine if N exceeds the number of bits to be transmitted for this Method (13 in this example). If N is less that the number of bits to be transmitted, processing control loops back to step 903 to send the next bit. At step 905, after N exceeds the number of bits to be transmitted, DATAIN is set to zero at step 906 to signal completion of transmission and to prepare for a subsequent transmission before control is returned to a calling routine at step 907.

Figure 21B:
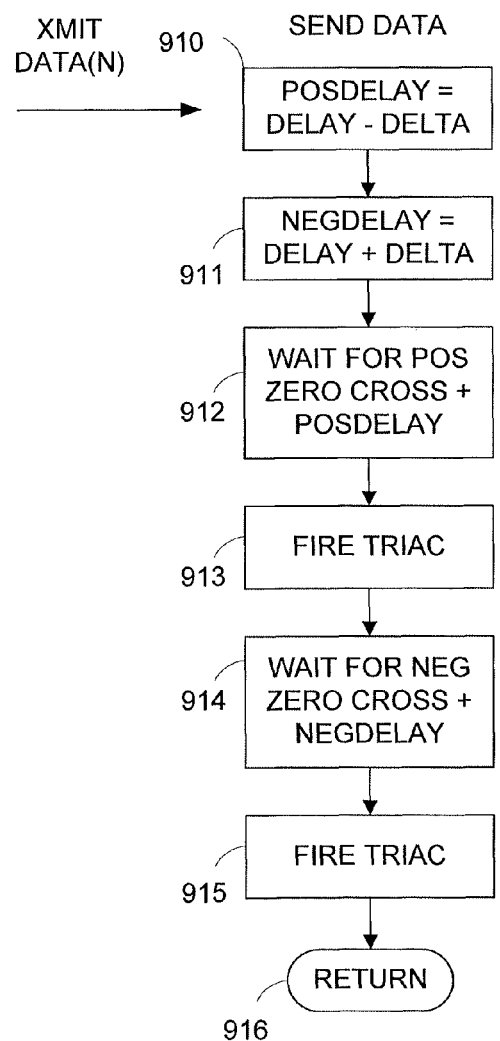
FIG. 21B illustrates steps in an exemplary method for completing the SEND DATA routine of Method 3 described herein.

FIG. 21B illustrates steps in a SEND DATA routine for Method 3. At steps 910 and 911, values for delay of a positive half-cycle (POSDELAY) and a negative half-cycle (NEGDELAY) are calculated based on subtracting or adding a DELTA value to a common DELAY value, according to whether a "0" or a "1" is to be transmitted according to Method 3. This information is used in sending "1's" and "0's" according to Method 3. A routine at step 912 waits for a positive zero crossing, which may be determined from integrals of positive and negative half-cycles as disclosed earlier herein, or from a zero crossing detector, such as referenced in an earlier description of a transmitter circuit, and waits for an additional POSDELAY period prior to firing a TRIAC for the positive half-cycle at step 913. The routine then waits for a negative zero crossing plus NEGDELAY at step 914 prior to firing a TRIAC for the negative half-cycle at step 915. Processing control is then returned to a calling routine at step 916 These TRIAC firing impose the desired modulation onto an AC power waveform to transmit a "0" or a "1" according to Method 3.

Figure 22A:
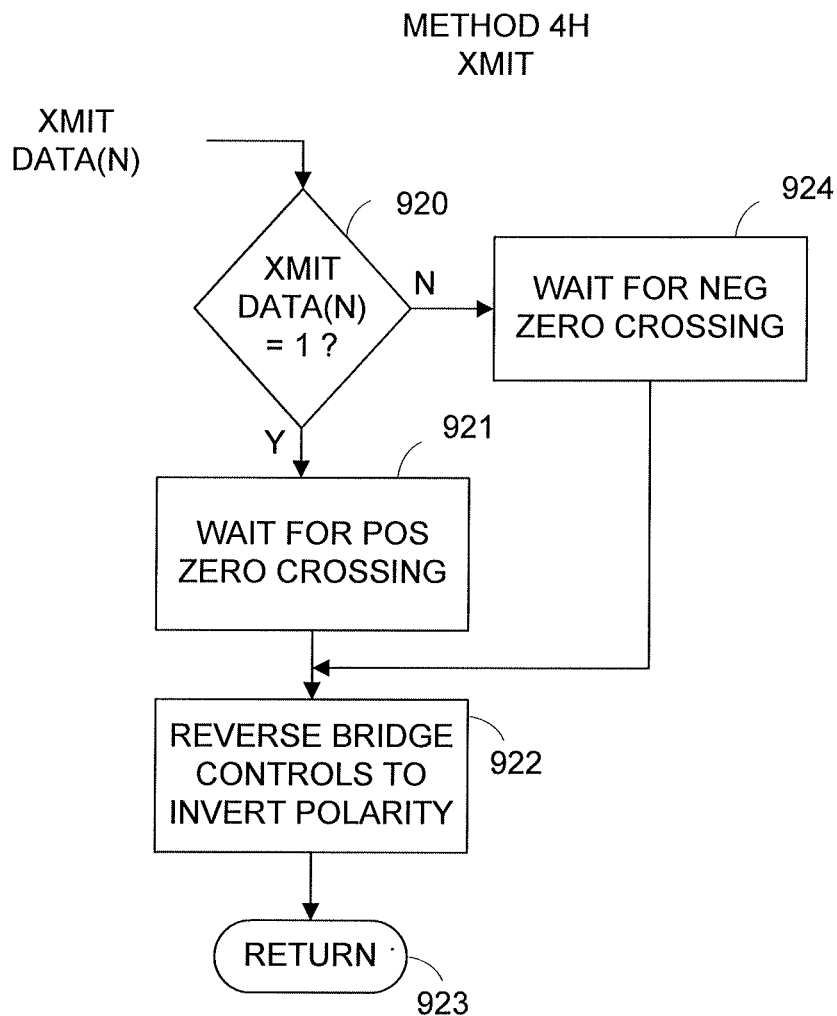
FIG. 22A illustrates steps in an exemplary method for completing the SEND DATA routine of Method 4H described herein.

FIG. 22A illustrates steps in a SEND DATA routine for Method 4H. At step 920 a check is made to determine if the next bit to be transmitted is a "1." If so, control passes to step 921 to wait for a positive zero crossing. As soon as a positive zero crossing occurs, polarity of an output AC waveform is reversed at step 922 using a switching network such as illustrated in FIG. 19A before control is returned to a calling routine at step 923. If the next bit to be transmitted is not a "1" at step 920, then control passes to step 924 to wait for a negative zero crossing before polarity is reversed at step 922 prior to returning control to a calling routine at step 923.

Figure 22B:
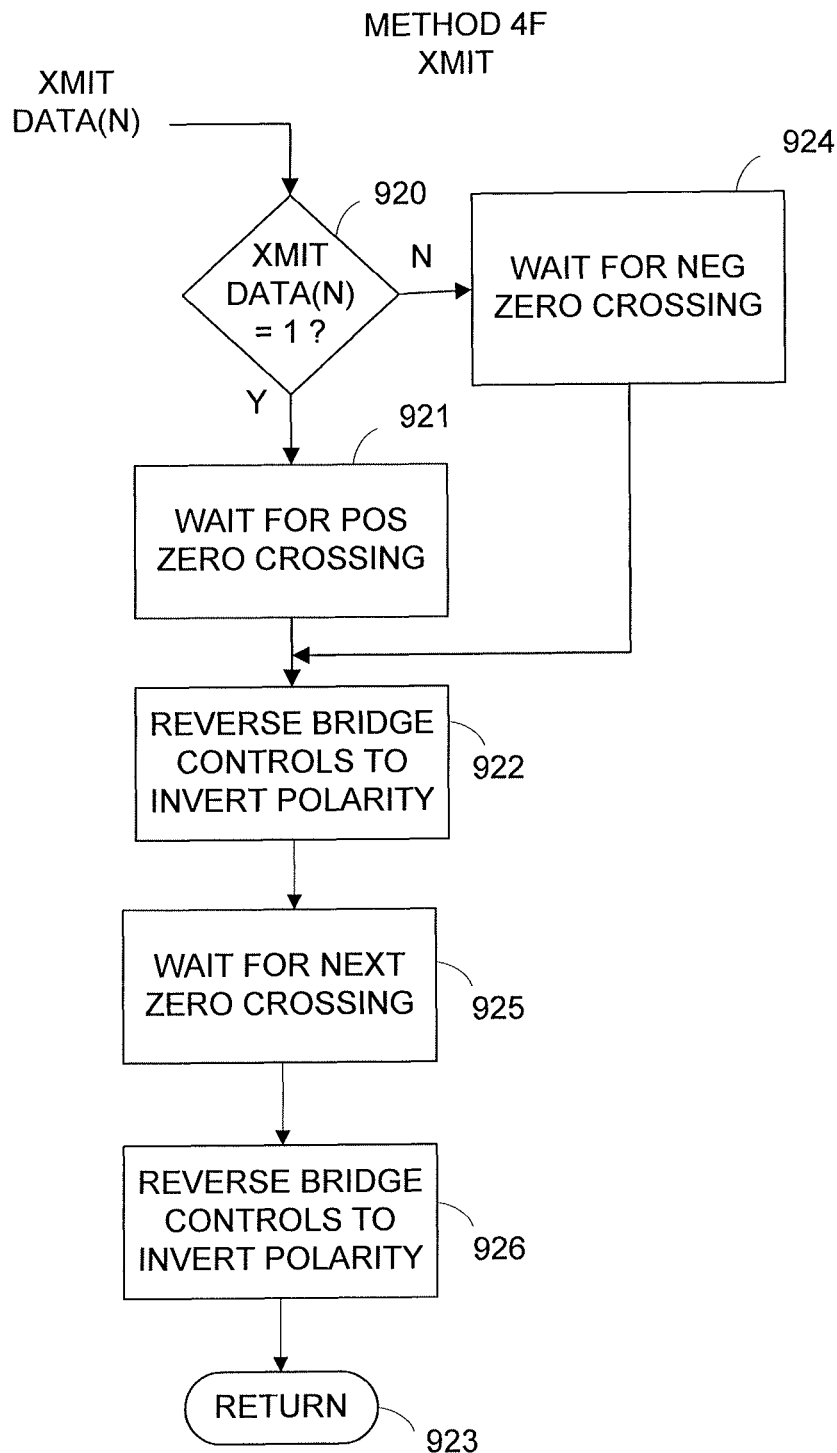
FIG. 22B illustrates steps in an exemplary method for completing the SEND DATA routine of Method 4F described herein.

FIG. 22B illustrates steps in a SEND DATA routine for Method 4F. This routine is essentially the same as a SEND DATA routine for Method 4H except that two polarity reversals are made in adjacent half-cycles, so as to create a full cycle polarity reversal for each transmitted bit. The functions and explanations for steps 920, 921, 922, and 924 ("XMIT DATA(N)=1?," "WAIT FOR POS ZERO CROSSING," "REVERSE BRIDGE CONTROLS TO INVERT POLARITY," and "WAIT FOR NEG ZERO CROSSING," respectively) are the same as for FIG. 22A. In FIG. 22B for Method 4F, after a polarity reversal is made at step 922, control passes to step 925 to wait for the next zero crossing where another polarity reversal is made at step 926 prior to returning processing control to a calling routine at step 923.

Figure 23:
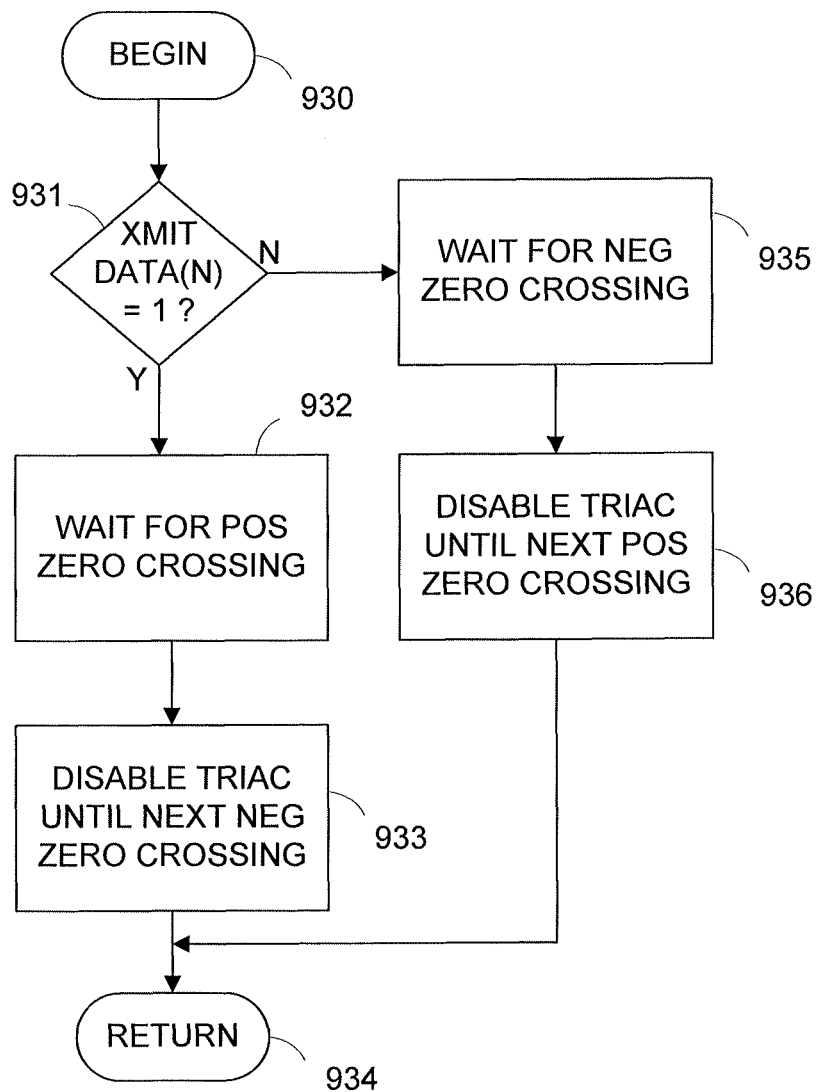
FIG. 23 illustrates steps in an exemplary method for completing the SEND DATA routine of Method 5 described herein.

FIG. 23 illustrates steps in a SEND DATA routine for Method 5. At step 931, if the next bit to be transmitted is a "1," control passes to step 932 to wait for a positive zero crossing. When a positive zero crossing occurs, control passes to step 933 which prevents firing of a TRIAC until the next negative zero crossing, thereby preventing current flow for a full cycle. Processing control the passes to a calling routine via step 934. At step 931, if the next bit to be transmitted is not a "1," control passes to step 935 to wait for a negative zero crossing, after which control passes to step 936 which prevents firing of a TRIAC until the next positive zero crossing before control passes to a calling routing via step 934.

Figure 24:
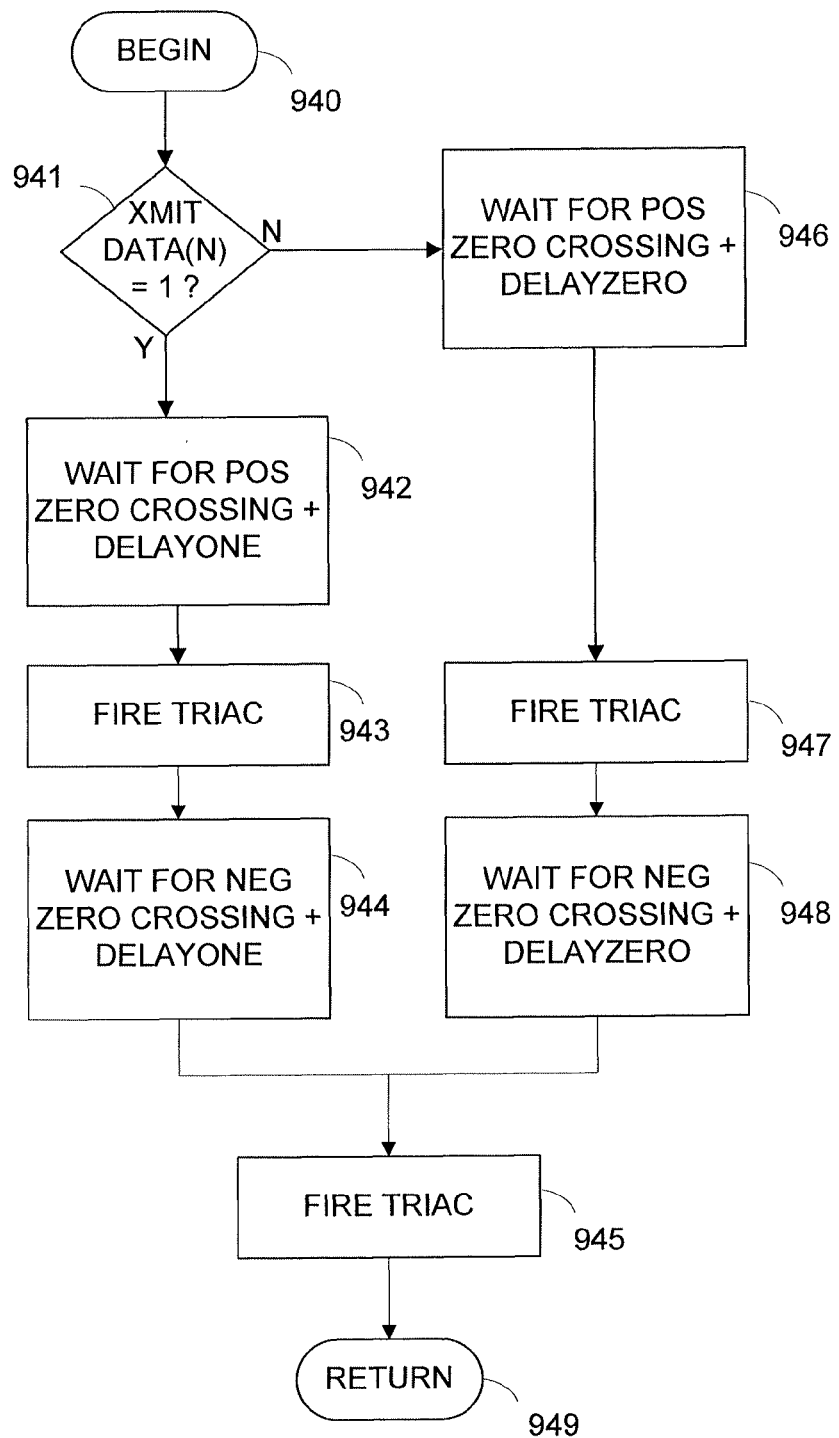
FIG. 24 illustrates steps in an exemplary method for completing the SEND DATA routine of Method 6 described herein.

FIG. 24 illustrates steps in a SEND DATA routine for Method 6. At step 941, if the next bit to be transmitted is a "1," control passes to step 942 to wait for a positive zero crossing plus DELAYONE, where DELAYONE provides an appropriate delay associated with transmittal of a "1." After such delay, a TRIAC is fired at step 943 to impose an appropriate delay on a positive half-cycle. Control then passes to step 944 to wait for a negative zero crossing plus DELAYONE, after which another TRIAC firing at step 945 imposes an appropriate delay on a negative half-cycle before control passes to a calling routine at step 949. At step 941, if the next bit to be transmitted is not a "1," control passes to step 946 to wait for a positive zero crossing plus DELAYZERO, where DELAYZERO provides an appropriate delay associated with transmittal of a "0." After such a delay, a TRIAC is fired at step 947 to impose an appropriate delay on a positive half-cycle. Control then passes to step 948 to wait for a negative zero crossing plus DELAYZERO after which a TRIAC is fired at step 945 to impose an appropriate delay on a negative half-cycle before control passes to a calling routine via step 949.

It is to be understood that higher level routines in a microcontroller can provide for routine firing of TRIACs as appropriate for normal AC power transmission when data is not being transmitted as described above.

Figure 25A:
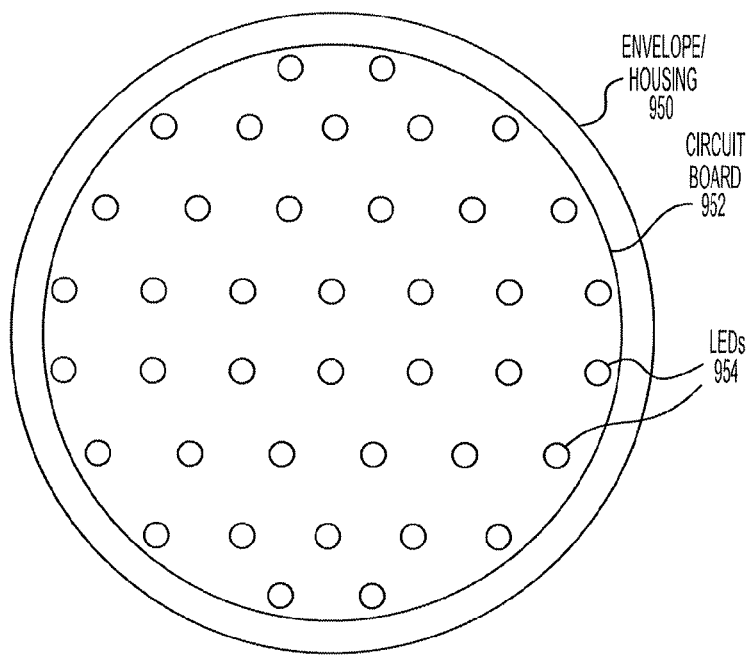
FIGS. 25A-B illustrate a light bulb that can be screwed or inserted into a conventional light bulb socket that will enable user control of intensity and/or color temperature in accordance with the present invention.
Figure 25B:
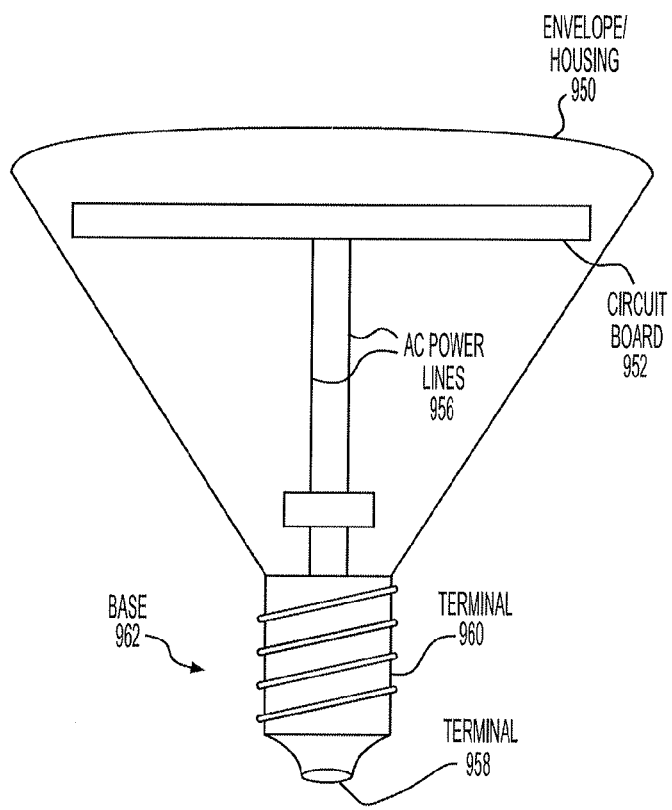

Methods and systems consistent with the present invention may be used to provide a light bulb that can be screwed or inserted into a conventional light bulb socket that will enable user control of intensity and/or color temperature according to method 2 disclosed herein. As shown in FIGS. 25A and 25B, such a bulb may comprise a bulb envelope or housing 950 and at least one circuit board 952 including intermingled LEDs 954 similar to that illustrated in FIG. 15A or 15B. Circuit board 952 may be conventionally supported, as by bonding to the envelope, and powered by conventional AC power lines 956 attached to the appropriate terminals 958, 960 on base 962. While a screw-in base is shown, it is to be understood that other types of bases may be employed, such as pin-type bases found on halogen lights, or bases found in electrical power grids of other countries.

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

The invention claimed is:

1. A method for controlling a device powered by an AC power sine wave, comprising:
    without imposing another or a secondary signal on or with said AC power sine wave, encoding said AC power sine wave such that for each encoded full cycle of AC power sine wave, configuring a half cycle of said one full cycle of said AC power sine wave to have less energy than the other half cycle of said one full cycle, and designating an encoded said full cycle of AC power sine wave having less energy in one of a positive or negative said half cycle as a digital "0", and designating an encoded said full cycle of AC power sine wave having less energy in the other of said positive or negative said half cycle as a digital "1",
encoding a plurality of said full cycles of said AC power sine wave to form a digital character, with a plurality of so-encoded said digital characters forming a command set for controlling operation of said device, each said digital character of said command set associated with a different, discrete operational parameter of said device,
    powering said device using an encoded said AC power sine wave,
while powering said device using said encoded AC power sine wave, decoding said encoded AC power sine wave,
    changing operation of said device in accordance with a decoded said digital character.

2. The method of claim 1, further comprising:
    developing one or more control signals responsive to said decoding of said encoded AC power sine wave, and
    wherein the changing operation of said device further comprises varying power on a power line coupled to the device based on the one or more control signals.

3. The method of claim 2, further comprising encoding said AC power sine wave responsive to a user input.

4. The method of claim 1, further comprising: encoding said AC power sine wave on power lines coupled to a plurality of devices; and controlling operation of said plurality of devices in accordance with said decoded AC power sine wave.

5. The method of claim 3, wherein the device is an electrical lamp, and further comprising controlling operation of said electrical lamp using said control signal.

6. The method of claim 1, wherein the device is a solid state device, and further comprising controlling operation of said solid state device in accordance with said decoded AC power sine wave.

7. The method of claim 6, wherein the solid state device is a light emitting device and further comprising controlling operation of said light emitting device in accordance with said decoded AC power sine wave.

8. The method of claim 2, further comprising decoding said AC power sine wave using a microcontroller configured as a decoder to derive said control signal.

9. The method as set forth in claim 1 further comprising forming a contiguous string of said encoded full cycles of said AC power sine wave to form said digital character.

10. The method as set forth in claim 1 further comprising selecting ASCII characters as said digital characters.

11. The method of claim 1 further comprising configuring said device as a visible light emitting, solid state device.

12. The method as set forth in claim 11 further comprising:
using a plurality of LEDs as visible white light emitters,
selecting said LEDs to have spectral temperatures generally between about 2,700 degrees Kelvin and about 6,500 degrees Kelvin,
selectively varying power levels applied to discrete, selected ones of said LEDs responsive to respective said characters from said command set encoded on said AC power sine wave applied to said device, for selectively varying a temperature of white light emitted from said solid state device.

13. The method as set forth in claim 12 further comprising selectively varying power levels applied to discrete selected ones of said plurality of LEDs responsive to respective said characters from said command set encoded on said AC power sine wave applied to said device, for varying intensity of a selected said temperature of said white light emitted from said solid state device.

14. The method as set forth in claim 13 further comprising selecting between varying temperature of said solid state device and varying intensity of said solid state device by rapidly cycling said AC power sine wave applied to said solid state device from an ON state to an OFF state and then back to an ON state.

15. The method as set forth in claim 14 wherein said rapidly cycling power further comprises establishing a temporal window within which said power is rapidly cycled to select between said varying temperature and said varying intensity.

16. The method as set forth in claim 15 wherein said establishing a temporal window further comprises establishing a temporal window of about 5 seconds or less.

17. The method as set forth in claim 15 wherein said establishing a temporal window further comprises establishing a temporal window of about 2 seconds or less.

18. The method as set forth in claim 3 wherein said encoding said AC power sine wave responsive to said user input further comprises digitally encoding said AC power sine wave applied to said device according to said digital characters of said command set, with each said digital character of said command set controlling a different said operational parameter of said device.

19. The method as set forth in claim 18 further comprising selecting said characters of said command set from the ASCII code, and digitally encoding said AC power sine wave according to ASCII characters for controlling said operational parameters of said device.

20. The method as set forth in claim 19 further comprising developing a respective control signal for each said ASCII character of said command set, each said respective control signal controlling a said different said operational parameter of said device.

21. The method as set forth in claim 20 further comprising changing a mode of operation of said device by temporarily removing said AC power sine wave from said device and reapplying said AC power sine wave to said device within a predetermined temporal window.

22. The method of claim 7 further comprising changing a mode of operation of said solid state, light emitting device by removing and reconnecting said AC power sine wave to said device within a predetermined temporal window wherein after said reconnecting said AC power sine wave, a mode of operation of said solid state, light emitting device is different than a mode of operation prior to said removal of said AC power sine wave.

23. A method as set forth in claim 22 further comprising:
forming a plurality of groups of LEDs, and selecting LEDs for each group of LEDs to have the same visible color spectrum, with each said group of LEDs of said plurality of groups of LEDs having a different visible color spectrum from a visible color spectrum of others of said plurality of groups of LEDs,
selecting a range of said visible color spectrums of said plurality of groups of LEDs according to a range of visible color spectrums emitted by said solid state device, and
selectively varying power to said groups of LEDs independently and in accordance with a decoded said AC power sine wave, for independently varying said visible spectrum and intensity of said visible spectrum emitted by said solid state device.

24. The method as set forth in claim 23 wherein said changing a mode of operation further comprises changing a mode of operation between varying an intensity of light emitted by said solid state, light emitting device, and varying a color or spectrum of said light emitted by said solid state, light emitting device.

25. The method as set forth in claim 22 further comprising:
forming a group of LEDs each having a different color spectrum of emitted light,
selectively and independently varying power to each LED of said group of LEDs in accordance with a decoded said AC power sine wave, for independently varying an intensity of each said LED of said group of LEDs, for varying said spectrum of light emitted by said light emitting, solid state device.

26. The method as set forth in claim 25 further comprising selectively varying intensity of light emitted by said light emitting, solid state device independently of said varying of said spectrum.

27. The method as set forth in claim 25 further comprising:
defining a command set of digital characters, and assigning each said digital character a different operational parameter of said light emitting, solid state device,
encoding said AC power sine wave in accordance with one said digital character of said set of digital characters responsive to said user input,
decoding said AC power sine wave to derive said digital character, using a decoded said digital character to change operation of said light emitting, solid state device.

28. A method as set forth in claim 26 further comprising selecting said group of LEDs from LEDs that emit a spectrum of visible white light ranging from a cool temperature to a hot temperature, and varying said spectrum of visible white light emitted from said solid state device between said cool temperature and said hot temperature.

29. The method as set forth in claim 28 further comprising selecting said cool temperature of said spectrum of visible white light to be about 2,700 degrees Kelvin, and selecting said hot temperature of said spectrum of visible white light to be about 6,500 degrees Kelvin, and varying said spectrum of visible white light emitted from said solid state device between about 2,700 degrees Kelvin and about 6,500 degrees Kelvin.

30. The method as set forth in claim 3 wherein said encoding said AC power sine wave responsive to said user input further comprises encoding said AC power sine wave according to a digital ASCII code.

31. The method as set forth in claim 30 wherein said encoding an AC power sine wave according to a digital ASCII code further comprises encoding said AC power sine wave according to a single digital ASCII character of a plurality of digital ASCII characters, each said digital ASCII character of said plurality of digital ASCII characters defining a different said operational parameter of said device.

32. The method as set forth in claim 31 further comprising developing a respective said control signal responsive to a decoded said single ASCII character for controlling operation of said device.

* * * * *